(12) United States Patent
Hau

(10) Patent No.: US 12,344,489 B2
(45) Date of Patent: *Jul. 1, 2025

(54) CONTAINERIZED ROBOTIC SYSTEM

(71) Applicant: Dexterity, Inc., Redwood City, CA (US)

(72) Inventor: Roger Lam Hau, San Carlos, CA (US)

(73) Assignee: Dexterity, Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/429,018

(22) Filed: Jan. 31, 2024

(65) Prior Publication Data
US 2024/0166456 A1    May 23, 2024

Related U.S. Application Data

(63) Continuation of application No. 17/721,108, filed on Apr. 14, 2022, now Pat. No. 11,932,501.

(51) Int. Cl.
*B65G 61/00* (2006.01)
*B25J 21/00* (2006.01)

(52) U.S. Cl.
CPC .............. *B65G 61/00* (2013.01); *B25J 21/00* (2013.01)

(58) Field of Classification Search
CPC ................................ B65G 61/00; B25J 21/00
See application file for complete search history.

(56) References Cited

U.S. PATENT DOCUMENTS

| | | |
|---|---|---|
| 5,692,867 A | 12/1997 | Kondo |
| 7,344,109 B1 | 3/2008 | Rezai |
| 7,993,095 B2 | 8/2011 | Reichler |
| 9,688,489 B1 | 6/2017 | Zevenbergen |
| 9,737,992 B2 * | 8/2017 | Mougin ................. B25J 9/1676 |

(Continued)

FOREIGN PATENT DOCUMENTS

WO    2020208267    10/2020

OTHER PUBLICATIONS

Emell Derra Adolphus. Autodesk's Robot-Filled Shipping Container Could Transform Construction Sites. SnipsMag.com. Dec. 17, 2018 (Dec. 17, 2018) [Retrieved on Jul. 17, 2022]. Retrieved from internet: <URL: https://www.snipsmag.com/articles/93602-autodesks-robot-filled-shipping-container-to-transform-construction-sites> entire document.

(Continued)

*Primary Examiner* — Gregory W Adams
(74) *Attorney, Agent, or Firm* — Van Pelt, Yi & James LLP

(57) ABSTRACT

A containerized robotic system is disclosed. The containerized robotic system includes a base having a first attachment area configured to securely mount a robot and a second attachment area configured to securely mount a compressor, the base further including a set of one or more channels to provide an electrical connection to supply power to the robot and the compressor, respectively, and to provide compressed air from the compressor to the robot, a detachable superstructure configured to be removably connected to the base to define an enclosed space of sufficient size to accommodate at least the robot and the compressor, and a power distribution unit secured to the base and coupled to receive electrical power as input and to provide electrical power to the robot and the compressor via the set of one or more channels.

18 Claims, 22 Drawing Sheets

(56) References Cited

U.S. PATENT DOCUMENTS

| | | | |
|---|---|---|---|
| 9,815,155 B2 * | 11/2017 | Lin | B25J 5/007 |
| 9,827,676 B2 * | 11/2017 | Mattern | B25J 9/1679 |
| 9,878,762 B2 | 1/2018 | Pfuetzenreuter | |
| 9,958,851 B2 * | 5/2018 | Mattern | B25J 19/021 |
| 10,287,112 B2 | 5/2019 | Saylor | |
| 10,456,876 B2 | 10/2019 | Ulmer | |
| 10,549,928 B1 | 2/2020 | Chavez | |
| 10,647,528 B1 * | 5/2020 | Diankov | B65G 47/90 |
| 10,676,292 B2 | 6/2020 | Saylor | |
| 10,782,676 B2 * | 9/2020 | Besik | B23K 37/0461 |
| 11,932,501 B2 * | 3/2024 | Hau | B65G 57/00 |
| 2007/0022715 A1 | 2/2007 | Wegner | |
| 2012/0163953 A1 | 6/2012 | Murano | |
| 2017/0088368 A1 | 3/2017 | Roberts | |
| 2020/0094997 A1 | 3/2020 | Menon | |
| 2020/0376662 A1 | 12/2020 | Arase | |
| 2022/0080578 A1 | 3/2022 | Loinger | |
| 2022/0155752 A1 | 5/2022 | Søndergaard | |

OTHER PUBLICATIONS

Odico. Pop-Up Robot Arm Can Be Controlled By A Smart Device. Springwise.com. Oct. 9, 2018 (Oct. 9, 2018) [Retrieved on Jul. 17, 2022]. Retrieved from internet: <URL: https://www.springwise.com/pop-up-robot-arm-can-be-controlled-by-a-smart-device/> entire document.

* cited by examiner

CONTAINERIZED ROBOTIC SYSTEM

CROSS REFERENCE TO OTHER APPLICATIONS

This application is a continuation of U.S. patent application Ser. No. 17/721,108, entitled CONTAINERIZED ROBOTIC SYSTEM filed Apr. 14, 2022 which is incorporated herein by reference for all purposes.

BACKGROUND OF THE INVENTION

Robots have been used to perform tasks in manufacturing and other fields. For example, robots have been used to perform tasks in environments that may be unhealthy or otherwise dangerous to humans, tasks that require the application of force greater than a human may be able to apply, and tasks that require a high degree of precision and consistency over time.

Autonomous robots perform at least some tasks in an automated manner, without requiring human control or direction. For example, automated robots have been used to perform repetitive and/or otherwise predetermined tasks and sequences of tasks, typically in a controlled environment, such as a factory. More recently, self-driving cars, delivery drones, and other autonomous vehicles have been under development.

Teleoperation in the field of robotics refers to remote operation of a robot by an operator. For example, robots have been used to perform surgery, defuse bombs, and perform other tasks under the control of a skilled human operator.

Shipping and distribution centers, warehouses, shipping docks, air freight terminals, big box stores, and other activities that ship and receive items. In some cases, the shipping of items includes receiving a non-homogenous set of items, and sorting the items for shipping such as a sortation according to a destination. In other cases, the shipping of non-homogeneous sets of items use strategies such as packing and unpacking dissimilar items in boxes, crates, containers, conveyor belts, and on pallets, etc. Packing or sorting dissimilar items in boxes, crates, on pallets, etc. enables the resulting sets of items to be handled by heavy lifting equipment, such as forklifts, cranes, etc., and enables items to be packed more efficiently for storage (e.g., in a warehouse) and/or shipment (e.g., in truck, cargo hold, etc.). In further other cases, the shipping of items includes assembling inventory from a warehouse into a kit for shipping according to manifests or orders.

Use of robotics in connection with shipping and receiving is made more challenging in many environments due to the variety of items, variations the order, number, and mix of items to be packed, on a given pallet or kit for example, and a variety of types and location of container and/or feed mechanism from which items must be picked up to be placed on the pallet or other container.

The deployment of robotics is burdensome in the foregoing contexts. Deployment may include assembly of a robot at the premises (e.g., the shipping and distribution centers, warehouses, shipping docks, air freight terminals, big box stores, etc.), the assembly of the workspace within which the robot is to operates, the calibration of the robot, the deployment and configuration of sensors, etc. Currently, deployment of a robot in a particular context takes on the order of forty-five days.

BRIEF DESCRIPTION OF THE DRAWINGS

Various embodiments of the invention are disclosed in the following detailed description and the accompanying drawings.

DETAILED DESCRIPTION

Figure 1A:
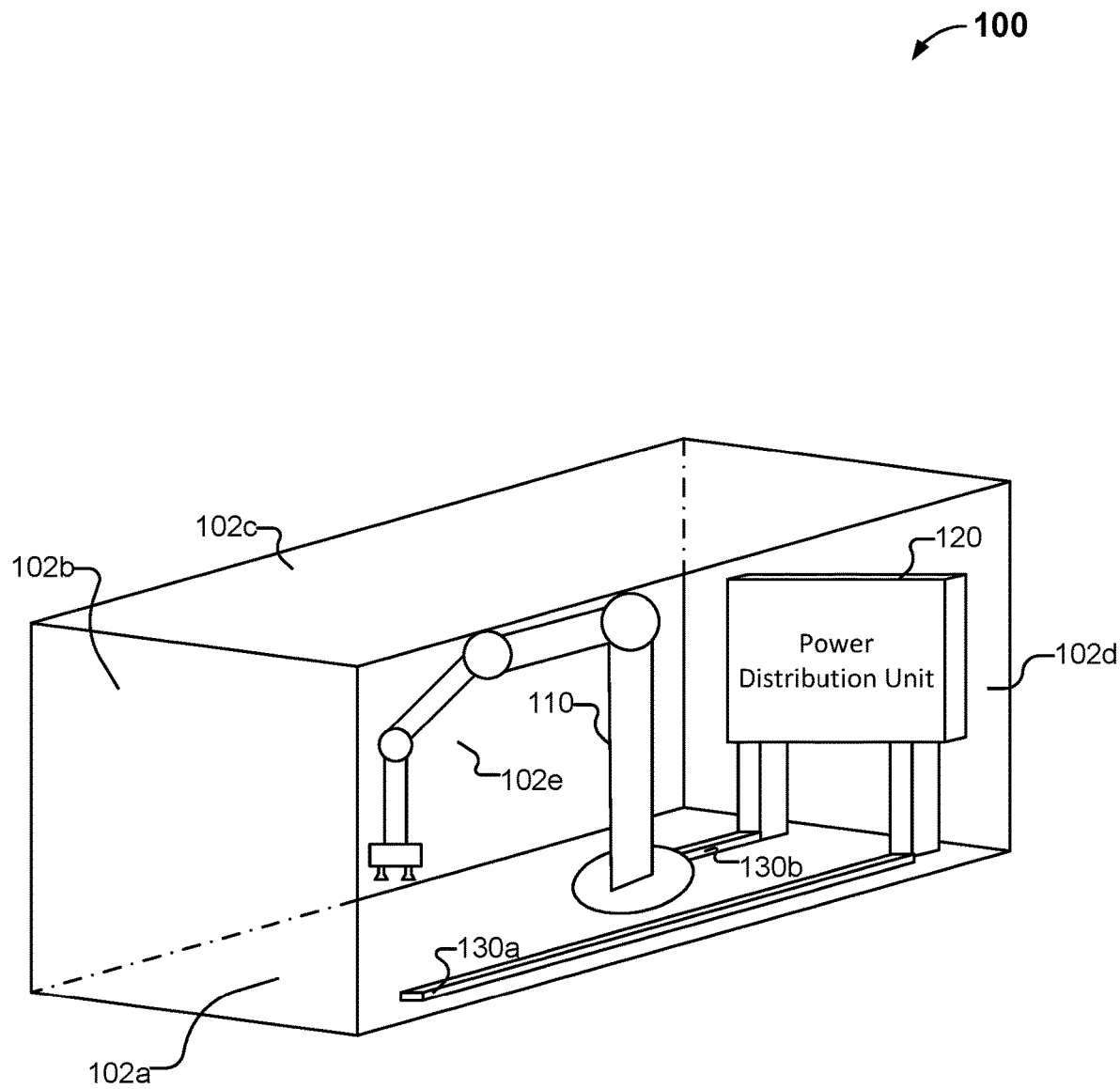
FIG. 1A is a diagram illustrating an embodiment of a containerized robotic system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

As used herein, "pallet" includes a platform, receptacle, or other container on, or in, which one or more items may be stacked or placed. Further, as used herein, the pallet may be used in connection with packaging and distributing a set of one or more items. As an example, the term pallet includes the typical flat transport structure that supports items and that is movable via a forklift, a pallet jack, a crane, etc. A pallet, as used herein, may be constructed of various metals including, wood, metals, metal alloys, polymers, etc.

As used herein, palletization of an item or a set of items includes picking an item from a source location, such as a conveyance structure, and placing the item on a pallet such as on a stack of items on the pallet.

As used herein, depalletization includes picking an item from a pallet, such as from a stack of items on the pallet, moving the item, and placing the item at a destination location such as a conveyance structure.

As used herein, singulation of an item includes picking an item from a source pile/flow and placing the item on a conveyance structure (e.g., a segmented conveyor or similar conveyance). Optionally, singulation may include sortation of the various items on the conveyance structure such as via singly placing the items from the source pile/flow into a slot or tray on the conveyor.

As used herein, kitting includes the picking of one or more items/objects from corresponding locations and placing the one or more items in a predetermined location in a manner that a set of the one or more items correspond to a kit.

"Kitting machines" or "kitting systems" and their integration into highly automated kitting operations are disclosed. In various embodiments, a kitting machine as disclosed herein comprises an at least partly robotically controlled unit that supplies and positions an item to facilitate the item being located, picked up, and/or positioned in and/or for packaging and/or shipment as part of a kitting operation. In various embodiments, a kitting machine as disclosed herein may comprise one or more kitting shelf machine modules, each comprising a modular component. A kitting shelf machine module as disclosed herein may comprise one or more shelves, bins, or other receptacles. In some embodiments, the shelves, bins, or other receptacles may be positioned via robotic control to position an item of pick up. A kitting shelf machine module+ as disclosed herein may be integrated with one or more other kitting shelf machine modules, one or more robotic arms, and/or other components to comprise an at least partly automated kitting system, capable of locating, selecting, and packing prescribed quantities of each of one or more arbitrary individual items, such as items included in an order, invoice, or similar data.

Various embodiments include a containerized robotic system that is deployable at a destination location, and that is pre-configured to perform a particular operation such as singulation, kitting, and/or palletization/de-palletization. The containerized robotic system may be easily deployed at the destination location with minimal installation, configuration, and/or calibration. Deployment of conventional robotic system is labor intensive and burdensome. For example, the deployment of conventional robotic systems generally requires a team of technicians and installation takes an extended time, often upwards of forty-five days. The deployment of a conventional robotic system generally requires a planning/configuring of a power system at the location at which the robotic system is to be installed, a determination of a plan as to how a delivered robotic system is to be lifted, a determination of plan of how to move the robotic system to the destination location, etc. Further, deployment of conventional robotic systems generally included a laborious task of configuring different robots with different software for the particular operation to be performed. A containerized robotic system according to various embodiments may in be deployed within a significantly reduced timeframe, such as in the order of forty-five minutes. Accordingly, the use of containerized robotic systems has significant associated cost savings and realized efficiencies (e.g., significantly less labor, coordination, time, etc. for deployment). In addition, deployment of a containerized robotic system does not require a significant technical expertise, which is generally required in connection with deployment of conventional robotic systems. In some embodiments, the containerized robotic system comprises a robotic system built using commodity parts/components.

According to various embodiments, the containerized robotic system is a self-contained robotic system. The containerized robotic system may comprise a power distribution unit, a robot (e.g., a robotic arm), and a compressor. The deployment of the containerized robotic system includes placing the containerized robotic system at the destination location (e.g., a designated location in a warehouse), and connecting power to a power distribution unit (PDU) comprised in the containerized robotic system. In response to the power being connected to the PDU of the containerized robotic system, the containerized robotic system may perform an operation such as singulation, kitting, and/or palletization/de-palletization. The containerized robotic system may be pre-configured to perform a designated operation. In some embodiments, the containerized robotic system is pre-configured based at least in part on one or more settings or characteristics associated with the destination location (e.g., a network setting of at network at the destination location, one or more identifiers or attributes associated with an item to be picked and placed by the robot, one or more identifiers or attributes associated with the workspace in which the robot is to be deployed, such as identifiers associated with a receptacle in which an item is to be placed, etc.). The containerized robotic system may be pre-configured before delivery of the containerized robotic system to the customer/the destination location.

In some embodiments, the containerized robotic system comprises a computer system. The computer system may comprise one or more computers such as server racks. In response to the containerized robotic system being connected to power at the destination location, the computer system may automatically perform an initialization. For example, the initialization may include booting the computer system, calibrating a robot (e.g., the robot comprised in the containerized robotic system), and/or calibrating one or more sensors in the workspace of the robot (e.g., sensor(s) installed at the destination location and/or sensor(s) comprised in the containerized robotic system). The initialization of the computer system/containerized robotic system may include verifying that one or more components of the system are functioning properly. For example, the initialization of the computer system/containerized robotic system may include verifying that the safety equipment (e.g., sensors, emergency stop, etc.) at the workspace are functioning correctly. The safety equipment may include a module at the destination location and/or a module comprised in the containerized robotic system. As another example, the initialization of the computer system/containerized robotic system may include verifying that one or more controllers in the system are functioning correctly. As another example, the initialization of the computer system/containerized robotic system may include validating inputs to the system (e.g., inputs from one or more sensors in the workspace such as sensor(s) installed at the destination location and/or sensors comprised in the containerized robotic system).

The computer system may be configured to detect a network at the destination location and/or connect to the network. For example, in response to the computer system booting up, the computer system may automatically connect to a network at the destination location. The network may be a wireless network and/or a wired network. However, the implementation of a wireless network may simplify deployment of the robotic system and reduce the number of physical connections to be made between the destination location and the containerized robotic system. The network settings for the network at the destination location may be pre-configured on the containerized robotic system (e.g., before delivery of the containerized robotic system to the destination location). In some implementations, networking connectivity may not be required. For example, in some kitting implementations such as rote kitting of one or more same sets of items, the robotic system may not need to communicate via a network in order to complete the kitting. However, in implementations in which more robust integration of one or more robots into the system, the computer system may connect to a network such as a wireless network at the destination location.

According to various embodiments, calibration of the containerized robotic system comprises the determining of a context of the containerized robotic system relative to the destination location. For example, a computer system may determine various relationships between the containerized robotic system and the destination location. The computer system may determine a location of the robot relative to one or more other components of the system such as a conveyor, one or more shelves, a chute, one or more sensors (e.g., sensor(s) installed at the destination location), etc. In connection with the calibration of the containerized robotic system, the computer system may generate a model of the workspace. The model may characterize the workspace, including locations (or relative locations) of the robot and various components of the system (e.g., components installed at the destination location and/or components comprised in the containerized robotic system). The model may also include a model of a vision system, including a characterization of the range or visibility of one or more sensors within the system. In some embodiments, the model includes a mapping of scanners to likelihood of a scanning or identifying of an item at a certain location. In some embodiments, the computer system may use the model in connection with determining locations within the workspace at which a likelihood that an item is identified (or that an attribute of an item, such as an identifier on the item, may be obtained) exceeds a predefined threshold, and/or determining a location at which identification of the item (or obtaining of the attribute of the item) may be maximized.

According to various embodiments, a container is configured with a work cell. For example, the work cell may be built/assembled to be comprised within a superstructure (e.g., a superstructure forming a container). The work cell may comprise a robot, a PDU, a compressor, a computer system, and/or one or more sensors, etc. In some implementations, the work cell includes one or more shelves such as a kitting shelf system. The work cell may be enclosed during shipment and positioning of the containerized robotic system at the destination location. Upon moving the containerized robotic system to the destination location, one or more sides of the container may be removed to reveal/expose the work cell. In response to the work cell being revealed/exposed, the work cell may be integrated with one or more components at the destination location. For example, the PDU may be connected to a local power of the destination location (e.g., a 3-phase outlet). As another example, the robot may in the work cell may interface with one or more components at the destination location such as a conveyor, a sensor, etc.

In some embodiments, the containerized robotic system comprises a base on which a robot is securely mounted. The base may be relatively large steel plate such as a plate having dimensions 20 feet×8 feet, 40 feet×8 feet, etc. A base may be implemented using various other dimensions. The base may have a sufficient weight such that the robot is securely held in position. The secure mounting of the robot to the base and the installation of the base at the destination location eliminates the laborious task of unpacking a conventional robot, moving the robot to a destination location, and bolting the robot in place at the destination location. The base may have sufficient rigidity and strength to withstand shipping/transport. According to various embodiments, the base forms a bottom/floor of a container that is used to ship the containerized robotic system. For example, a bottom of the base may form a side of a shipping container enclosing the work cell.

According to various embodiments, the containerized robotic system comprises a base and one or more removable sides. The one or more removable sides may be comprised in a detachable superstructure that is removably connected to the base. For example, the detachable superstructure configured to be removably connected to the base to define an enclosed space of sufficient size to accommodate at least a robot and a compressor. The detachable superstructure and the base may have sufficient rigidity and strength to withstand shipping/transport. The containerized robotic system may have dimensions of 20 feet×8 feet×8.5 feet, or 40 feet×8 feet×8.5 feet, etc. when the detachable superstructure is connected to the base. In some embodiments, the detachable superstructure may be connected to the base such that containerized robotic system has exterior dimensions substantially equal to dimensions of standard shipping containers. The design/manufacture of a containerized robotic system having sufficient rigidity and/or strength, and dimensions of a standard shipping container, allow the containerized robotic system to more efficiently be transported to a destination location compared to conventional robotic systems that must be packaged such as in non-standard sizes/packages that are then transported. In some embodiments, the dimensions of the containerized robotic system are smaller than a standard shipping container but easily placed within a shipping container such as via forklift. The sides (e.g., the base and/or the detachable superstructure) may be made from steel, aluminum, fiber-reinforced polymers, or a combination of any of the foregoing. For example, a frame or side of the containerized robotic system may be made from "weathering steel" or Corten steel. One or more of the sides may be welded to a frame of the containerized robotic system, or to another side of the containerized robotic system, or both. In some embodiments, one or more sides of the containerized robotic system comprise corrugated steel. For example, a side of the containerized robotic system may comprise a corrugated steel panel. As another example, a side of the containerized robotic system may comprise a corrugated steel panel welded to a steel tubing such as a square or rectangular tubing. In some embodiments, one or more sides of the containerized robotic system are detachable from the containerized robotic system (e.g., from the base, a frame, and/or another side). For example, a side may be bolted to the base the containerized robotic system, a frame, and/or another side, etc. Another fastening mechanism may be used to detachably connect a side to the containerized robotic system.

According to various embodiments, one or more components within the containerized robotic system are pre-connected. For example, the one or more components are connected before transport of the containerized robotic system to the destination location. The containerized robotic system may include one or more channels via which one or more components within the containerized robotic system are pre-connected. As an example, the one or more channels may be formed within the base and/or connected to the base. As another example, the one or more channels are formed within, or attached to, a side panel of the containerized robotic system. The connection between the one or more components may include power connectivity, pneumatic connectivity, etc. For example, in some implementations, the containerized robotic system comprises a robot and a compressor, and the robot is connected to the compressor using one or more air lines, and the air lines may be carried in the one or more channels. The connection of the compressor to the robot may allow the robot to use a suction-based end effector to grasp an item, etc. As another example, in some implementations, the containerized robotic system comprises a power unit such as a PDU, and a robot and/or a compressor may be pre-connected to the power unit. The various wires connecting a component to the power unit may be carried through the one or more channels. Accordingly, when the containerized robotic system is placed at the destination location, the one or more components within the containerized robotic system (e.g., the one or more components of the work cell) may be powered in response to power being connected to the power unit. In some embodiments, the one or more components comprises one or more of a robot (e.g., a robotic arm), a compressor, a PDU, one or more sensors, a computer system (e.g., a server(s)), a conveyor, a box assembly module, etc. As another example, the containerized robotic system comprises a computer system, and one or more connections (e.g., a network connection) between the computer system and the other components (e.g., robot, compressor, etc.) are pre-connected.

In some embodiments, the containerized robotic system comprises one or more sensors. The one or more sensors may be pre-calibrated (e.g., calibrated before delivery of the containerized robotic system to the destination location). The one or more sensors may be mounted to a part of the containerized robotic system, such as the base, a side panel, a robot within the containerized robotic system, etc. In some implementations, at least one sensor is mounted to a sensor superstructure. The sensor superstructure may be at least partially mounted to one or more points of the containerized robotic system. For example, the sensor superstructure may be mounted at n points of the base, n being a positive integer. The sensor superstructure may be oriented in a folded or collapsed orientation when the containerized robotic system is enclosed (e.g., when at least part of the detachable superstructure is mounted to the base). The deployment of the containerized robotic system may include expanding the sensor superstructure to a deployed orientation. The sensor superstructure may comprise a rigid mounting that maintains a location of the one or more sensors when deployed (e.g., prevents the one or more sensors from vibrating, moving, etc.). The deployed orientation may be preconfigured based at least in part on a workspace of the robot when the containerized robotic system is deployed. In some embodiments, the deployed orientation is further configured based at least in part on one or more of an operation that the robot is to perform when deployed (e.g., singulation, kitting, palletization/de-palletization, etc.), an environment in which the containerized robotic system is deployed, a location of one or more sensors at the destination location, a type of information that at least one sensor is to obtain (e.g., scanning barcodes on packages, obtaining a view of a set of items on a kitting shelf, etc.), etc. Deployment of the containerized robotic system may include expanding the sensor superstructure to a deployed orientation and mounting the sensor superstructure at m points in the environment of the destination location, m being a positive integer. For example, the sensor superstructure may be mounted at n points to the containerized robotic system (e.g., the base, a sidewall, etc.) and mounted at m points to the environment in the destination location (e.g., a wall at the destination location, a floor of the destination location, a conveyor, a rack or shelf system, etc.). The sensor superstructure may include a mechanism that holds the sensor superstructure in the deployed orientation in the absence of manual intervention. For example, the sensor superstructure may include a locking mechanism that causes/permits a part of the sensor superstructure to snap or lock in place when the sensor superstructure is deployed to the deployed orientation. In some implementations, a sensor such as a camera is mounted to an articulating mount that permits the camera to be snapped into a place/orientation so as to be oriented in a deployed orientation.

The pre-calibration of the one or more sensors may be based on an expected orientation of the one or more sensors when deployed to the deployment orientation. An initialization process that is performed when the containerized robotic system is deployed may include initializing the one or more sensors and confirming that the one or more sensors in the deployed orientation are properly configured/calibrated. In some embodiments, the containerized robotic system is preconfigured so that the robotic system has substantial knowledge of the workspace, such as relative locations of various objects/components in the containerized robotic system, a sensor range of various sensors in the containerized robotic system, a probability of success that an attribute of an item is determined at various locations (e.g., at a certain distance from a sensor), a probability of success that an item is grasped by the robot at various locations, etc.

The one or more sensors may include an image system such as a 2D/3D camera, 3D cameras, force sensors, a radar sensor, a Light Detection and Ranging (LIDAR) sensor, a laser sensor, an infrared sensor, a sensor array, a weight sensor, and other sensors, etc. The one or more sensors may be configured to obtain information pertaining to the workspace of the robot (e.g., when deployed), and/or information pertaining to an item in the workspace, such as an item grasped (or to be grasped) by the robot. In some embodiments, the information pertaining to the item include one or more attributes of the item such as a size, a weight, a shape, a type of packaging, a rigidity of the item/packaging, an identifier on the item (e.g., a label, a bar code, an indication that the item is fragile, an indication that the item is to be held a certain way up), etc. The one or more sensors may obtain information from which a location of one or more objects or users in the environment in which the robot is deployed (e.g., within the workspace) may be determined, and/or proximity of a user/object that may collide with the robot may be determined. When the sensors are deployed, the sensors may obtain information (e.g., sensor data) and provide such information to a computer system, such as a computer system included in the containerized robotic system.

FIG. 1A is a diagram illustrating an embodiment of a containerized robotic system.

A containerized robotic system 100 is disclosed. According to various embodiments, the containerized robotic system 100 comprises a robot that is pre-configured to perform one or more operations, such as upon deployment of the containerized robotic system 100 to the destination location. Containerized robotic system 100 may include one or more components that are pre-assembled and/or pre-configured in order to minimize the time required for installation/deployment of the components. The one or more components may be enclosed within a superstructure to facilitate transport of the containerized robotic system 100 to the destination location. As illustrated in FIG. 1A, containerized robotic system 100 may have a size and/or shape of a standard shipping container when the superstructure enclosing the one or more components is in a closed position.

In some embodiments, the containerized robotic system 100 comprises a base and one or more removable sides. The one or more removable sides may be comprised in a detachable superstructure that is removably connected to the base. For example, the detachable superstructure configured to be removably connected to the base to define an enclosed space of sufficient size to accommodate at least a robot and a compressor. The detachable superstructure and the base may have sufficient rigidity and strength to withstand shipping/transport. The containerized robotic system may have dimensions of 20 feet×8 feet×8.5 feet, or 40 feet×8 feet×8.5 feet, etc. when the detachable superstructure is connected to the base. In some embodiments, the detachable superstructure may be connected to the base such that containerized robotic system 100 has exterior dimensions substantially equal to dimensions of standard shipping containers. The design/manufacture of a containerized robotic system having sufficient rigidity and/or strength, and dimensions of a standard shipping container, allow the containerized robotic system to more efficiently be transported to a destination location compared to conventional robotic systems, which must be packaged such as in non-standard sizes/packages that are then transported. In some embodiments, the dimensions of the containerized robotic system are smaller than a standard shipping container but easily placed within a shipping container such as via forklift.

In the example illustrated in FIG. 1A, a side of containerized robotic system 100 is removed to expose components enclosed by the superstructure. Deployment of the containerized robotic system 100 may include placing the containerized robotic system 100 at a destination location and removing one or more sides (e.g., removing the superstructure removably connected to the base 102a). A detachable superstructure removably connected to base 102a may include side 102b (e.g., a left side), side 102c (e.g., a top side), side 102d (e.g., a right side), side 102e (e.g., a back side), and a front side (not shown—FIG. 1A illustrates containerized robotic system 100 with such side removed). In some embodiments, one or more sides of the containerized robotic system 100 remain (e.g., are not removed) when the containerized robotic system 100 is deployed. For example, one or more components enclosed within the detachable superstructure may be mounted to a side of the containerized robotic system 100. In the example illustrated in FIG. 1A, the power distribution unit 120 is mounted to side 102d, and thus side 102d may be used when the containerized robotic system 100 is deployed.

As illustrated in FIG. 1A, containerized robotic system 100 comprises a robot 110 (e.g., a robotic arm) and the power distribution unit 120. The power distribution unit 120 may provide and/or regulate power for the various components within containerized robotic system 100. For example, the power distribution unit 120 may be a centralized power source for the containerized robotic system 100 such that connection of the power distribution unit 120 to a power source (e.g., an outlet at the destination location) enables the containerized robotic system 100 to provide power to the components therein. Components within containerized robotic system 100 may be mounted to base 102a and/or a side such as side 102d. Mounting a component to base 102a or a side may ensure that the component is secure during transport and/or to facilitate and easy and efficient deployment of the containerized robotic system 100. For example, because a component is mounted to the containerized robotic system 100, installation of various components and fixing the components within the workspace in which a robot is to operate at the destination location is minimized. Further, the mounting of a component within containerized robotic system 100 further improves the ability for the robot/computer system to be pre-configured (e.g., configured before deployment at the destination location). For example, the mounting of a component to a specific location within the containerized robotic system 100 allows the computer system to map the component to the relative location of the robot to facilitate the determining of a plan/strategy for operating the robot (e.g., the computer system will know in advance that a component occupies a certain area such that the robot may be controlled to avoid collision of the component, or controlled to move an item to such area for an attribute of the item to be determined).

In various embodiments, containerized robotic system 100 comprises one or more channels via which connections for componentry may be disposed. For example, power cables, network cables, tubing for transport of liquids, etc. may be run through the one or more channels. In the example illustrated in FIG. 1A, containerized robotic system 100 includes channel 130a and channel 130b. A power connection between robot 110 and power distribution unit 120 may be encased in channel 130b. For example, power may be connected from power distribution unit 120 to robot 110 to drive the robot (e.g., one or more motors, sensors, etc. of robot). Channel 130a and/or channel 130b may be used in connection with distributing power to one or more other components in the workspace when containerized robotic system 100 is deployed.

As illustrated in FIG. 1A, robot 110 may oriented fit within the dimensions of the detachable superstructure. After deployment of the containerized robotic system 100, components within the containerized robotic system 100 may be oriented in a deployed state. For example, robot 110 may extend to operate beyond the confines of the detachable superstructure (e.g., to pick/place items on locations such as conveyors or shelves at the destination location).

In some embodiments, a base of robot 110 is mounted to containerized robotic system 100. For example, as illustrated in FIG. 1A, robot 110 may have a base that is mounted to base 102a such that robot 110 has a fixed position. In some implementations, robot 110 is mounted to a base (e.g., a carriage) that is attached to a guide rail such that robot 110 traverses guide rail to move within the workspace (e.g., to increase a degree of freedom of robot 110, to increase the range of robot 110, etc.). The guide rails may be mounted in containerized robotic system 100 (e.g., to base 102a, etc.).

Figure 1B:
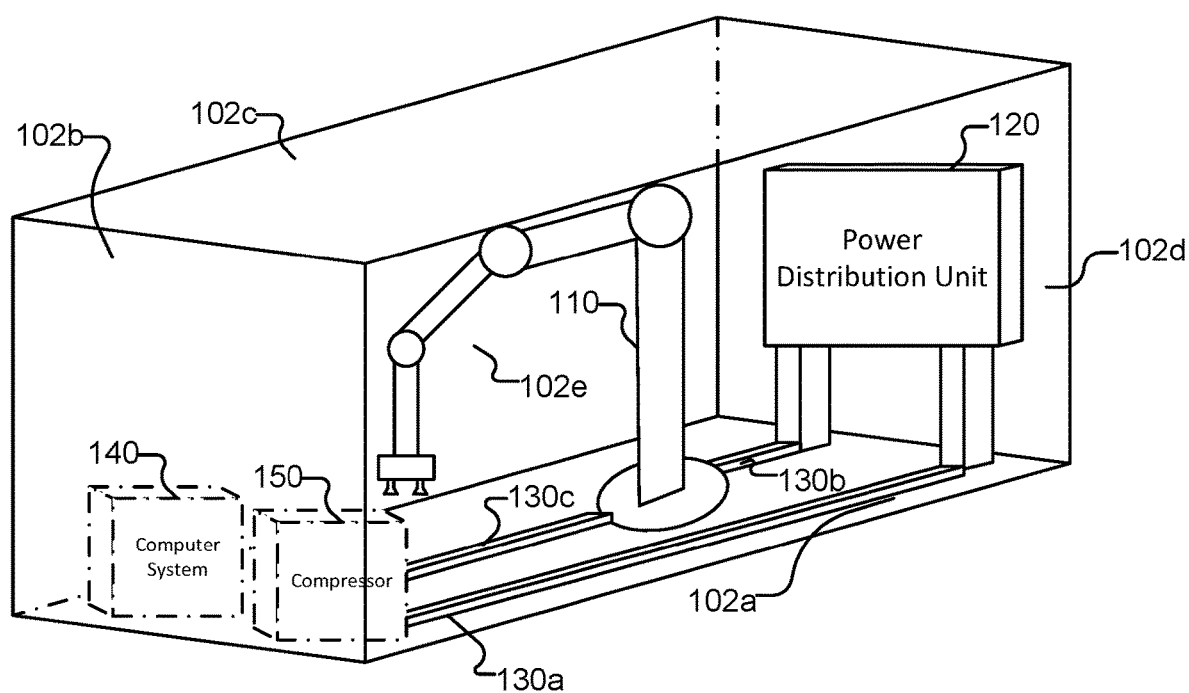
FIG. 1B is a diagram illustrating an embodiment of a containerized robotic system.

FIG. 1B is a diagram illustrating an embodiment of a containerized robotic system. In the example illustrated in FIG. 1B, containerized robotic system 100 may include computer system 140 and/or compressor 150. Containerized robotic system 100 may further include channel 130c so as, for example, to connect computer system 140 to power distribution unit 120, and/or to provide a connection with between computer system 140 and robot 110 such as a network connection, etc.

In some embodiments, computer system 140 controls robot 110 and/or other components within containerized robotic system 100. Computer system 140 may be connected to components within containerized robotic system 100 and/or the destination location. For example, computer system 140 may be connected to one or more sensors deployed in within the workspace, and computer system 140 may receive information obtained by the one or more sensors deployed within the workspace. Computer system 140 may generate a model of the workspace based at least in part on the information received from the one or more sensors. In some embodiments, computer system 140 determines a plan or strategy for controlling robot 110 to perform one or more operations (e.g., picking/placing an item such as in connection with singulating, kitting, or palletizing the item).

Computer system 140 may be pre-configured before transport of containerized robotic system 100 to the destination location. For example, one or more software applications may be loaded onto computer system 140. The one or more software applications selected to be loaded/deployed on computer system 140 may be determined based on the destination location, an operation that robot 110 is to perform (e.g., singulation, kitting, palletizing, de-palletizing, etc.). In some embodiments, the pre-configuring computer system 140 includes pre-setting/defining relative locations of various components within the workspace, such as locations of robot 110, power distribution unit 120, compressor 150, computer system 140, one or more sensors, a conveyor, a receptacle, a shelf system, a chute, etc.

In some embodiments, computer system 140 may comprise one or more computers such as server racks. In response to containerized robotic system 100 being connected to power at the destination location, computer system 140 may automatically perform an initialization. For example, the initialization may include booting computer system 140, calibrating robot 110, and/or calibrating one or more sensors in the workspace of the robot (e.g., sensor(s) installed at the destination location and/or sensor(s) comprised in the containerized robotic system such as sensor 170a and/or sensor 170b of FIG. 1C). The initialization of computer system 140 and/or containerized robotic system 100 may include verifying that one or more components of the system are functioning properly. As an example, an application or executable code may be run on computer system 140 to perform a diagnostics process to verify proper functioning of one or more components of containerized robotic system 100 and/or one or more components at the destination location. For example, the initialization of the computer system/containerized robotic system may include verifying that the safety equipment (e.g., sensors, emergency stop, etc.) at the workspace are functioning correctly. The safety equipment may include a module at the destination location and/or a module comprised in the containerized robotic system. As another example, the initialization of computer system 140 and/or containerized robotic system 100 may include verifying that one or more controllers in the system are functioning correctly. As another example, the initialization of computer system 140 and/or containerized robotic system 100 may include validating inputs to the system (e.g., inputs from one or more sensors in the workspace such as sensor(s) installed at the destination location and/or sensors comprised in containerized robotic system 100).

Computer system 140 may be configured to detect a network at the destination location and/or connect to the network. For example, in response to containerized robotic system 100 booting up, containerized robotic system 100 may automatically connect to a network at the destination location. The network may be a wireless network and/or a wired network. The use of a wireless network may simplify deployment of containerized robotic system 100 and reduce the number of physical connections to be made between the destination location and containerized robotic system 100. The network settings for the network at the destination location may be pre-configured on containerized robotic system 100 (e.g., before delivery of containerized robotic system 100 to the destination location). In some implementations, networking connectivity may not be required. For example, in some kitting implementations such as kitting of one or more same sets of items, containerized robotic system 100 may not need to communicate via a network in order to complete the kitting operation. However, in implementations in which more robust integration of one or more robots into the system, computer system 140 may connect to a network such as a wireless network at the destination location.

Robot 110 may include an end effector. In various embodiments, the end effector may be actuated by one or more of suction, air pressure, pneumatics, hydraulics, or other actuation. According to various embodiments, compressor 150 is used in connection with actuating an end effector of robot 110. Compressor 150 may provide gas/air to one or more components within containerized robotic system 100. For example, compressor 150 may be implemented in connection with a pneumatic controls of robot 110. Compressor 150 may be connected to power distribution unit 120 via channel 130a. Compressor 150 may also be connected to robot 110 such as via channel 130c. For example, tubing (e.g., airline) may connect robot 110 and compressor 150 via channel 130c. In some embodiments, the air lines are connected to robot 110 before transport of containerized robotic system 100 to the destination location. In some implementations, one or more air lines are run from compressor 150 to robot 110 and/or one or more other components in containerized robotic system 100 before transport of containerized robotic system 100 to the destination location, and the air lines are connected to the corresponding components during deployment of containerized robotic system 100 (e.g., a final connection is made at the destination location during installation of containerized robotic system 100).

Figure 1C:
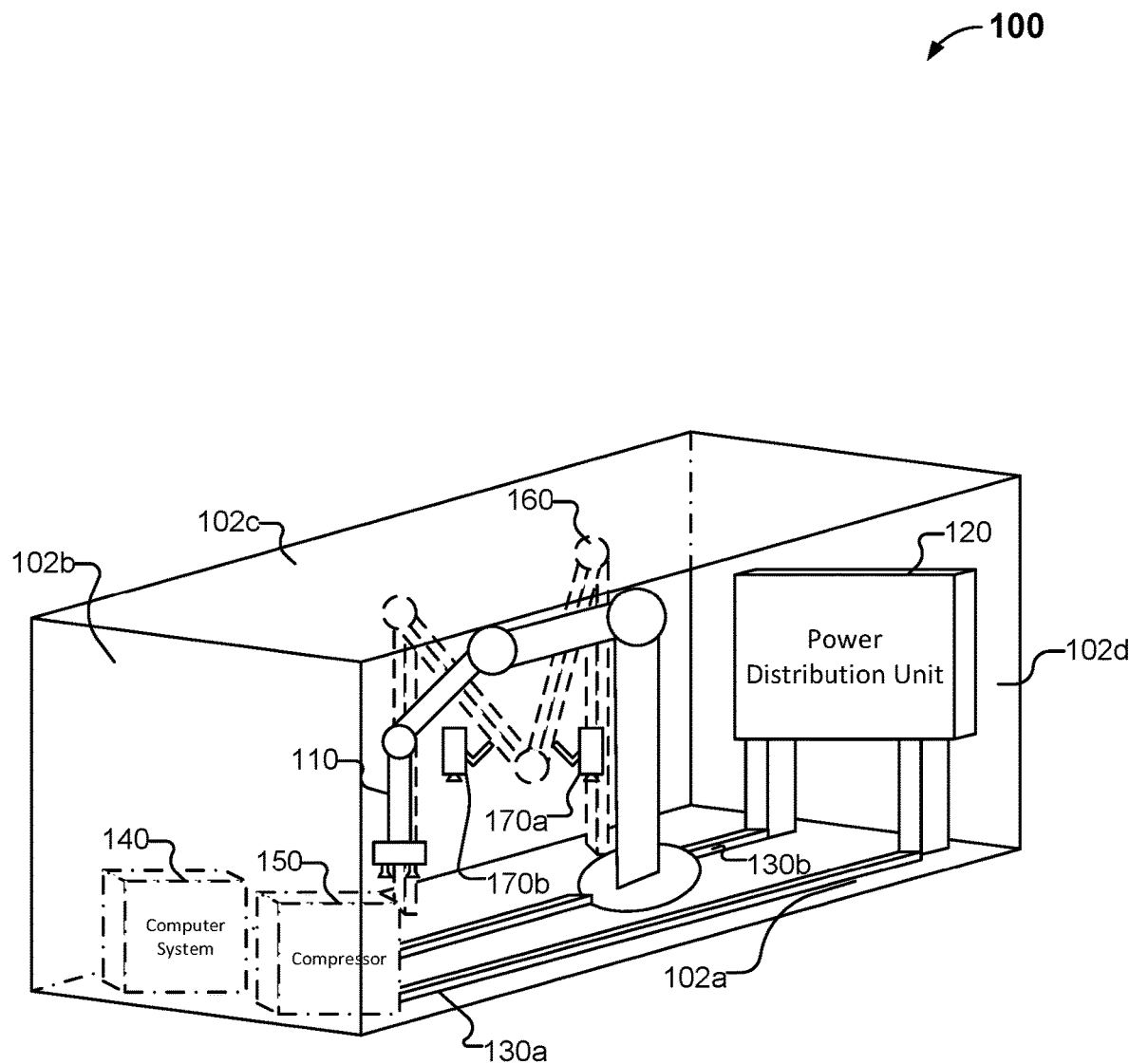
FIG. 1C is a diagram illustrating an embodiment of a containerized robotic system.

FIG. 1C is a diagram illustrating an embodiment of a containerized robotic system. In some embodiments, as illustrated in the example of FIG. 1C, containerized robotic system 100 comprises one or more sensors, such as sensor 170a and/or sensor 170b. The one or more sensors may include an image system such as a 2D/3D camera, 3D cameras, force sensors, a radar sensor, a Light Detection and Ranging (LIDAR) sensor, a laser sensor, an infrared sensor, a sensor array, a weight sensor, and other sensors, etc.

As illustrated in FIG. 1C, sensor 170a and/or sensor 170b may be mounted within containerized robotic system 100. The one or more sensors may be mounted to a part of the containerized robotic system 100, such as the base, a side panel, a robot within the containerized robotic system, a sensor superstructure, etc. In the example illustrated in FIG. 1C, sensor 170a and/or sensor 170b are mounted to sensor superstructure 160. Sensor superstructure 160 may be at least partially mounted to one or more points of containerized robotic system 100. For example, the sensor superstructure may be mounted at n points of the base, n being a positive integer. In the illustrated example, sensor superstructure 160 is mounted to base 102a. The one or more sensors may be mounted in the position/orientation according to which the one or more sensors will be used when containerized robotic system 100 is deployed. In some embodiments, the one or more sensors are respectively mounted in a collapsed orientation and the one or more sensors are re-oriented to a deployed orientation in connection with the deployment of containerized robotic system 100. The deployed orientation may correspond to an orientation or configuration according to which the one or more sensors will operate during operation of containerized robotic system 100 (e.g., a robot). The positioning of the one or more sensors in a collapsed orientation may facilitate transport of the containerized robotic system 100, such as reducing the size of the detachable superstructure of the containerized robotic system 100 required to enclose containerized robotic system 100. The deployed orientation of a sensor may be preset/pre-configured such that a position and area or range of vision of the sensor upon deployment of containerized robotic system 100 is predetermined before deployment of containerized robotic system 100. In some embodiments, one or more sensor superstructures to which the one or more sensors are mounted may snap into a position such that the one or more sensors are held in a deployed orientation upon deployment of containerized robotic system 100.

As illustrated in FIG. 1C, the sensor superstructure 160 may be oriented in a folded or collapsed orientation when the containerized robotic system is enclosed (e.g., when at least part of the detachable superstructure is mounted to the base). The deployment of containerized robotic system 100 may include expanding the sensor superstructure 160 to a deployed orientation. The sensor superstructure 160 may comprise a rigid mounting that maintains a location of the one or more sensors when deployed (e.g., prevents the one or more sensors from vibrating, moving, etc.). The deployed orientation may be preconfigured based at least in part on a workspace of the robot when containerized robotic system 100 is deployed. In some embodiments, the deployed orientation is further configured based at least in part on one or more of an operation that robot 110 is to perform when deployed (e.g., singulation, kitting, palletization/de-palletization, etc.), an environment in which containerized robotic system 100 is deployed, a location of one or more sensors at the destination location, a type of information that at least one sensor is to obtain (e.g., scanning barcodes on packages, obtaining a view of a set of items on a kitting shelf, etc.), etc. Deployment of containerized robotic system 100 may include expanding the sensor superstructure to a deployed orientation and mounting the sensor superstructure at m points in the environment of the destination location, m being a positive integer. For example, the sensor superstructure 160 may be mounted at n points to containerized robotic system 100 (e.g., the base 102a, a sidewall such as side 102d, etc.) and mounted at m points to the environment in the destination location (e.g., a wall at the destination location, a floor of the destination location, a conveyor, a rack or shelf system, etc.). The sensor superstructure 160 may include a mechanism that holds the sensor superstructure 160 in the deployed orientation in the absence of manual intervention. For example, the sensor superstructure may include a locking mechanism that causes/permits a part of the sensor superstructure 160 to snap or lock in place when the sensor superstructure 160 is deployed to the deployed orientation. In some implementations, the sensor superstructure 160 may be biased to the deployed orientation when containerized robotic system 100 is deployed (e.g., when the detachable superstructure is removed). In some implementations, a sensor such as a camera is mounted to an articulating mount that permits the camera to be snapped into a place/orientation so as to be oriented in a deployed orientation.

The one or more sensors, such as sensor 170a and/or sensor 170b, may be connected to computer system 140. During operation of containerized robotic system 100 (e.g., after deployment of such), the one or more sensors may obtain sensor data such as information pertaining to one or more of the workspace, robot 110, an item within workspace, an item grasped by robot 110, power distribution unit 120, compressor 150, a conveyor, etc. The one or more sensors may provide the sensor data to computer system 140, which uses the sensor data in connection with operating robot 110 otherwise controlling one or more components within the workspace (e.g., a conveyor, a kitting shelf, etc.).

The one or more sensors may be pre-calibrated (e.g., calibrated before delivery of containerized robotic system 100 to the destination location). The pre-calibration of the one or more sensors may be based on an expected orientation of the one or more sensors when deployed to the deployment orientation. An initialization process that is performed when the containerized robotic system is deployed may include initializing the one or more sensors and confirming that the one or more sensors in the deployed orientation are properly configured/calibrated. In some embodiments, containerized robotic system 100 is preconfigured so that the robotic system (e.g., computer system 140) has substantial knowledge of the workspace, such as relative locations of various objects/components in the containerized robotic system, a sensor range of various sensors in the containerized robotic system, a probability of success that an attribute of an item is determined at various locations (e.g., at a certain distance from a sensor), a probability of success that an item is grasped by the robot at various locations, etc.

The one or more sensors may be configured to obtain information pertaining to the workspace of the robot (e.g., when deployed), and/or information pertaining to an item in the workspace, such as an item grasped (or to be grasped) by the robot. In some embodiments, the information pertaining to the item include one or more attributes of the item such as a size, a weight, a shape, a type of packaging, a rigidity of the item/packaging, an identifier on the item (e.g., a label, a bar code, an indication that the item is fragile, an indication that the item is to be held a certain way up), etc. The one or more sensors may obtain information from which a location of one or more objects or users in the environment in which the robot is deployed (e.g., within the workspace) may be determined, and/or proximity of a user/object that may collide with the robot may be determined. The one or more sensors may obtain information pertaining to one or more components in the workspace, such as a speed of a conveyor, a direction of a conveyor, an identifier of a segment on the conveyor, etc.

Figure 1D:
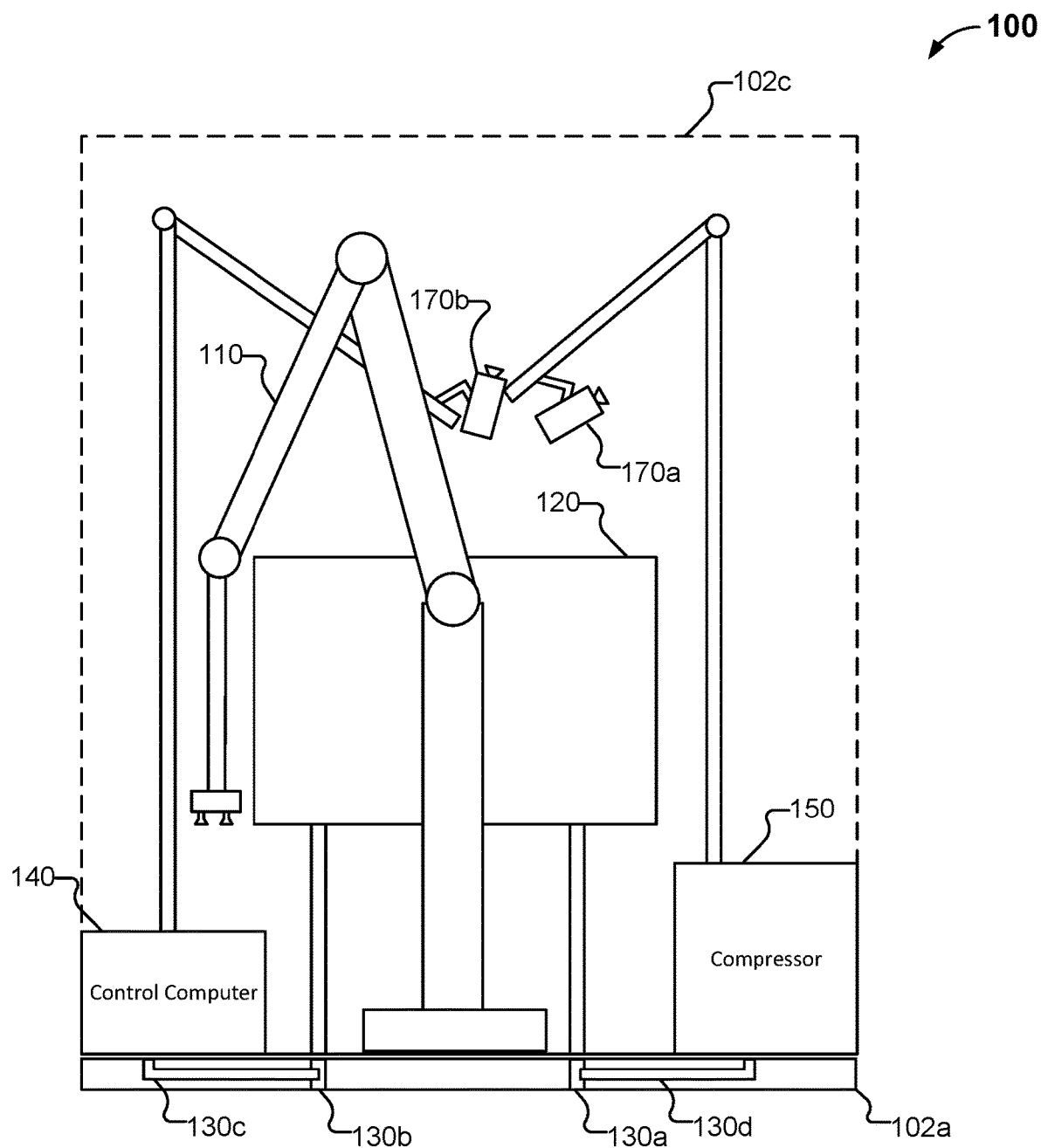
FIG. 1D is a diagram illustrating an embodiment of a containerized robotic system.

FIG. 1D is a diagram illustrating an embodiment of a containerized robotic system. In the example illustrated in FIG. 1D, containerized robotic system 100 comprises one or more channels such as channel 130a and/or channel 130b. A power connection (e.g., a wire) may be distributed via channel 130a and/or channel 130b. For example, channel 130a and/or channel 130b may run the length of the containerized robotic system. Containerized robotic system 100 may comprise one or more channels such as channel 130c and/or channel 130d.

In some implementations, the channels may have different dimensions such as width and/or height. For example, channels 130a and/or channel 130b may have a greater cross section than channel 130c and/or channel 130d. Channels 130a and/or channel 130b may be a primary channel such as an artery of connections distributed throughout containerized robotic system. Channel 130c and/or channel 130d may be a secondary channel. For example, channel 130c and/or channel 130d may carry connections to/from one component or a few number of components than the number of connections for which channels 130a and/or channel 130b carry connections.

According to various embodiments, one or more channels are integrated into the base 102a. For example, as illustrated in FIG. 1D, channels 130a, 130b, 130c, and 130d are formed or comprised within a wall of base 102a.

Figure 2A:
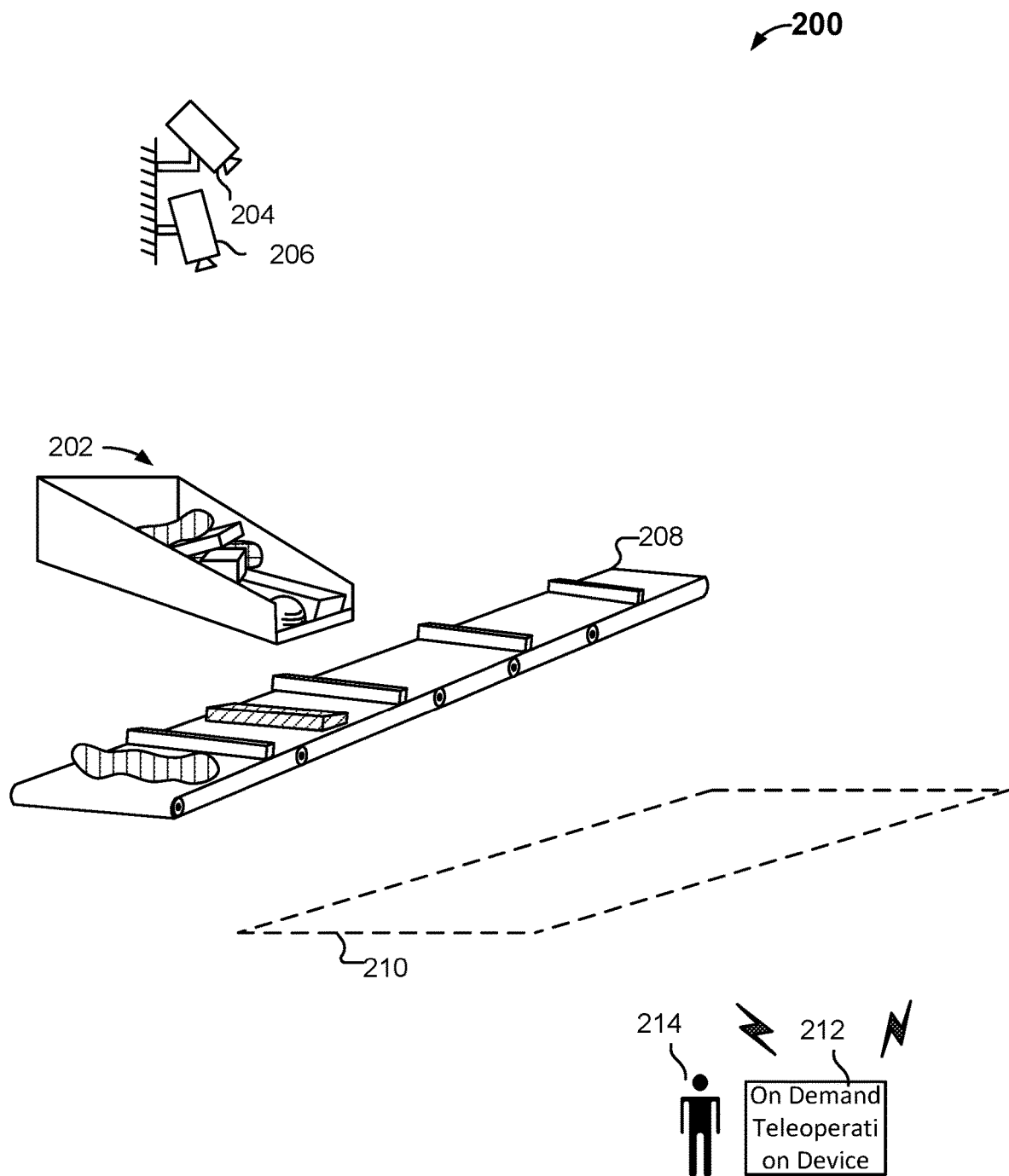
FIG. 2A is a diagram illustrating an embodiment of a workspace in which a robotic system is to be deployed in connection with singulating an item.

FIG. 2A is a diagram illustrating an embodiment of a workspace in which a robotic system is to be deployed in connection with singulating an item.

According to various embodiments, a containerized robotic system may be used in connection with a system for singulating one or more items. The containerized robotic system may be deployed at a destination location that is configured (or partly configured) to perform singulation of one or more items. For example, the destination location may comprise one or more components used in robotic singulation system 200 for singulating one or more items. As illustrated in FIG. 2A, the destination location may comprise chute 202, camera 204 (e.g., a camera or sensor, etc.), camera 206 (e.g., a camera or sensor, etc.), conveyor 208, and a teleoperation device 212 (e.g., an on-demand teleoperation device) usable by a human operator 214 to operate one or more of components of robotic singulation system 200 (e.g., a robotic arm in the containerized robotic system, an end effector, and conveyor 208) by teleoperation.

In some embodiments, a location 210 at which a containerized robotic system is to be deployed is determined. The location 210 may be determined based on a location of one or more other components in the environment (e.g., workspace) in which the containerized robotic system is to be deployed, and/or one or more capabilities of the containerized robotic system. As an example, the location 210 may be determined based on a size and/or range of a robot of the containerized robotic system. As another example, the location 210 may be determined based on a location of the chute 202 and/or conveyor 208. Location 210 may be identified manually such as by a physical marking on a ground at the destination location, such as via the use of paint. In some embodiments, the location 210 is identified using a laser or other projected information at location. For example, a laser or other projector may be mounted at the destination location, such as on chute 202, conveyor 208, a wall of destination location, etc. The location 210 may be marked via a projection of a reference point such as a line denoting a side of the containerized robotic system, a point denoting a corner of the containerized robotic system, an outline of a circumference of the containerized robotic system, etc.

Figure 2B:
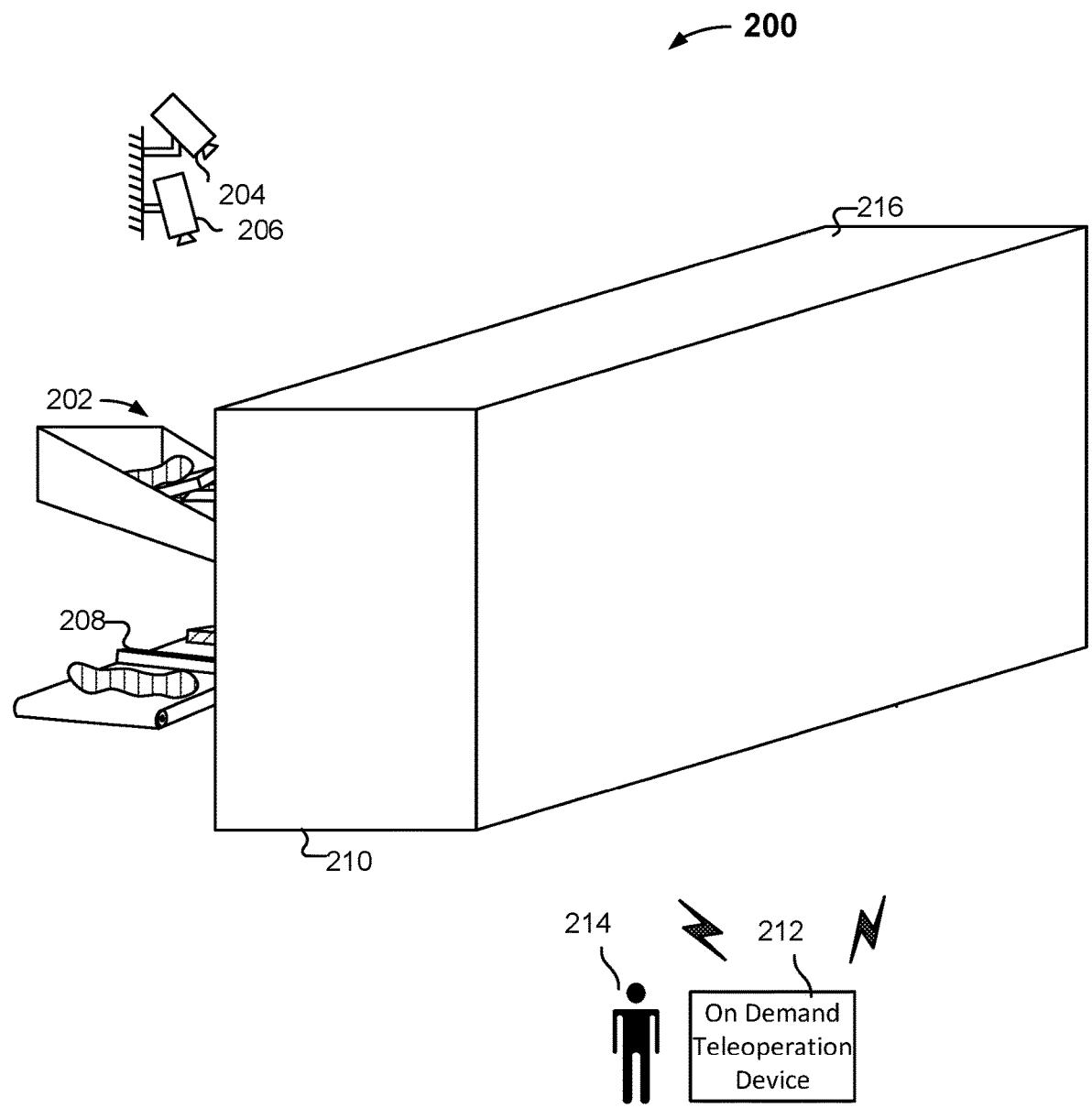
FIG. 2B is a diagram illustrating an embodiment of a workspace in which a robotic system is to be deployed in connection with singulating an item.

FIG. 2B is a diagram illustrating an embodiment of a workspace in which a robotic system is to be deployed in connection with singulating an item. As illustrated in the example of FIG. 2B, containerized robotic system 216 is placed at location 210 of the destination location. Containerized robotic system 216 may be moved to location 210 using a forklift or crane (e.g., an overhead crane at the destination location), etc.

According to various embodiments, the relative case with which containerized robotic system 216 may be moved to/from location 210 limits the resources (e.g., labor, time, etc.) required to deploy containerized robotic system 216 and/or to replace a containerized robotic system. In conventional systems, if a robot required replacement, the removal of the existing robot and installation of a new robot was cumbersome and required significant resources. For example, robots of conventional systems are mounted directly to the floor of the destination location, and the de-mounting of such a robot is time and labor intensive. As another example, a robot of conventional system generally has a relatively irregular shape and center of gravity thereby complicating the removal of such a robot. In contrast, a containerized robotic system according to various embodiments may be relatively easily and quickly removed such as via forklift, crane, etc. The de-installation/removal of the containerized robotic system may include attaching the detachable superstructure to the base of the containerized robotic system, and moving the containerized robotic system from location 210. A replacement containerized robotic system may be relatively easily moved into position (e.g., to location 210) and deployed by removing the corresponding detachable superstructure, etc.

Containerized robotic system 216 is sufficiently rigid and heavy that installation of containerized robotic system 216 includes placing the containerized robotic system 216 at location 210. According to various embodiments, installation and/or deployment containerized robotic system 216 does not otherwise require containerized robotic system 216 to be mounted or fixed to destination location.

Figure 2C:
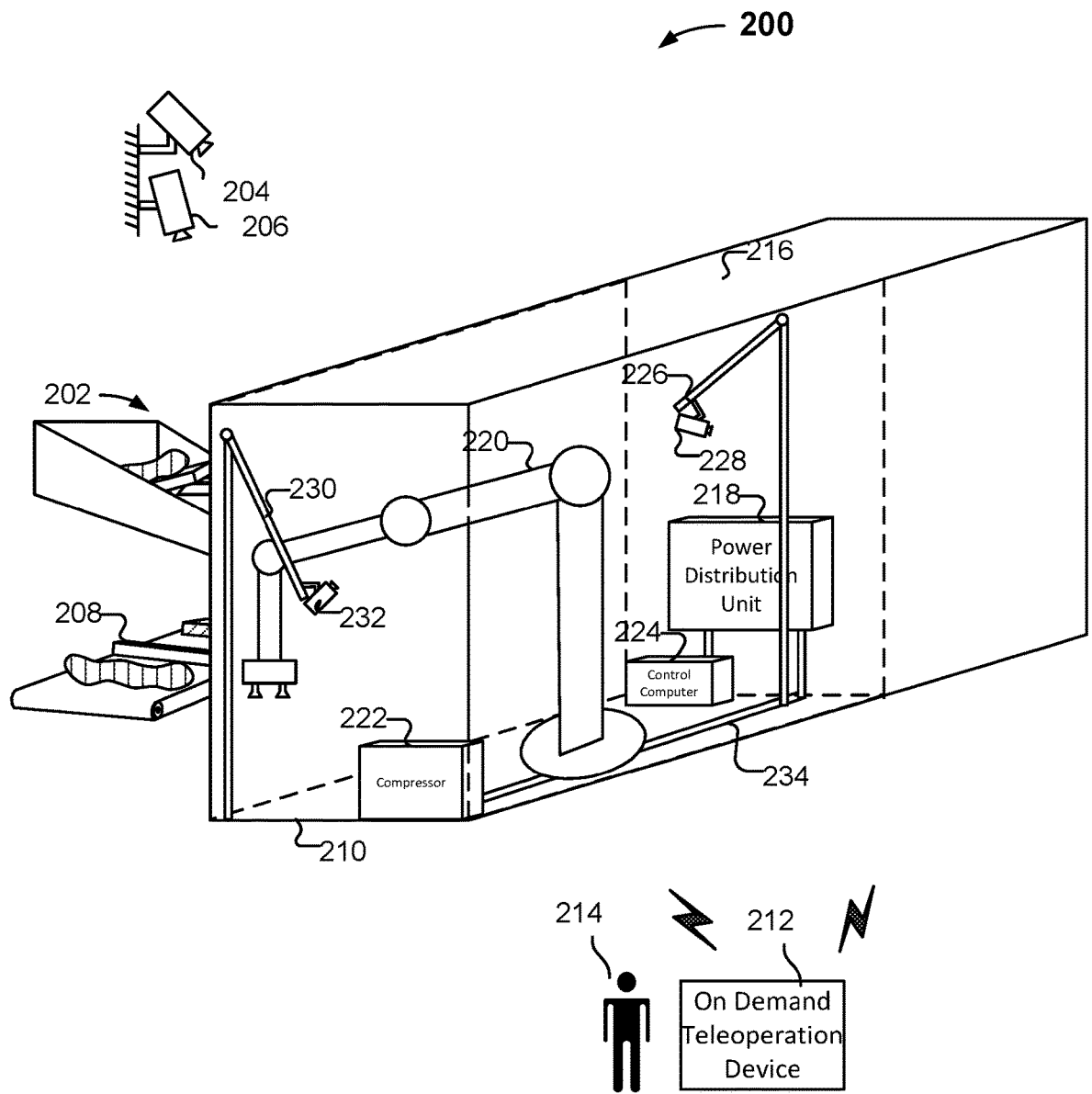
FIG. 2C is a diagram illustrating an embodiment of a workspace in which a robotic system is to be deployed in connection with singulating an item.

FIG. 2C is a diagram illustrating an embodiment of a workspace in which a robotic system is to be deployed in connection with singulating an item. In the example illustrated in FIG. 2C, one or components of containerized robotic system 216 are provided (e.g., the detachable superstructure is shown as transparent).

According to various embodiments, containerized robotic system 216 may comprise one or more of power distribution unit 218, robot 220, compressor 222, and control computer 224. Containerized robotic system 216 may include one or more channels mounted to a frame of containerized robotic system 216 or formed within a wall of a side of containerized robotic system 216. As illustrated in FIG. 2C, channel 234 may be provided. Components within containerized robotic system 216 may be connected via a connection (e.g., a wire/cable, tubing such as an airline, etc.) that is drawn through channel 234. In some implementations, the connections between components are drawn through the one or more channels, as applicable, and final connection there between is left until deployment of the containerized robotic system 216.

Deployment of containerized robotic system 216 includes connecting a power source at the destination location to power distribution unit 218 of containerized robotic system 216. Upon being provided with power, power distribution unit 218 may provide power to one or more other components of containerized robotic system 216, such as robot 220, control computer 224, compressor, sensor 228, and/or sensor 232. Control computer 224 may perform an initialization in response to being provided with power. The initialization may include executing software code that verifies connections with one or more other components of containerized robotic system 216 and/or of the destination location (e.g., conveyor 208, camera 204, and/or camera 206).

As illustrated in FIG. 2C, sensor 228 is mounted to a sensor superstructure 226. Sensor superstructure 226 is oriented in a collapsed orientation while the containerized robotic system 216 is enclosed (e.g., while at least part of the detachable superstructure is connected to the base or frame of the containerized robotic system 216). Similarly, sensor 232 is mounted to sensor superstructure 230, and sensor superstructure 230 is oriented in a collapsed orientation while the containerized robotic system 216 is enclosed. Sensor 228 and sensor 232 may include an image system such as a 2D/3D camera, 3D cameras, force sensors, a radar sensor, a Light Detection and Ranging (LIDAR) sensor, a laser sensor, an infrared sensor, a sensor array, a weight sensor, and other sensors, etc. Various other sensors may be included in containerized robotic system 216 and/or of the destination location. The sensors may provide obtain information pertaining to the workspace, an item in the workspace, a component in the workspace, etc., and provide sensor data to the control computer 224. The sensor data may be generated based at least on the information pertaining to the workspace, an item in the workspace, a component in the workspace, etc., and provide sensor data to the control computer 224.

Figure 2D:
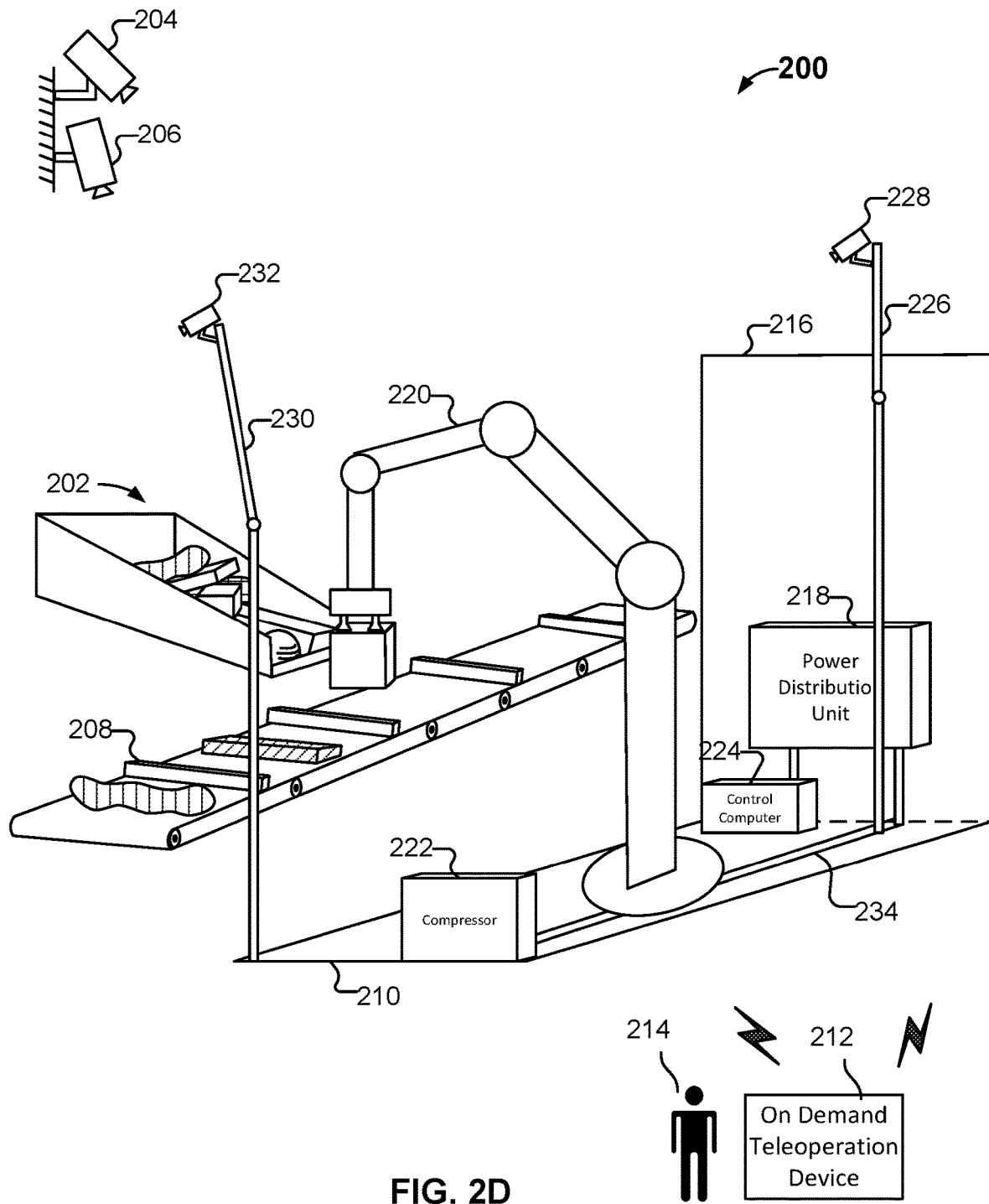
FIG. 2D is a diagram illustrating an embodiment of a workspace in which a robotic system is deployed in connection with singulating an item.

FIG. 2D is a diagram illustrating an embodiment of a workspace in which a robotic system is deployed in connection with singulating an item. In the example illustrated in FIG. 2D, containerized robotic system 216 is deployed in the robotic singulation system 200 at the destination location. The detachable superstructure has been removed from containerized robotic system 216, sensor superstructure 226 is oriented in the corresponding deployed orientation, sensor superstructure 230 is oriented in the corresponding deployed orientation, and power is connected to power distribution unit 218. After deployment, including initialization of various components within robotic singulation system 200, robot 220 may be controlled to singulate one or more items from chute 202 to conveyor 208. In the example illustrated in FIG. 2D, containerized robotic system 216 includes a base and a side wall after the detachable superstructure is removed/detached. The side wall may be configured to remain connected to the base of containerized robotic system 216 at deployment to add weight, support, rigidity, etc. One or more components such as power distribution unit 218 and/or control computer 224 may be mounted to the side wall. In some embodiments, when containerized robotic system 216 is deployed, no side walls remain and only the base of the container remains, and various components in the containerized robotic system 216 are at least partially mounted to the base (e.g., such components may also be partially mounted to the destination location).

In the example shown, robotic singulation system 200 includes a robot 220 comprising a robotic arm equipped with a suction-based end effector. While in the example shown the end effector is a suction-based end effector, in various embodiments, one or more other types of end effectors may be used in a singulation system as disclosed herein, including without limitation a pinch-based end effector or other types of actuated grippers. In some embodiments, the end effector comprises one or more suction-based ends (e.g., one or more suction cups). In various embodiments, the end effector may be actuated by one or more of suction, air pressure, pneumatics, hydraulics, or other actuation. Robot 220 (e.g., the robotic arm and the end effector) are configured to be used to retrieve parcels or other items that arrive via chute 202 (or a bin) and place each item in a corresponding location on conveyor 208 (e.g., a segmented conveyor). In this example, items are fed into chute 202 from an intake end. For example, one or more human and/or robotic workers may feed items into intake end of 202, either directly or via a conveyor or other electro-mechanical structure configured to feed items into chute 202. Chute 202 may comprise or a conveyor that conveys items to the chute (e.g., via the intake end) may comprise a disrupter device with which the flow of items may be controlled (e.g., by the control computer 224, etc.).

In the example shown, one or more of robot 220 (e.g., the robotic arm and/or the end effector), and conveyor 208 are operated in coordination by control computer 224. In various embodiments, a robotic singulation as disclosed herein may include one or more sensors from which an environment of the workspace is modeled. In the example shown in FIG. 2D, robotic singulation system 200 includes image sensors, including in this example cameras 204 and/or 206 (e.g., 3D camera(s)), sensor 228 and/or sensor 232. In various embodiments, other types of sensors may be used (individually or in combination) in a singulation system as disclosed herein, including a camera, an infrared sensor array, a laser array, a scale, a gyroscope, a current sensor, a voltage sensor, a power sensor, a force sensor, a pressure sensor, a weight sensor, and the like. In various embodiments, control computer 224 includes a workspace environment state system such as a vision system used to discern individual items, debris on the workspace, and each item's orientation based on sensor data such as image data provided by image sensors, including in this example cameras 204 and 206 (e.g., 3D camera(s)), sensor 228 and/or sensor 232. The workspace environment state system in some embodiments includes sensors in the robotic arm to detect a weight of an item (e.g., a grasped item) or to detect information from which an estimated weight is determined. For example, information pertaining to an amount of current, voltage, and/or power used by one or more motors driving movement of the robotic arm can be used to determine the weight (or an estimated weight) of the item. As another example, the chute includes a weight sensor, and the weight of the item is determined based on a difference of the weight on the chute as measured by the weight sensor before the item is picked up and after the item is picked up. As another example, information pertaining to an output from one or more sensor arrays can be used to determine a location of the item in the workspace, a location of the item while the item is grasped and/or being moved by the robotic arm, and/or a location of the robotic arm (e.g., based on a determination of an output from a subset of sensors of the one or more sensor arrays compared to another subset of sensors of the one or more sensor arrays). Robotic singulation system 200 may use information obtained by the sensors (e.g., sensors within the workspace such as camera 204 and/or camera 206, sensor 228 and/or sensor 232) to model the workspace, model the flow of items in the chute, determine properties of one or more items within the workspace/chute, determine a density of items within the chute/workspace, etc. In some embodiments, the information obtained by the sensors (e.g., sensors within the workspace such as camera 204 and/or camera 206, sensor 228 and/or sensor 232) is used to control/regulate the flow of items to the workspace (e.g., to or within chute 202) such as to determine a manner by which a disrupter device is to be controlled.

The workspace environment state system produces output used by the robotic singulation system 200 to determine and implement a plan to autonomously operate a robotic structure to pick one or more items from the workspace and place each in a corresponding available defined location for machine identification and sorting, such as a partitioned section of conveyor 208 (e.g., a segmented conveyor). In some embodiments, the workspace environment state system produces an output (e.g., sensor data or information otherwise characterizing the workspace and items within the workspace) used by the robotic system to detect a state or condition associated with one or more items in the workspace, and/or a state or condition associated with the robotic arm or other element of the workspace. According to various embodiments, in response to detecting (e.g., determining) the state or condition associated with one or more items in the workspace, the robotic system implements one or more active measures in connection with singulating an item. The active measure may include updating the plan to autonomously operate a robotic structure to pick one or more items from the workspace and place each item singly in a corresponding location in a singulation conveyance structure. In some embodiments, the active measure or the updating the plan can include operating the robotic structure to change or adapt to the detected state or condition (e.g., implement a change on how an item is singulated, implement to reconfigure items within the source pile/flow to make grasping a selected item easier, etc.).

In various embodiments, a robotic system as disclosed herein includes and/or does one or more of the following, e.g., by operation of a control computer such as control computer 224:

Computer vision information is generated by merging data from multiple sensors, including one or more of 2D cameras, 3D (e.g., RGBD) cameras, infrared, and other sensors to generate a three-dimensional view of a workspace that includes one or more sorting stations. The robotic system may determine characteristics of one or more items and/or debris or other abnormalities in the three-dimensional view of the workspace.

Robotic system coordinates operation of multiple robots to avoid collisions, getting in each other's way, and contending to pick up the same item and/or place an item in the same destination location (e.g., segmented part of the conveyor) as another robot. The robotic system may coordinate operation of a plurality of robots operating within the same workspace to singulate a plurality of items. For example, the robotic system may coordinate operation of the plurality of robots to enable the plurality of robots to operate independently to pick and place items. If a risk of collision is detected, responsive action is taken to ensure the plurality of robots do not collide with one another during singulation.

Robotic system coordinates operation of multiple robots to ensure all items are placed and only one per slot/location. For example, if robot A drops an item, the system tasks robot B to pick it up; item placed but with improper orientation is picked up and adjusted or moved to another location by the same or another robot; two or more items in a single destination slot result in the robot downstream station picking one of the two or more items off the conveyor and placing the item in a new location; etc.

Two or multiple robotic system coordinates to pick up objects that are too heavy or too large for one robotic system to handle.

The robotic system continuously updates motion planning for each robot and all of the robots together to achieve a desired collective throughput (e.g., to maximize collective throughput, to attain a predefined threshold of collective throughput, etc.). In response to determining that two or more robots have collided or will collide if moving according to their respective plans for singulation of items, the robotic system implements an active measure to ensure that the two or more robots avoid collision or otherwise reset independent operation of the two or more robots.

In the event two robots independently are tasked to acquire the same item, the system picks one at random to get that item and the other moves on to the next item (e.g., identify, select, determine grasp strategy, pick, move according to plan, and place).

The robotic system can manage the independent operation of a plurality of robots to ensure that the robots select items at different times to avoid the same item being selected for singulation by two different robots.

Control conveyor movement and/or speed as needed to avoid empty locations and achieve a desired robot productivity (throughput).

In response to a determination that an item is misplaced or dropped, the system assigns a robot or, if needed, a human operator to pick it up and place it back in the retrieving robot's own source pile or, if available or more optimal, on a next open slot on the conveyor.

Upstream robots are controlled to intentionally leave some slots open for downstream robots to place items on the conveyor.

Failure that cannot be corrected by the same or another robot results in an alert to obtain human (or other robotic) intervention to resolve.

In response to a determination that a grip strength (e.g., a pressure attained by the end effector) is abnormal (e.g., less than is expected during normal operation), perform a diagnostic process that includes testing the grip strength on a predefined surface and in connection with determining whether remedial action is necessary with respect to the end effector.

In response to a determination that debris is in the workspace and/or interfering with singulation of one or more items, perform an active measure to move/remove the debris, or to reconfigure an item to be singulated (e.g., to improve the likelihood that the item is successfully picked from the source pile/flow and placed on the conveyance structure).

In response to a detected state or condition, perform an active measure to move/remove the debris, or to reconfigure an item to be singulated (e.g., to improve the likelihood that the item is successfully picked from the source pile/flow and placed on the conveyance structure). For example, a chute conveyor is operated (e.g., under robotic control) to bring an item selected for singulation closer to a front of the chute for quicker and easier access by the robotic arm.

Use sensor data from workspace environment state system (e.g., from one or more sensors within the workspace) to model chute flow (or model the workspace environment), detect a deviation from an expected chute flow (or from an expected workspace environment), use the sensor data to detect a clog or abnormality within the chute flow or workspace environment, and to implement an active measure to clear the clog.

Use sensor data from the workspace environment state system to detect one or more characteristics of the item selected for singulation, determine that grasping or releasing of the item is expected to improve in response to implementation of an active measure, and implement the active measure to improve the grasping or releasing of the item.

Use sensor data to determine that the robotic arm has grasped a plurality of items in connection with singulation of one of the items, and determine a plan for releasing the plurality of items in order to place each item singly in a corresponding location in a singulation conveyance structure (e.g., selecting different locations in the singulation conveyance structure at which the corresponding items are to be placed, and/or determine a strategy for operating the end effector to release a first subset of the plurality of items at a different time from a second subset of the plurality of items).

Select a slot on the conveyance structure in which to place a selected item based on a size of the selected item and/or one or more characteristics of an item within a slot on the conveyance structure. For example, a slot is chosen to ensure that the selected item is not placed in a slot that is adjacent to a slot comprising a tall or large item.

Determine a movement and speed of the robotic arm that singulates an item based at least in part on a speed of a conveyor belt.

Use sensor data to determine whether to control a flow of items to the workspace, and in response to determining to control the flow of items, controlling the disrupter device (e.g., to move/re-orient the flow disrupter). A strategy for controlling the flow of items at the chute may be determined, and the system may implement the strategy, including communicating a signal or instruction to the disrupter device.

Determine a trajectory of the item to be singulated based at least in part on one or more of a characteristic of the item, a characteristic of the workspace environment, and/or a characteristic of the conveyance structure (e.g., a speed of the conveyor belt or the size of the item).

In various embodiments, an arbitrary mix of items to be singulated may include parcels, packages, and/or letters of a variety of shapes and sizes. Some items may be standard packages, one or more attributes of which may be known, others may be unknown. Sensor data such as image data is used, in various embodiments, to discern individual items (e.g., via image segmentation). The boundaries of partially occluded items may be estimated, e.g., by recognizing an item as a standard or known type and/or extending visible item boundaries to logical estimated extents (e.g., two edges extrapolated to meet at an occluded corner). In some embodiments, a degree of overlap (i.e., occlusion by other items) is estimated for each item, and the degree of overlap is taken into consideration in selecting a next item to attempt to grasp. For example, for each item a score may be computed to estimate the probability of grasp success, and in some embodiments the score is determined at least in part by the degree of overlap/occlusion by other items. Less occluded items may be more likely to be selected, for example, other considerations being equal.

The boundaries of the items may be used in connection with determining a density of the items within the workspace. Further, the boundaries of the items (or the density of the items within the workspace) may be used in connection with determining to control the flow of items to/within the workspace such as via controlling a disrupter device. In response to determining the boundaries of the items, the system may determine that an expected difficulty with which the robotic arm is expected to grasp an item from the workspace. The difficulty may correspond to a likelihood that the robotic arm successfully grasps/picks up an item from the workspace.

If a source pile/flow has an arbitrary mix of items to be singulated, the source pile/flow generally includes items that have different types of packaging, such as a cardboard box packaging, a paper envelope packaging, a polybag packaging (e.g., polyethylene bags), etc. The robotic system can determine the packaging of an item based on vision data obtained from the sensors, or based on a pressure attained between the end effector and the item when the robotic arm attempts to pick up the item. The sensor data can be used to discern a type of packaging corresponding to a particular item in the source pile/flow. In some embodiments, the robotic system determines a strategy for grasping the item based at least in part on the type of packaging corresponding to the item. For example, relatively heavier items packaged in a polybag will generally experience "tenting" between end effector suction cups. Tenting can cause sub-optimal suction from the end effector of the robotic arm, and thus the grasping of such an item is sub-optimal. According to various embodiments, in response to determining that the item is relatively heavy (e.g., that the weight exceeds a predefined threshold) and that the item is packaged in a poly-bag, or in response to determining that tenting is being caused while grasping the item, the robotic structure performs an active measure to change or adapt to the "tenting" or to the determination of the packaging of the item (e.g., a determination of a type of packaging, a material of the packaging, etc.). As an example, the robotic structure performs an active measure to partially lift the package and drag the package from the chute to the corresponding slot in the conveyance structure.

In various embodiments, multiple 3D and/or other cameras may be used to generate image data. A 3D view of the scene may be generated, and/or in some embodiments a combination of cameras is used to look at the scene from different angles and the camera that is least occluded, e.g., with respect to a workspace and/or one or more specific items in the workspace, is selected and used in connection with the grasping and moving of the one or more items. The image data can be used to detect debris on the chute or within the workspace, a clog in the chute flow of items through the workspace, a number of items grasped by the robotic structure during singulation of a selected item, a characteristic of one or more items occupying slots on the conveyance structure, etc.

According to various embodiments, the one or more cameras serve various purposes. The one or more cameras may provide a richer full 3D view into the scene (e.g., the workspace). In addition, or alternatively, the one or more cameras may operate in cohesion to minimize the errors due to package shininess when light reflecting off a package and into a camera may disrupt operation of such camera; in this case another camera disposed at a different location provides a backup. In some embodiments, the one or more cameras may be selectively triggered by a predictive vision algorithm that determines which camera has the best viewing angle and/or lowest error rate for picking a particular package. Accordingly, the robotic system may operate using information pertaining to an item that is obtained from the one or more cameras that are optimal (e.g., among the plurality of cameras within the workspace) for looking at the item. In some embodiments, one or more cameras are mounted on an actuated base, of which the system can change the position and orientation to provide a more optimal perception (e.g., view) of a package.

In some embodiments, the robotic system may select a field of view of one or more cameras. The field of view of each camera may be selected (e.g., determined) to increase the object segmentation quality by intentionally filtering out parts of the field of view as well as increasing the segmentation speed by reducing computation on a larger field of view.

Another purpose served by cameras, in various embodiments, is to detect any sort of unforeseen error in robot operation or any disruption to the environment. Cameras placed on the robot and on the environment have different error and accuracy profiles. The cameras on the robot can be more accurate since they are rigidly fixed to the robot but slower to use since using them requires the robot to slow down or stall. Cameras in the environment have a stable view and are effectively faster since the robot can multi-task and do something else while a camera is taking a photo. But if the camera stand is moved or shaken, the cameras may become out of sync with the robot and cause errors. In various embodiments, images from robot and non-robot cameras are combined (e.g., occasionally or on a package miss), to detect if the robot is in sync with non-robot cameras. If the cameras are determined to be out of sync, the robot takes corrective action, such as performing a calibration or synchronization process, alerting a human operator, etc. In some embodiments, a camera may not be mounted rigidly on a robotic arm, and in some such embodiments gyros and/or accelerometers on the cameras may be used to filter or compensate for the motion of the mounting base.

According to various embodiments, robotic singulation system 200 may include one or more sensors other than or in addition to a plurality of cameras, such as one or more of an infrared sensor array, a laser array, a scale, a gyroscope, a current sensor, a voltage sensor, a power sensor, and the like. Referring to FIG. 2D, in various embodiments, robotic 220 is driven by one or more motors, e.g., one or more motors at each movable joint or mount location. In some embodiments, the work required to drive robot 220 (e.g., to move the robotic arm as the robotic arm attempts to singulate an item) is indicative of one or more characteristics of the item to be singulated. For example, in some embodiments, a weight of the item may be computed (or estimated) based on the work required to drive robot 220 (e.g., the robotic arm) while the item is in its grasp. In various embodiments, the work required to drive robot 220 (e.g., the robotic arm) is measured using a current sensor, a voltage sensor, a power sensor, and/or the like, or some combination thereof. In response to determining the weight of the item during singulation, robotic singulation system 200 may perform an active measure to adapt to the weight of the item. In some embodiments, in response to determining that the weight of the item is greater than a predefined threshold, robotic singulation system 200 adjusts the plan to singulate the item via partially picking up the item and dragging the item to the corresponding location on the conveyance structure (e.g., in contrast to wholly picking up the item and moving the arm to place the item on the conveyance structure). In some embodiments, in response to determining the weight of the item, robotic singulation system 200 (e.g., control computer 224) adjusts the speed at which the robotic arm (and the item) is moved. For example, the larger the weight of the item, the greater the shear forces are between the item and the end effector as the robotic arm is moved. Further, the shear forces can increase as the speed at which the robotic arm is operated increases (e.g., the speed at which the robotic arm moves the item). Accordingly, robotic singulation system 200 can control the speed of the robotic arm based at least in part on the weight of the item to ensure that the item remains firmly grasped by the robotic arm. Although the description hereof describes the weight being measured based on using a current sensor, a voltage sensor, a power sensor, and/or the like, the weight can also be measured using a force sensor configured in the robotic arm or the end effector.

Referring further to FIG. 2D, in the example shown, robotic singulation system 200 further includes a teleoperation device 212 (e.g., an on-demand teleoperation device) usable by a human operator 214 to operate one or more of robot 220 (e.g., the robotic arm and/or end effector), and conveyor 208 by teleoperation. In some embodiments, control computer 224 is configured to attempt to grasp and place items in a fully automated mode. However, if after attempting to operate robot 220 in a fully automated mode control computer 224 determines it has no (further) strategies available to grasp one or more items, in various embodiments, control computer 224 sends an alert to obtain assistance from a human operator via teleoperation, e.g., by human operator 214 using teleoperation device 212. For example, in some embodiments, in response to detecting a state or condition affecting item flow through chute 202, control computer 224 may attempt to perform one or more actions to facilitate singulation. If fully automated attempts to respond to the detected state or condition are determined not to have resolved the state or condition, control computer may prompt human operator 214 to address the state or condition, e.g., via teleoperation using teleoperation device 212 (e.g., on-demand teleoperation device). In various embodiments, control computer 224 may display a user interface or other interface that identifies the state or condition and/or presents human selectable options to control robot 220 (e.g., the robotic arm and/or effector), and/or other elements and instrumentalities as disclosed herein (e.g., blowers, shakers, chute conveyors, etc.) to alter the state or condition.

In various embodiments, control computer 224 uses image data from cameras such as cameras 204 and 206, and/or sensor 228 and sensor 232, to provide a visual display of the scene to human operator 214 to facilitate teleoperation. For example, control computer 224 may display a view of the pile of items in chute 202. In some embodiments, segmentation processing is performed by control computer 224 on image data generated by cameras 204 and 206, and/or sensor 228 and sensor 232 to discern item/object boundaries. Masking techniques may be used to highlight individual items, e.g., using different colors. The human operator 214 may use the visual display of the scene to identify the item(s) to be grasped and use teleoperation device 212 to control the robotic arm and end effector to pick the item(s) from chute 202 and place each in a corresponding location on conveyor 208. In various embodiments, once the item(s) for which human intervention was prompted have been placed on the conveyor, the robotic singulation system 200 resumes fully automated operation. In various embodiments, in the event of human intervention, the robotic system observes the human operator (e.g., manual task completion, task completion using a robotic arm and end effector via teleoperation) and attempts to learn a strategy to (better) complete the task in an autonomous mode in the future. For example, the system may learn a strategy to grasp an item, e.g., by observing the places on the item at which a human operator grasps the item and/or by remembering how the human operator used the robotic arm and end effector to grasp the item via teleoperation.

In some embodiments, robotic singulation system 200 invokes assistance from human operator 214 in response to determining that an abnormality in the operation of robotic singulation system 200 exists. An example of an abnormality is a lack of a threshold pressure being attained between the end effector and the item during singulation of the item. In response to detecting that the pressure attained between the end effector and the item is less than a threshold pressure value, robotic singulation system 200 can perform a diagnostics process in connection with assessing whether robotic singulation system 200 is performing normally. For example, robotic singulation system 200 can perform a diagnostic of the ability of the end effector to engage an item and attain a predetermined threshold pressure value. In response to determining that robotic singulation system 200 is not performing normally (e.g., that the end effector is not able to engage an item and attain a predetermined threshold pressure value), robotic singulation system 200 invokes assistance from human operator 214. In some embodiments, control computer 224 sends an alert to human operator 214. The alert can indicate the basis of the problem (e.g., an indication that the end effector is unable to engage the item and attain a predetermined threshold pressure value). For example, the alert can provide a recommended or requested remedial action to human operator 214.

Figure 2E:
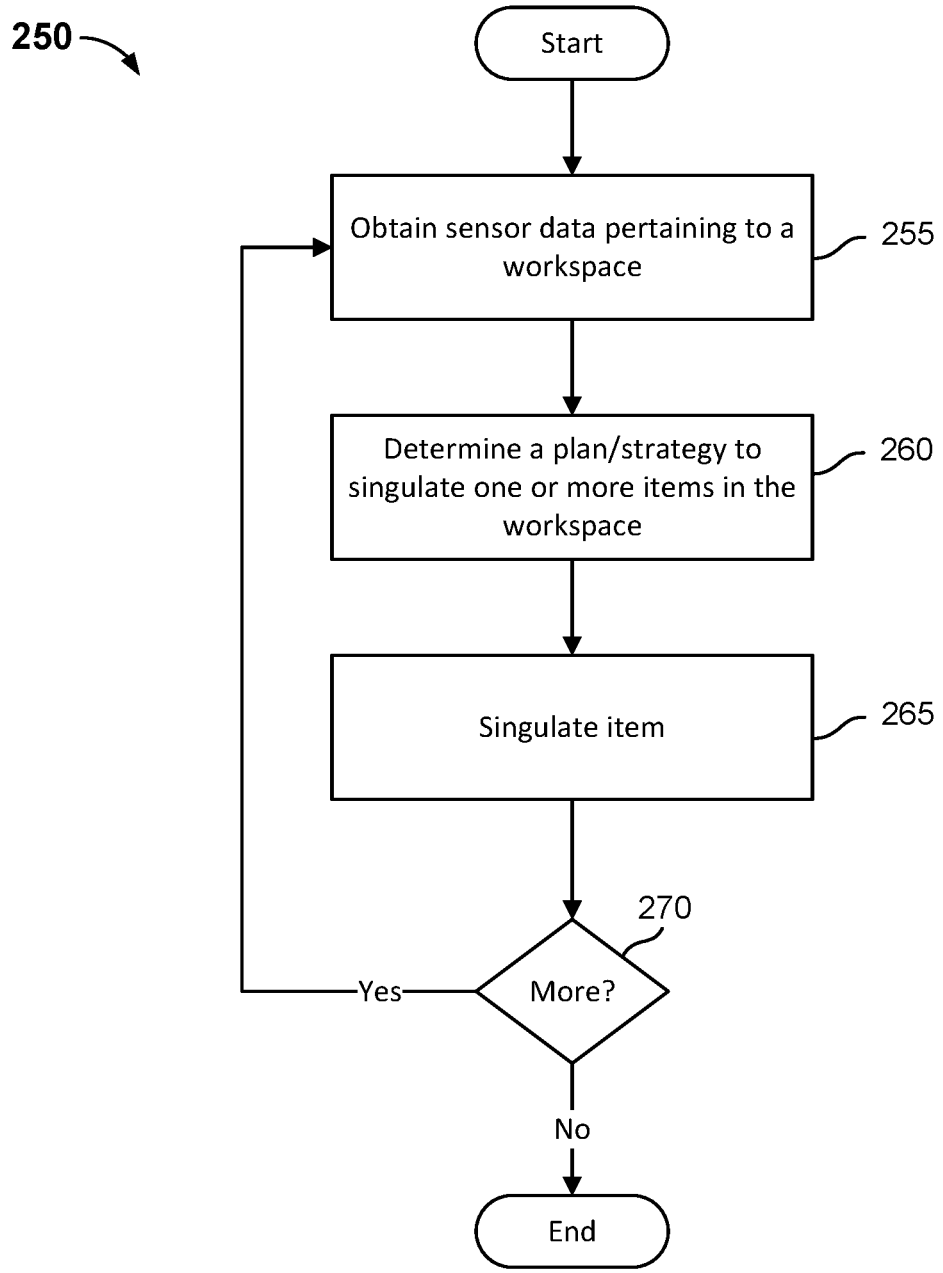
FIG. 2E is a flow chart illustrating an embodiment of a process to singulate an item.

FIG. 2E is a flow chart illustrating an embodiment of a process to singulate an item. In some embodiments, process 250 is implemented by a robot system operating to singulate one or more items within a workspace, such as robotic singulation system 200 of FIG. 2D. The robot system includes one or more processors (e.g., in control computer 224 in the examples shown in FIG. 2D) which operate, including by performing the process 250, to cause a robotic structure (e.g., a robotic arm) to pick and place items for sorting.

At 255, sensor data pertaining to the workspace is obtained. In some embodiments, a robotic system obtains the sensor data pertaining to the workspace from one or more sensors operating within the system. As an example, the sensor data is obtained based at least in part on outputs from image sensors (e.g., 2D or 3D cameras), an infrared sensor array, a laser array, a scale, a gyroscope, a current sensor, a voltage sensor, a power sensor, a force sensor, a pressure sensor, and the like.

According to various embodiments, the obtained sensor data pertaining to the workspace comprises information from which a model of the workspace may be generated. For example, one or more characteristics associated with the workspace is determined based at least in part on the sensor data. The sensor data can be used in connection with determining at least one characteristic of one or more items within the workspace such as items in the source pile/flow of the chute, or an item grasped by the robotic arm. In some embodiments, the sensor data is used in connection with determining one or more characteristics of the conveyor such as determining the slots on the conveyor that are empty or unreserved, determining a speed of the conveyor, and/or determining the characteristics of at least one slot or of at least one item already on the conveyor.

At 260, a plan or strategy to singulate one or more items in the workspace is determined. In some embodiments, a robotic system determines the plan or strategy to pick at least one item from a source pile/flow in the workspace and to singly place the at least one item in a slot on the conveyor. The plan or strategy to singulate the one or more items is determined in various embodiments on a robot-by-robot basis such that if the robotic system includes a plurality of robots, each robot operates independent of the other robot(s).

According to various embodiments, the plan or strategy to singulate the one or more items in the workspace is determined based at least in part on the sensor data. For example, the plan or strategy to singulate the one or more items includes selecting an item within the source pile/flow that is to be singulated. The selected item can be identified from among other items or objects within the workspace based at least in part on the sensor data (e.g., the boundaries of the item and other items or objects within the workspace can be determined). As an example, one or more characteristics pertaining to the selected item is determined based at least in part on the sensor data. The one or more characteristics pertaining to the selected item can include a dimension of the item, a packaging of the item, one or more identifiers or labels on the item (e.g., an indicator that the item is fragile, a shipping label on the item, etc.), an estimated weight of the item, and the like, or any combination thereof. As another example, the plan to singulate the one or more items includes determining a location on the conveyance structure (e.g., a slot on the conveyor) at which the robotic structure (e.g., the robotic arm) is to singly place the item. The location on the conveyor at which the item is to be placed can be determined based at least in part on a timestamp, a speed of the conveyor, and one or more characteristics of a slot in the conveyor (e.g., an indication of whether the slot is occupied or reserved), and the like, or any combination thereof. As another example, the plan or strategy to singulate the one or more items includes determining a path or trajectory of the item along which the robotic arm is to move the item during singulation. The path or trajectory of the item along which the item is to be moved can be determined based at least in part on a location of one or more other objects within the workspace such as a frame of the chute, other items in the source pile/flow, items on the conveyor, other robots operating within the workspace, a reserved airspace for operation of other robots, sensors within the workspace, etc. For example, the path or trajectory of the item is determined to move a part of the item comprising an identifier (e.g., a shipping label) to an area at which a scanner is able to scan the identifier, or the path or trajectory of the item is determined to maximize a likelihood that the identifier on the item is read by one or more scanners along the path or trajectory.

According to various embodiments, the plan or strategy to singulate the one or more items is determined based at least in part on a cost associated with moving the one or more items. The system may determine the plan or strategy for moving an item based at least in part a cost of moving the item such as by determining a plan or strategy that minimizes a cost of moving the item. To minimize the cost of moving the item may include optimizing the cost subject to one or more predetermined conditions or constraints. In some embodiments, the system determines the plan or strategy for moving the item in a manner that moving the item according to the plan or strategy is expected to cost less than a cost value threshold. The costs associated with moving the item may be based at least in part on an attribute associated with the item (e.g., a size of the item), a location in the workspace from which the item is to be picked (e.g., a location on the chute), a destination location on the conveyor at which the item is to be placed, etc. In some embodiments, the presence of one or more other items or objects in the workspace (e.g., an item already on the conveyor) may impact a cost of moving an item according to a path/trajectory, etc.

In some embodiments, the plan or strategy to singulate the one or more items in the workspace comprises determining whether to control/regulate the flow of items at the chute or otherwise in being provided to the workspace. The plan or strategy may further comprise a determination of a manner by which the flow of items is to be controlled. For example, the system may determine to control to improve the flow of items (e.g., to increase the rate of items being provided to the workspace, to increase the number of items provided to the workspace, etc.). As another example, the system may determine to control to decrease or impede the flow of items (e.g., to decrease the rate of items being provided to the workspace, to decrease the number of items provided to the workspace, etc.). The system may determine whether to control/regulate the flow of items based at least in part on the sensors data such as information pertaining to items in the workspace (e.g., a quantity of items, a density of items, an indication of whether a threshold number of items are occulated, a likelihood that a threshold number of items can/cannot be grasped, etc.).

At 265, the item is singulated. In some embodiments, the item is singulated in response to the plan or strategy for singulating the item being determined. For example, a robotic arm is operated to pick one or more items from the workspace and place each item singly in a corresponding location in a singulation conveyor. The singulation of the item comprises picking the item from the workspace (e.g., from the source pile/flow) and singly placing the item on the conveyor. The robot system singulates the item based at least in part on the plan or strategy for singulating the item.

At 270, a determination is made as to whether further items are to be singulated. If there are more items, a further iteration of steps 255, 260, 265, and 270 is performed, and successive iterations are performed until it is determined at 270 that there are no more items in the chute (or other receptacle or source) to be picked and placed.

Figure 3A:
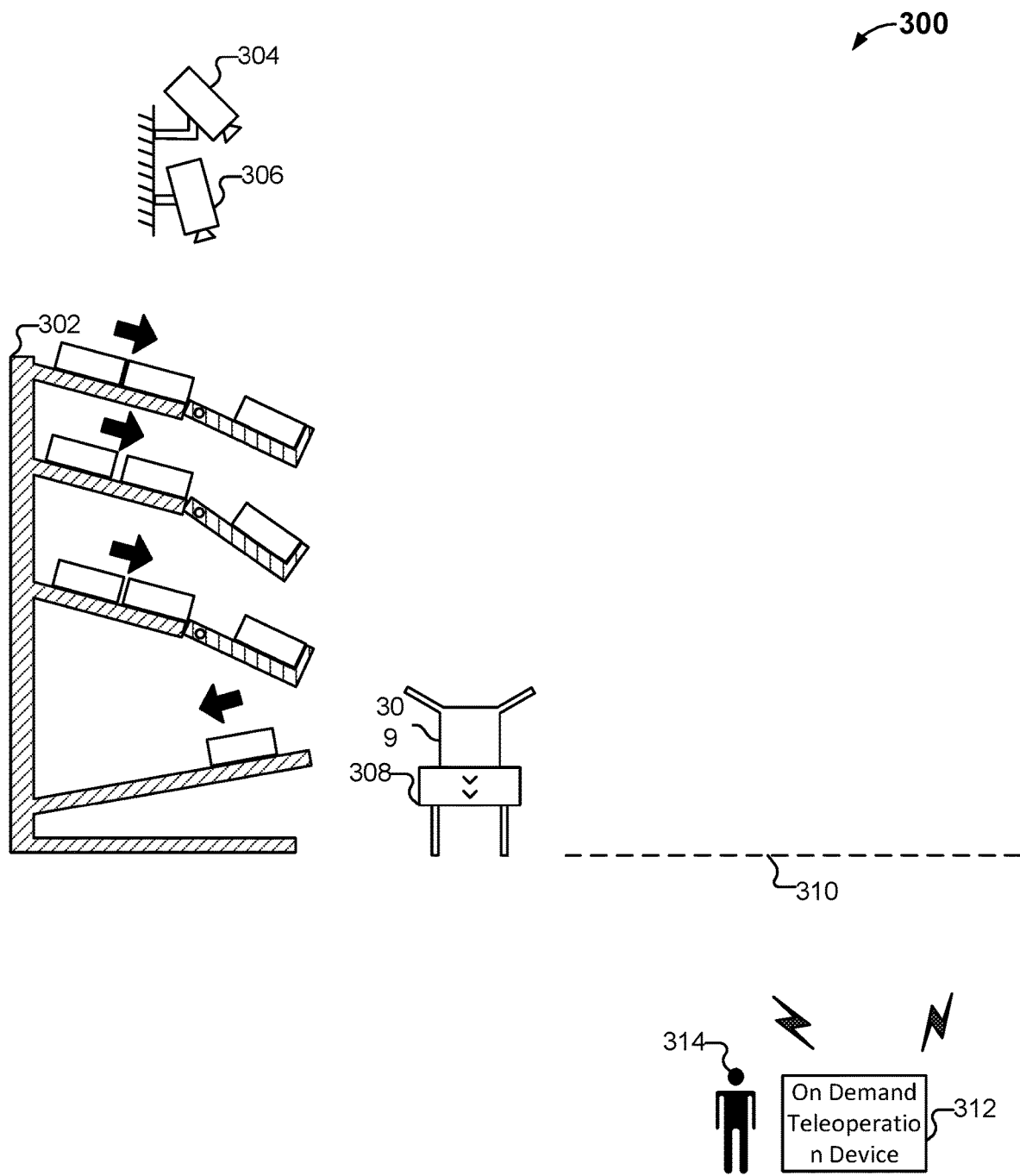
FIG. 3A is a diagram illustrating an embodiment of a workspace in which a robotic system is to be deployed in connection with kitting an item.

FIG. 3A is a diagram illustrating an embodiment of a workspace in which a robotic system is to be deployed in connection with kitting an item.

According to various embodiments, a containerized robotic system may be used in connection with a system for singulating one or more items. The containerized robotic system may be deployed at a destination location that is configured (or partly configured) to perform kitting of one or more items. For example, the destination location may comprise one or more components used in robotic kitting system 300 for kitting one or more items. As illustrated in FIG. 3A, the destination location may comprise kitting shelf 302, one or more sensors (e.g., camera 304 and/or camera 306), conveyor 308, and an teleoperation device 312 (e.g., an on demand teleoperation device) usable by a human operator 314 to operate one or more of components of robotic kitting system 300 (e.g., a robotic arm in the containerized robotic system, an end effector, and conveyor 308) by teleoperation. Robotic kitting system 300 may further comprise a receptacle assembly module (not shown) that assembles receptacles in which one or more items are kitted, for example, as the receptacle 309 is carried along the conveyor 308.

In some embodiments, a location 310 at which a containerized robotic system is to be deployed is determined. The location 310 may be determined based on a location of one or more other components in the environment (e.g., workspace) in which the containerized robotic system is to be deployed, and/or one or more capabilities of the containerized robotic system. As an example, the location 310 may be determined based on a size and/or range of a robot of the containerized robotic system. As another example, the location 310 may be determined based on a location of kitting shelf 302 and/or conveyor 308. Location 310 may be identified manually such as by a physical marking on a ground at the destination location, such as via the use of paint. In some embodiments, the location 310 is identified using a laser or other projected information at location. For example, a laser or other projector may be mounted at the destination location, such as on kitting shelf 302, conveyor 308, a wall of destination location, etc. The location 310 may be marked via a projection of a reference point such as a line denoting a side of the containerized robotic system, a point denoting a corner of the containerized robotic system, an outline of a circumference of the containerized robotic system, etc.

Figure 3B:
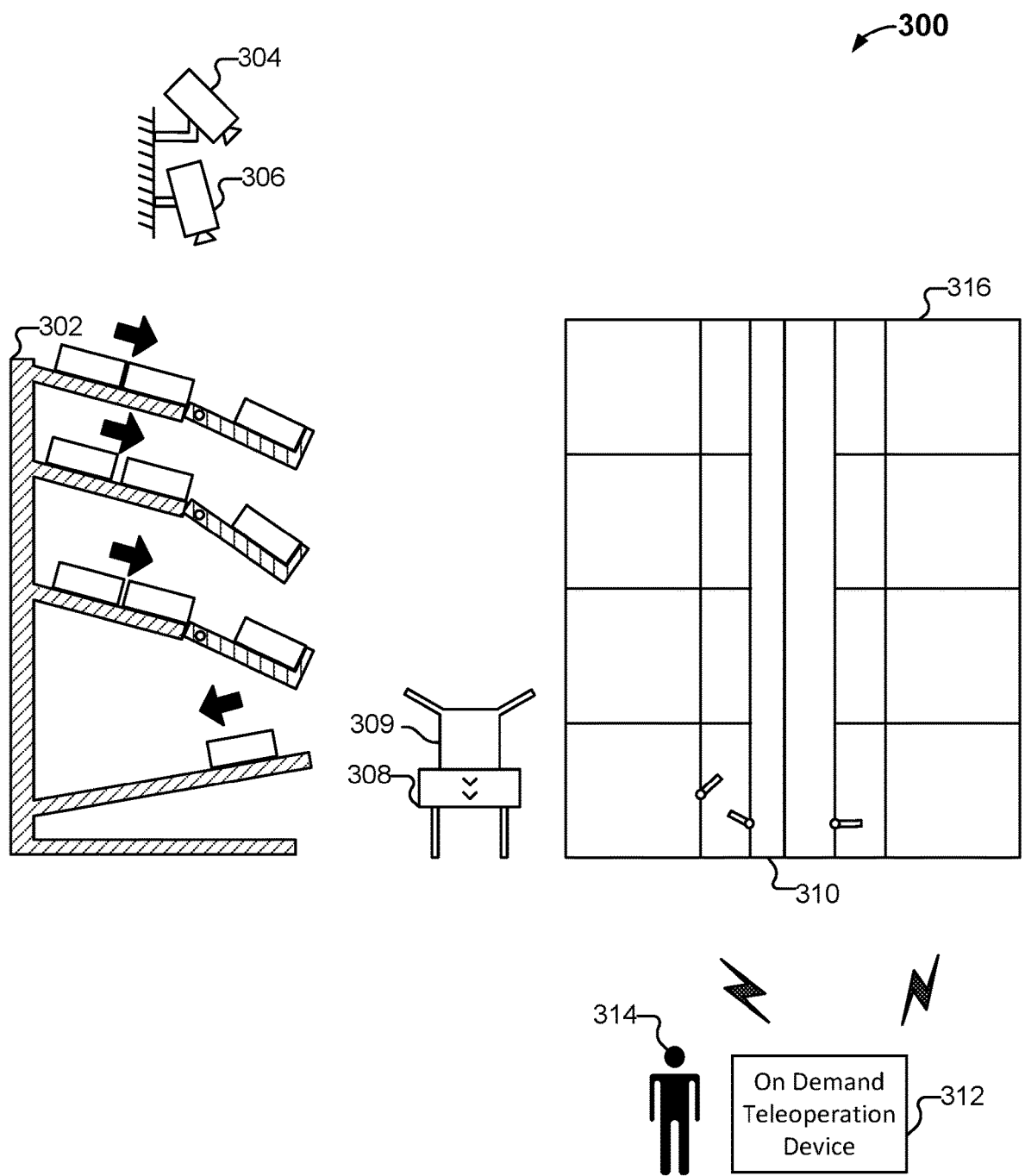
FIG. 3B is a diagram illustrating an embodiment of a workspace in which a robotic system is to be deployed in connection with kitting an item.

FIG. 3B is a diagram illustrating an embodiment of a workspace in which a robotic system is to be deployed in connection with kitting an item.

According to various embodiments, the relative ease with which containerized robotic system 316 may be moved to/from location 310 limits the resources (e.g., labor, time, etc.) required to deploy containerized robotic system 316 and/or to replace a containerized robotic system. In conventional systems, if a robot required replacement, the removal of the existing robot and installation of a new robot was cumbersome and required significant resources. For example, robots of conventional systems are mounted directly to the floor of the destination location, and the de-mounting of such a robot is time and labor intensive. As another example, a robot of conventional system generally has a relatively irregular shape and center of gravity thereby complicating the removal of such a robot. In contrast, a containerized robotic system according to various embodiments may be relatively easily and quickly removed such as via forklift, crane, etc. The de-installation/removal of the containerized robotic system may include attaching the detachable superstructure to the base of the containerized robotic system, and moving the containerized robotic system from location 310. A replacement containerized robotic system may be relatively easily moved into position (e.g., to location 310) and deployed by removing the corresponding detachable superstructure, etc.

Containerized robotic system 316 is sufficiently rigid and heavy that installation of containerized robotic system 316 includes placing the containerized robotic system 316 at location 310. According to various embodiments, installation and/or deployment of containerized robotic system 316 does not otherwise require containerized robotic system 316 to be mounted or fixed to destination location.

Figure 3C:
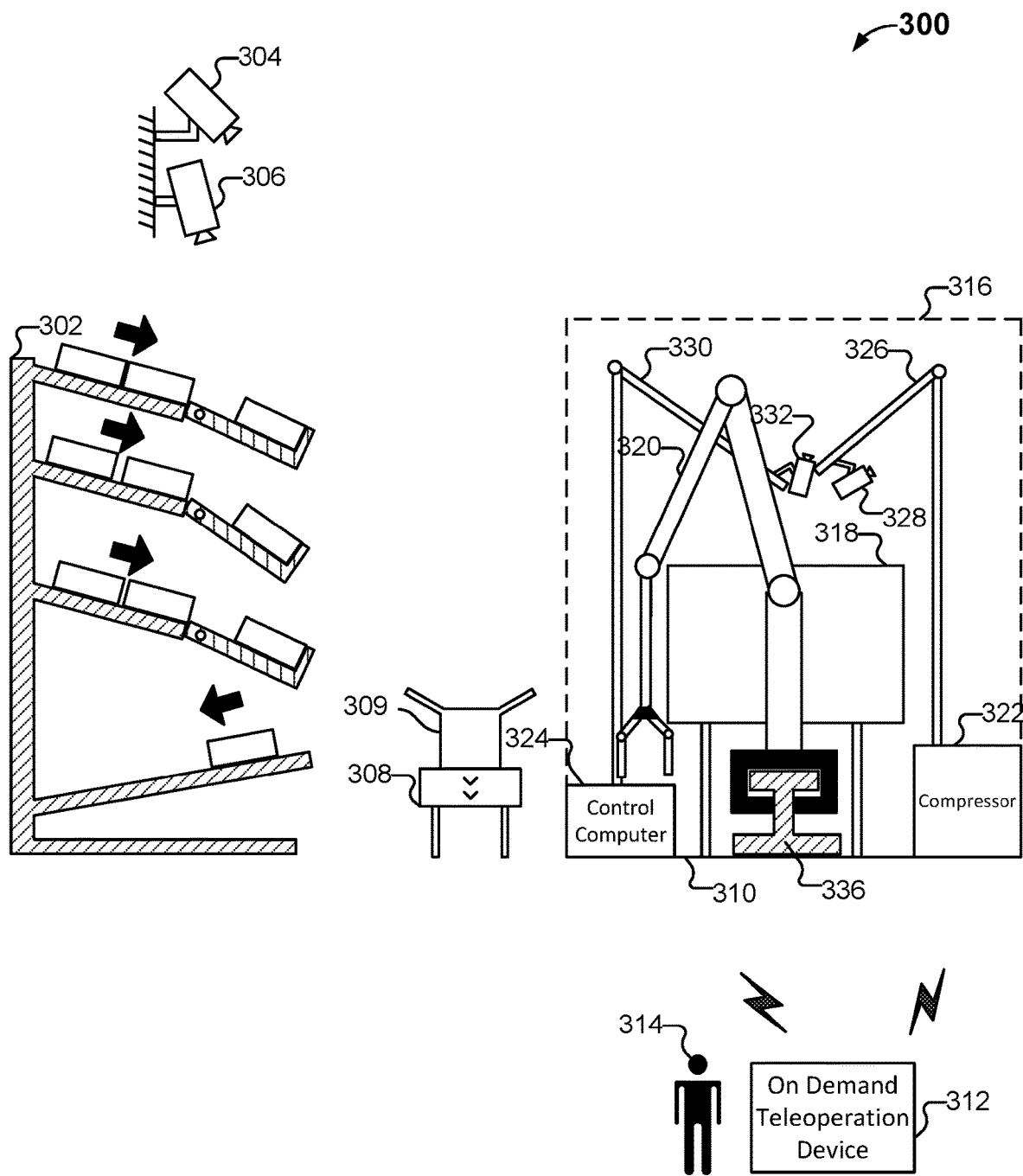
FIG. 3C is a diagram illustrating an embodiment of a workspace in which a robotic system is to be deployed in connection with kitting an item.

FIG. 3C is a diagram illustrating an embodiment of a workspace in which a robotic system is to be deployed in connection with kitting an item. In the example illustrated in FIG. 3C, one or components of containerized robotic system 316 are provided (e.g., the detachable superstructure is shown as transparent).

According to various embodiments, containerized robotic system 316 may comprise one or more of power distribution unit 318, robot 320, compressor 322, and control computer 324. Containerized robotic system 316 may include one or more channels mounted to a frame of containerized robotic system 316 or formed within a wall of a side of containerized robotic system 316. Components within containerized robotic system 316 may be connected via a connection (e.g., a wire/cable, tubing such as an airline, etc.) that is drawn through a channel. In some implementations, the connections between components are drawn through the one or more channels, as applicable, and final connection there between is left until deployment of the containerized robotic system 316.

Deployment of containerized robotic system 316 includes connecting a power source at the destination location to power distribution unit 318 of containerized robotic system 316. Upon being provided with power, power distribution unit 318 may provide power to one or more other components of containerized robotic system 316, such as robot 320, control computer 324, compressor, sensor 328, and/or sensor 332. Control computer 324 may perform an initialization in response to being provided with power. The initialization may include executing software code that verifies connections with one or more other components of containerized robotic system 316 and/or of the destination location (e.g., conveyor 308, a sensor such as camera 304 and/or camera 306).

As illustrated in FIG. 3C, sensor 328 is mounted to a sensor superstructure 326. Sensor superstructure 326 is oriented in a collapsed orientation while the containerized robotic system 316 is enclosed (e.g., while at least part of the detachable superstructure is connected to the base or frame of the containerized robotic system 316). Similarly, sensor 332 is mounted to sensor superstructure 330, and sensor superstructure 330 is oriented in a collapsed orientation while the containerized robotic system 316 is enclosed. Sensor 328 and sensor 332 may include an image system such as a 2D/3D camera, 3D cameras, force sensors, a radar sensor, a Light Detection and Ranging (LIDAR) sensor, a laser sensor, an infrared sensor, a sensor array, a weight sensor, and other sensors, etc. Various other sensors may be included in containerized robotic system 316 and/or of the destination location. The sensors may provide obtain information pertaining to the workspace, an item in the workspace, a component in the workspace, etc., and provide sensor data to the control computer 324. The sensor data may be generated based at least on the information pertaining to the workspace, an item in the workspace, a component in the workspace, etc., and provide sensor data to the control computer 324. In some embodiments, the control computer 324 generates the sensor data based at least in part on information received from the various sensors in the robotic kitting system 300 (e.g., sensor 328, sensor 332, etc.).

In some embodiments, robot 320 is mounted to a base (e.g., a carriage) that is attached to a guide rail such that robot 320 traverses guide rail to move within the workspace (e.g., to increase a degree of freedom of robot 320, to increase the range of robot 320, etc.). The guide rails may be mounted in containerized robotic system 316 (e.g., to a base of the containerized robotic system 316, etc.). In the example illustrated in FIG. 3C, robot 320 is mounted to a carriage/base that traverses guide 336 (e.g., a rail). The control computer 324 may control the carriage/base of robot 320 to move the robot 320 along the guide 336.

Figure 3D:
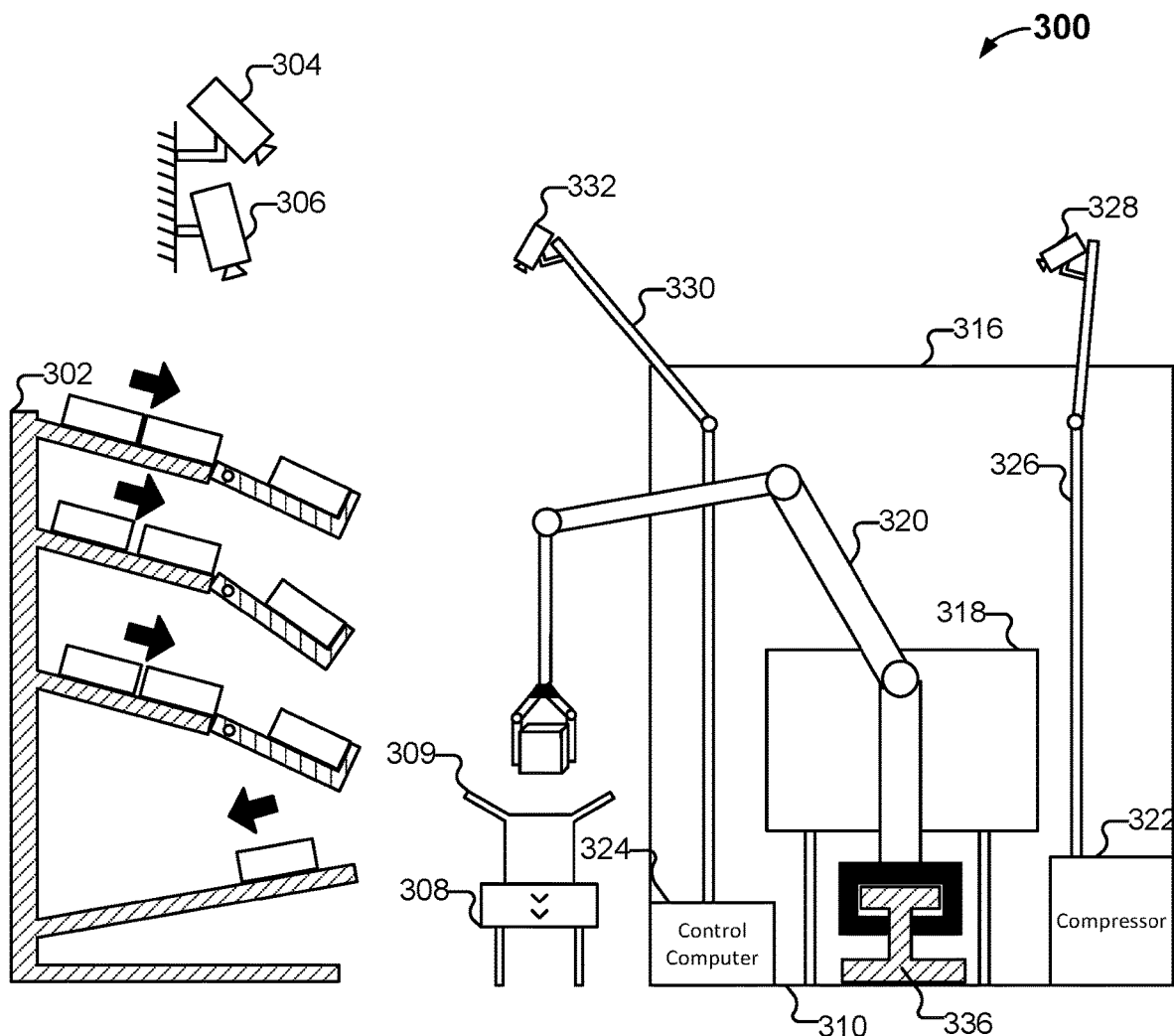
FIG. 3D is a diagram illustrating an embodiment of a workspace in which a robotic system is deployed in connection with kitting an item.
Figure 3D:
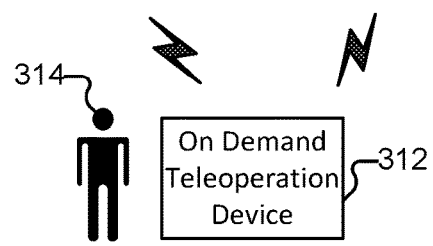

FIG. 3D is a diagram illustrating an embodiment of a workspace in which a robotic system is deployed in connection with kitting an item. In the example illustrated in FIG. 3D, containerized robotic system 316 is deployed in the robotic kitting system 300 at the destination location. The detachable superstructure has been removed from containerized robotic system 316, sensor superstructure 326 is oriented in the corresponding deployed orientation, sensor superstructure 330 is oriented in the corresponding deployed orientation, and power is connected to power distribution unit 318. After deployment, including initialization of various components within robotic kitting system 300, robot 320 may be controlled to pick and place one or more items from kitting shelf 302 to receptacle 309 on conveyor 308. In the example illustrated in FIG. 3D, containerized robotic system 316 includes a base and a side wall after the detachable superstructure is removed/detached. The side wall may be configured to remain connected to the base of containerized robotic system 316 at deployment to add weight, support, rigidity, etc. One or more components such as power distribution unit 318 and/or control computer 324 may be mounted to the side wall. In some embodiments, when containerized robotic system 316 is deployed, no side walls remain and the base of the container remains, and various components in the containerized robotic system 316 are at least partially mounted to the base (e.g., such components may also be partially mounted to the destination location).

A kitting system configured to perform kitting is disclosed. In some embodiments, the kitting system includes a kitting shelf system that is used in connection with kitting. The kitting shelf system may include one or more shelves on which one or more items are stored for use in a kitting process for assembling one or more kits. The kits may be assembled based at least in part on a corresponding order (e.g., based on a packing slip associated with the order). Various embodiments include one or more robotic systems. A robotic system may include one or more robotic arms that are respectively configured to autonomously operate to pick an item/object from a first location and place the item/object in a second location. A robotic arm included in a kitting system may be controlled to operate (e.g., autonomously) pick and place the item/object according to a plan to assemble a kit.

Each item or object within an item on the kitting shelf may have machine readable information, such as text and/or optically or otherwise encoded information, which can be machine read and used in connection with kitting the object and/or item, e.g., via an automated kitting system and/or processing. As an example, to read the information for a given item (or object within the item), one or more sensors may obtain information pertaining to the item while the item is within the kitting shelf system (e.g., on a shelf of the kitting shelf system such as on a presentation face of the shelf, etc.). As another example, to read the information for a given item (or object within the item), one or more sensors may obtain information pertaining to the item while the item is being moved (by the robotic arm) from the kitting shelf system to the corresponding receptacle (e.g., the information pertaining to the item is scanned during a path/trajectory of the item from the kitting shelf system to the receptacle).

In the example shown, robotic kitting system 300 includes a kitting shelf 302 and a containerized robotic system 316 comprising a robot 320 (e.g., a robotic arm). According to various embodiments, kitting shelf 302 includes one or more shelves. Each of the one or more shelves may comprise a presentation face. The presentation face corresponds to an area or surface on which an item is disposed on the kitting shelf system. In connection with kitting of one or more items, robotic arm picks an item (or object from within an item) from at least one presentation face. Kitting shelf 302 may include one or more feeder portions. In some embodiments, kitting shelf 302 includes a gate structure that is configured to control conveyance of an item from a feeder portion to the corresponding presentation face. The gate structure may be coupled to, or integrated with, the presentation face. An item (e.g., a tray or other receptacle, etc.) may be provided to the kitting shelf 302 via the feeder portion. For example, an item may be conveyed by the chute (or conveyor connected to the chute) to the feeder portion.

In some embodiments, robot 320 is movable with respect to kitting shelf 302 and/or with respect to a conveyor or other location at which a receptacle is disposed (e.g., conveyor 308). In the example shown in FIG. 3D, robot 320 is mounted on carriage, which is configured to ride along a rail or other linear guide (e.g., guide 336) disposed in the containerized robotic system 316. The rail or other linear guide (e.g., guide 336) may be oriented alongside and substantially parallel to the conveyor 308. As an example, robot 320 may be positioned on a side of the conveyor 308 opposite the kitting shelf 302. As an example, robot 320 may be mounted on a same side of the conveyor 308 as the kitting shelf 302. In some embodiments, one or more robotic arms are mounted on a same side of conveyor 308 as a kitting shelf system and one or more robotic arms are mounted on a side of conveyor 308 that is opposing to kitting shelf system. In various embodiments, a motor, belt, chain, or other source of motive force is applied via a controller (not shown in FIG. 3D) to move the carriage and attached robot 320 along the rail or guide 336 to facilitate the automated retrieval of items from one or more kitting shelf systems, and the placement of items in receptacle 309 (e.g., a box, a tray, etc.) as the receptacle 309 is moved along conveyor 308. Control of robot 320 may be coordinated based at least in part on one or more items to be picked and placed in receptacle 309, a location of receptacle 309 (e.g., a predetermined location at which the item is to be kitted), and/or a path of receptacle 309 (e.g., based on a determined movement of conveyor 308).

Referring further to FIG. 3D, in the example shown robotic kitting system 300 includes one or more sensors to capture information pertaining to the workspace. For example, robotic kitting system 300 may comprise a camera 304, camera 306, and/or sensor 328 or sensor 332, configured to capture images (e.g., video images) of the elements comprised in robotic kitting system 300 (e.g., in the workspace thereof). Robotic kitting system 300 may comprise a plurality of sensors that obtain information pertaining to the workspace (e.g., the workspace corresponding to robotic kitting system 300). For example, camera 304 may be one of a plurality of sensors used by control computer 324 to control the elements in the robotic kitting system 300. For example, in the example shown, video generated by camera 304 and sent to control computer 324 may be used by control computer 324 to control the speed and/or direction of the conveyor belts comprised in the robotic kitting system 300 and/or a gating mechanism in the kitting shelf 302 to ensure a sufficient and not excessive number of items are available in the pickup zone (e.g., a presentation face of kitting shelf 302) and/or to position or reposition the items for retrieval by robot 320. As another example, information (e.g., video) generated by camera 304, camera 306, and/or sensor 328 or sensor 332, and sent to control computer 324 may be used by control computer 324 to control the disrupter device to regulate the flow of items to the workspace (e.g., the kitting shelf 302). In addition, camera 304 and/or other cameras and/or other sensors may be used to facilitate robot 320 picking up an item and/or placing the item in receptacle 309 (e.g., box). In various embodiments, a plurality of cameras may be deployed in a number of locations, including in the environment and on the respective elements in robotic kitting system 300, to facilitate automated (and, if needed, human assisted) kitting operations. In various embodiments, sensors other than cameras may be deployed, including without limitation contact or limit switches, pressure sensors, weight sensors, and the like.

In various embodiments, one or more sensors are disposed on a chassis of the robotic arm of robot 320 or a chassis of a robot 320 on which the robotic arm is disposed. Robotic kitting system 300 may include one or more accelerometers operatively connected to or disposed within proximity of the one or more sensors (e.g., the one or more cameras). The control computer may obtain the image data pertaining to the workspace based at least in part on information obtained by the one or more accelerometers. In some embodiments, the one or more sensors may comprise a scanner that obtains data pertaining to a label or identifier on the object as the object is moved from the item to the predetermined structure.

In various embodiments, one or more sensors (e.g., camera 304, camera 306, sensor 328, and/or sensor 332) is used to capture information pertaining to items associated with kitting shelf 302. For example, sensor 328 and/or sensor 332 may capture an image of one or more items on a shelf of kitting shelf 302. As another example, if an item on a shelf is a tray or other receptacle, sensor 328 and/or sensor 332 may capture information pertaining to objects within the tray. Control computer 324 may use information pertaining to the workspace to determine a plan, and/or to control operation of robot 320 to pick an item (or an object from within the item) from kitting shelf 302. Control computer 324 may use the information pertaining to the workspace in connection with determining a location of an object within a tray on a shelf; a quantity of objects within the tray; a type of object within the tray; an orientation of one or more objects within the tray; a density of items within the tray, a quantity of items at the feeder portion, etc.

In various embodiments, control computer 324 is programmed to determine a plan to fulfill a kitting requirement based at least in part on a model of robot 320 and other elements comprised in robotic kitting system 300, e.g., kitting shelf 302; conveyor 308; a receptacle source module (e.g., a box assembly machine) (not shown); robot 320;

and/or carriage on which 320 is mounted. The respective models in various embodiments reflect capabilities and limitations of each respective element. For example, the shelves of kitting shelf 302 are in fixed positions in this example, but each has a conveyor belt which may be capable of being moved in forward and back directions and/or at different speeds. In addition, the control computer 324 may use information stored in connection with initialization and/or configuration, e.g., which items are on which location(s) on which kitting shelf system (or on which shelf of which kitting shelf system), where each kitting shelf system and/or its associated pick up zone (e.g., presentation face(s)) is located, etc., to determine a plan to fulfill a requirement. In addition, control computer 324 may use data determine based at least in part on sensor data, such as video captured by a sensor (e.g., camera 304, camera 306, sensor 328, and/or sensors 332), to make a plan to fulfill a requirement.

According to various embodiments, kitting of items from one or more kitting shelf systems is improved through use of a dynamic kitting method or system that determines a path or trajectory for kitting of an item using one or more of an attribute of the item to be singulated and an attribute of another item within the workspace (e.g., an item and/or receptacle on the conveyor). The dynamic kitting method or system may include an updating of the path or trajectory for kitting of an item in response detecting one or more of an attribute of the item to be kitted and an attribute of another item within the workspace (e.g., an item on the conveyor). The dynamic kitting method or system may include an updating of the conveyance of an item from a feeder portion of a kitting shelf system to a presentation face of the kitting shelf system in connection with kitting of an item (or object from an item on the kitting shelf system) in response to determining an attribute of the workspace. The attribute of the workspace used in connection with updating the plan for kitting the item/object may include an attribute of an item/object to be kitted, a quantity of objects within an item (e.g., a tray on a kitting shelf system), a speed of the conveyor, a characteristic associated with a receptacle on the conveyor, an orientation of the item on the kitting shelf system, an orientation of a presentation face of the kitting shelf system, control of the disrupter device, determining a strategy for controlling/regulating flow at the chute, etc. In some embodiments, robotic kitting system 300 (e.g., control computer 324) dynamically updates the plan for kitting the item during kitting based on a context of the workspace (e.g., a state or condition of the item, a property of the item, another item within the workspace, a speed of conveyor 308, an identifier of receptacle 309, etc.).

In some embodiments, robotic kitting system 300 includes a teleoperation device 312, and a containerized robotic system 316 comprising control computer 324. Teleoperation device 312 may be comprised at containerized robotic system 316, at the destination location, or at a remote location. In the example shown, operation of kitting shelf 302, conveyor 308; and robot 320, and/or carriage are operated in a coordinated manner under the control of control computer 324. In the example shown, control computer 324 is in communication (e.g., wireless communication) with controllers, not shown in FIG. 3D, each configured to control operation of a corresponding element comprising robotic kitting system 300, e.g., kitting shelf 302; robot 320, conveyor 308, carriage on which robot 320 is mounted, and/or receptacle source (not shown). Although wireless connections are shown in FIG. 3D, in various embodiments wired connections or a combination of wired and wireless connections may be used.

In some embodiments, the gate structure controls flow of items from the feeder portion to the presentation face. The gate structure may serve to isolate an item (e.g., a tray from which objects are picked) to facilitate easier removal of the tray upon a determination that the tray is empty. The isolation of the tray by the gate structure allows for the tray to be removed from the corresponding shelf (e.g., the presentation face) without the tray contacting other trays on the shelf (e.g., buffer trays such as the trays on the feeder portion behind the gate). Incidental contact between an empty tray (e.g., during removal of the tray) with buffer trays may cause the robotic arm to drop the empty try, or may cause one or more of the buffer trays to become misaligned or jammed.

According to various embodiments, the gate structure permits or prevents an item to flow from a feeder portion to the presentation face. The control of flow of items from the feeder portion to the presentation face may prevent items from being cluttered on the presentation face and can assist with providing sufficient space and order of items on the presentation face for a robotic arm to pick and place an item/object from the presentation face. Limiting the number of items on a presentation face (e.g., controlling the flow of items) may also improve the sensing or perception of items on the presentation face, and/or prevent an overflowing of items to the presentation face, which could cause an uncontrolled motion of items. The gate structure may be configured to prevent/inhibit more than a threshold of items to be disposed on a presentation face at any particular time. In some embodiments, the gate structure is toggled (e.g., moved) between an open position and a closed position. As an example, the open position may correspond to an orientation of the gate structure when no item is present on the presentation face. As another example, the open position may correspond to an orientation of the gate structure when a quantity of items on the presentation of items is less than a threshold number of items. As another example, the open position may correspond to an orientation of the gate structure when a weight on (or force applied to) to the presentation face is less than a threshold weight (or threshold force). When the gate structure is oriented in the open position, a flow or conveyance of an item from the feeder portion to the presentation face may be permitted (e.g., unblocked). Conversely, when the gate structure is oriented in the closed position, a flow or conveyance of an item from the feeder portion to the presentation face may be prevented (e.g., the flow of items is blocked). In some implementations, a portion of the presentation faces may be used to block conveyance of items from the corresponding feeder portions; the corresponding gate portions may be hinges operatively coupled to presentation faces. In some embodiments, the gate structure is configured to move an element that is distinct from the corresponding presentation face in connection with moving to an open position and/or closed portion.

In some embodiments, the gate structure is mechanically operated (e.g., to move between the open position and the closed position) based at least in part on a weight (e.g., a weight of an item, if any) applied to the corresponding presentation face. The gate structure may include a biasing element that biases the gate structure to be oriented in the open position. If a force applied to the presentation face (e.g., corresponding to the weight of the item on the presentation face) exceeds the biasing of the gate structure, the gate structure may operate to orient in the closed position. In some embodiments, the gate structure is electromechanically operated. For example, the gate structure may receive a signal and based at least in part on the signal the gate structure may operate in a closed position or an open position. The signal may be provided by a computer, such as control computer 324. The signal to control the gate structure may be determined/provided based at least in part on information obtained by one or more sensors in the workspace. For example, image data obtained by a sensor (e.g., camera 304, camera 306, and/or sensor 328 or sensor 332) of robotic kitting system 300 may be used in connection with determining whether to gate structure is to be oriented in the open position or closed position (e.g., based at least in part on a determination of whether an item is disposed on the corresponding presentation face). Information obtained by one or more other sensors may be used in connection with determining whether to control the gate structure is to be oriented in the open position or closed position. Examples of sensors that may be implemented to obtain such information include a weight sensor, a force sensor, a torque sensor, a pressure sensor, an infrared sensor, etc. The information used in connection with determining whether to control the gate structure to be oriented in the open position or closed position may be used to determine whether an item is on the corresponding presentation face, to determine whether an item(s) on the presentation face exceed a threshold value (e.g., a threshold weight, a threshold force), etc. As an example, a model of information obtained by the one or more sensors may be generated. The model may determine/define information that is indicative of whether an item is present on the presentation face, or whether a quantity of items present on the presentation face is less than a threshold quantity of items, etc. The control computer 324 may use the model to determine whether to control the gate structure to be oriented in the open position or the closed position. For example, in response to determining that an item is present on the presentation face, the control computer 324 may send a signal to the gate structure to cause the gate structure to move to a closed position (e.g., thereby preventing conveyance of further items to the presentation face).

As illustrated in FIG. 3D, a presentation face of kitting shelf 302 is movable. For example, the presentation face toggle between an empty position and an occupied position. Although the example illustrated in FIG. 3D illustrates the presentation face toggling between two positions/orientations, the kitting shelf 302 may be configured for the presentation face to be moved to orient in one of a plurality of positions/orientations. For example, the presentation face may be oriented in any one of the plurality of positions/orientations based at least in part on a context of the workspace (e.g., an item to be provided on the presentation face, a location of a robotic arm to pick the item, a size of the robotic arm, a location of a sensor or camera, etc.).

In various embodiments, the empty position corresponds to a position at which the presentation face is oriented to facilitate a flow/conveyance of one or more items from the feeder portion to the presentation face. For example, the empty position may correspond to a position at which the presentation face is oriented when a quantity of items on the presentation face is less than a threshold number. As another example, the empty position corresponds to a position at which the presentation face is oriented when the presentation face is empty (e.g., does not have any items disposed thereon). As another example, the empty position corresponds to a position at which the presentation face is oriented when a weight on (or force applied to) the presentation is less than a threshold weight (or threshold force). In some embodiments, each presentation face in a particular kitting shelf (e.g., kitting shelf 302) may have a same angle of orientation (e.g., such as an angle relative to a normal to the ground) when orientated in corresponding empty positions. In some embodiments, two or more presentation faces in a particular kitting shelf system (e.g., kitting shelf 302) have different angles of orientation (e.g., such as an angle relative to a normal to the ground) when orientated in corresponding empty positions. As an example, a first set of one or more presentation faces has an angle of orientation that is different from an angle of orientation of a second set of one or more presentation faces. As another example, each presentation face within a particular kitting shelf system has a different angle of orientation (e.g., such as an angle relative to a normal to the ground) when orientated in a corresponding empty position. The shelves (e.g., at least one of the corresponding feeder portion and the kitting portion) on a kitting shelf system can be configured at different angles based on a height of the shelf relative to the ground. The configuring of shelves at different angles may permit a better line of sight for sensors in the workspace, such as sensor 328 or sensor 332, and such a configuration may improve the information pertaining to the workspace (e.g., identifiers on the items may be obtained more easily or accurately, etc.).

In some embodiments, a bottom shelf on which items are presented (e.g., a shelf from which an item may be obtained such as the shelf corresponding to feeder portion) has a corresponding presentation face that has less of a range of motion than presentation faces of higher shelves such. The presentation face on such a bottom shelf may be fixed relative to the feeder portion. For example, the presentation face on such a bottom shelf may be integrated with the feeder portion or not otherwise change positions relative to the feeder portion. Such a bottom shelf or the presentation face of such bottom shelf may have a shallower pitch/angle than one or more higher shelves or of the presentation faces for the one or more higher shelves. In some embodiments, shelves (e.g., presentation faces of such shelves such as when an item is on the presentation face) has a progressively shallower pitch or angle the lower the shelf is on the kitting shelf system such as robotic kitting system 300.

In various embodiments, the occupied position corresponds to a position at which the presentation face is oriented to facilitate picking of one or more items (e.g., by the robotic arm) from the presentation face. The presentation face may be oriented in the occupied position when conveyance/flow of one or more items from the feeder portion to the presentation face is to be prevented. In some embodiments, each presentation face in a particular kitting shelf system (e.g., kitting shelf 302) may have a same angle of orientation (e.g., such as an angle relative to a normal to the ground) when orientated in corresponding empty positions. In some embodiments, two or more presentation faces in a particular kitting shelf system have different angles of orientation (e.g., such as an angle relative to a normal to the ground) when orientated in corresponding occupied positions. As an example, a first set of one or more presentation faces has an angle of orientation that is different from an angle of orientation of a second set of one or more presentation faces. As another example, each presentation face within a particular kitting shelf system has a different angle of orientation (e.g., such as an angle relative to a normal to the ground) when orientated in corresponding occupied positions. The shelves (e.g., at least one of the corresponding feeder portion and the kitting portion) on a kitting shelf system can be configured at different angles based on a height of the shelf relative to the ground. The configuring of shelves at different angles may permit a better line of sight for sensors in the workspace, such as sensor 328 and/or sensor 332, and such a configuration may improve the information pertaining to the workspace (e.g., identifiers on the items may be obtained more easily or accurately, etc.).

In some embodiments, the orientation of the presentation face may have a greater tilt downwards the lower the corresponding shelf is to the ground. Such an orientation of the presentation face may enhance one or more sensors (e.g., sensor 328 and/or sensor 332) to obtain information pertaining to the presentation shelf or one or more items/objects on the presentation face. In addition, such an orientation may enhance the ability of the robotic arm to engage an item with the end effector of the robotic arm. A robotic arm may have limitations with respect to its wrist extension capabilities/configurations and/or its wrist flexion capabilities/configurations. As an example, the orientation of the presentation face (e.g., at least in the occupied position) is configured based at least in part on an extent of wrist extension that is required by a robotic arm to pick the item/object from the presentation face). The shelf/presentation face may be configured based at least in part on the range of motion of a wrist of a robotic arm in the kitting shelf system (e.g., a range of motion with respect to wrist extension/flexion). An end effector or wrist component of the robotic arm may have size limitations that inhibit the ability of the robotic arm to engage (e.g., at certain angles and heights/locations) an item disposed on a presentation face. Accordingly, the orientation of the presentation face (e.g., at least in an occupied position) of a shelf may be configured to improve the likelihood/ability of the robotic arm to configure its position to engage an item/object on the presentation face with an end effector of the robotic arm at an orthogonal relative to the item/object. The orientation of the presentation face when in the occupied position can correspond to an orientation in which a tray/item disposed thereon is optimally angled (at each level/shelf) for a better vision from an onboard camera (e.g., a camera disposed in the workspace and/or on a robotic arm or chassis thereof). In some embodiments the orientation of the presentation face in the empty position and/or occupied position is based at least in part on a configuration of the corresponding gate structure. For example, if the gate structure is a hinge, the orientation of the presentation face in the empty position and/or occupied position is based at least in part on a range of motion of the hinge.

According to various embodiments, kitting shelf 302 includes one or more feeder portions. In some embodiments, kitting shelf 302 may have a single feeder portion that conveys one or more items to a plurality of presentation faces. In other embodiments, kitting shelf 302 has a single feeder portion for each presentation face (e.g., a one-to-one mapping of feeder portions to presentation faces). The feeder portion may be configured to convey an item to a presentation face. As an example, the conveyance of the item may be passive such as via gravity acting on an item disposed on the feeder portion (e.g., in the case that the feeder portion is configured to tilt towards the presentation face). As another example, the conveyance of the item may be at least partially active based on the feeder portion being configured with a conveyor that carries an item from an input location of the feeder portion to the presentation face. In various embodiments, the feeder portion configured to receive a succession of items on a receiving end (e.g., an input to the feeder portion) and convey the items to a destination end (e.g., an end that is operatively connected/coupled to a presentation face or that otherwise exits the feeder portion to the applicable presentation face). The succession of items may be manually loaded to the feeder portion or kitting shelf system (e.g., via a human operator 314), or the succession of items may be automatically loaded to the feeder portion (e.g., via a robotic arm/component, or based at least in part on the feeder portion being coupled to a chute that conveys items from a source flow/pile).

In some embodiments, kitting shelf 302 includes a return portion. The return portion may include a shelf that is directed to a return area (e.g., having a slope that conveys items such as empty trays/receptacles to away from the workspace). According to various embodiments, an item can be returned to a predetermined location via the return portion. The item may be returned in response to a determination that the item is empty (e.g., all objects within item have been kitted to corresponding receptacles); in response to a determination that the item is defective; in response to a determination that the item was not in a correct location (e.g., the item was improperly conveyed to the presentation face such as based at least in part on a type of objects within the item, etc.); etc.

In some embodiments, the robotic kitting system 300 includes one or more shelves that are stationary (e.g., that do not include a gate structure and/or a presentation face that moves based on whether an item is located on the presentation face).

In various embodiments, a robotic system as disclosed herein includes and/or does one or more of the following, e.g., by operation of a control computer such as control computer 324:

Computer vision information is generated by merging data from multiple sensors, including one or more of 2D cameras, 3D (e.g., RGBD) cameras, infrared, and other sensors to generate a three-dimensional view of a workspace that includes one or more kitting shelf systems (which may correspondingly include one or more shelves of the kitting shelf system). The robotic system determines characteristics of items and/or debris or other abnormalities in the tree-dimensional view of the workspace.

The robotic system coordinates operation of multiple robots to avoid collisions, getting in each other's way, and contending to pick up the same item and/or place an item in the same destination location (e.g., receptacle on the conveyor) as another robot. The robotic system coordinates operation of a plurality of robots operating within a same workspace to perform kitting with respect to a plurality of items/object (e.g., to kit items in different receptacles or within a same receptacle). As an example, in various embodiments, the plurality of robots operate independently to pick and place items. As another example, the plurality of robots operate to independently pick and place items for different orders (e.g., to place different sets of items in different receptacles). If a risk of collision is detected, responsive action is taken to ensure the plurality of robots do not collide with one another during kitting.

The robotic system coordinates operation of multiple robots to ensure all items are placed in corresponding receptacles. For example, if robot A drops an item system tasks robot B to pick it up; item placed but with improper orientation is picked up and adjusted or moved to another location by same or another robot; two or more items for different orders are placed in a single receptacle results in a downstream robot picking one of the two or more items from the receptacle and placing the item in a new receptacle; etc.

The robotic system continuously updates motion planning for each robot and all of the robots together to achieve a desired collective throughput (e.g., to maximize collective throughput, to attain a predefined threshold of collective throughput, etc.). In response to determining that two or more robots have collided or will collide if moving according to their respective plans for kitting items, the robotic system implements an active measure to ensure that the two or more robots avoid collision or otherwise reset independent operation of the two or more robots.

In response to a determination that two robots independently are tasked to acquire the same item, the system picks one at random to get that item and the other moves on to the next item (e.g., identify, select, determine grasp strategy, pick, move according to plan, and place).

The robotic system can manage the independent operation of a plurality of robots to ensure that the robots select items at different times to avoid the same item being selected for kitting by two different robots.

Controller conveyor movement and/or speed as needed to achieve a desired robot productivity (throughput) and to permit sufficient time for the robot to place an object into the desired receptacle.

In response to a determination that an item is misplaced or dropped, the robotic system assigns a robot or, if needed, a human worker to pick the misplaced item up and place the item back in the applicable kitting shelf system (e.g., on a shelf such as via the feeder portion) or, if available or more optimal, on a receptacle on the conveyor.

Upstream robots controlled to intentionally leave some receptacles open for downstream robots to place items on the conveyor (e.g., in the corresponding receptacles).

Downstream robots controlled to correct errors from an upstream placing an item in a receptacle on the conveyor (e.g., to correct the placement of an item that rests in more than one receptacle such as a tray, or that rests on the conveyor rather than the applicable receptacle, to update a data structure with an association between an identifier for the item or kit/order with the receptacle in which the upstream robot placed the item, etc.).

Failure that cannot be corrected by same or another robot results in an alert being communicated to obtain human (or other robotic) intervention to resolve.

In response to a determination that a grip strength (e.g., a pressure attained by the end effector) is abnormal (e.g., less than is expected during normal operation), perform a diagnostic process that includes testing the grip strength on a predefined surface and in connection with determining whether remedial action is necessary with respect to the end effector.

Move/remove the debris within the workspace, or to reconfigure an item to be kitted (e.g., to improve the likelihood that the item is successfully picked from the shelf, or the presentation face of the shelf, and placed on the conveyor such as in a receptacle on the conveyor).

Use sensor data from the workspace environment state system to detect one or more characteristics (e.g., attributes) of the item selected for kitting, determine that grasping or releasing of the item is expected to improve in response to implementation of an active measure, and implement the active measure to improve the grasping or releasing of the item.

Use sensor data to determine that the robotic arm has grasped a plurality of items in connection with kitting of one of the items, determine a plan for releasing the plurality of items in order to place each item singly in a corresponding location in one or more receptacles on the conveyor or to place one of the items back on the shelf/presentation face of the kitting shelf system (e.g., determine a strategy for operating the end effector to release a first subset of the plurality of items at a different time from a second subset of the plurality of items).

Use sensor data to determine whether to control a flow of items to the workspace, and in response to determining to control the flow of items, controlling the disrupter device (e.g., to move/re-orient the flow disrupter). A strategy for controlling the flow of items at the chute may be determined, and the system may implement the strategy, including communicating a signal or instruction to the disrupter device.

Select a path for kitting an item to a receptacle on the conveyor based on an attribute of the item (e.g., a size of the selected item, a weight of the item, etc.) and/or one or more attributes (e.g., characteristics) of an item within a receptacle on the conveyor.

Determine a movement and speed of the robotic arm that picks an item from the kitting shelf system and places the item in the applicable receptacle based at least in part on a speed of a conveyor belt.

Determine a trajectory of the item to be kitted based at least in part on one or more of a characteristic of the item, a characteristic of the workspace environment, and/or a characteristic of the conveyor (e.g., a speed of the conveyor belt).

Determine a probability of successful kitting corresponding to one or more paths/trajectories of an item to be kitted, and select a path/trajectory along which the item is to be kitted based on the corresponding probability of success.

Determine a positioning of a robot arm and/or an end effector of the robot arm to obtain a successful grasp (e.g., as determined based on a probability of grasp success, a type of packaging of the item, a dimension of the item, an expected grip strength in relation to a threshold value, etc.). The positioning of the end effector can include controlling the robot arm or a wrist of the robot arm to move in order for the end effector be orthogonal to a surface of the item.

Update the ability of the robotic system to detect an empty receptacle. For example, the definition of an empty receptacle used by the robotic system to identify an empty receptacle is updated over time.

Figure 3E:
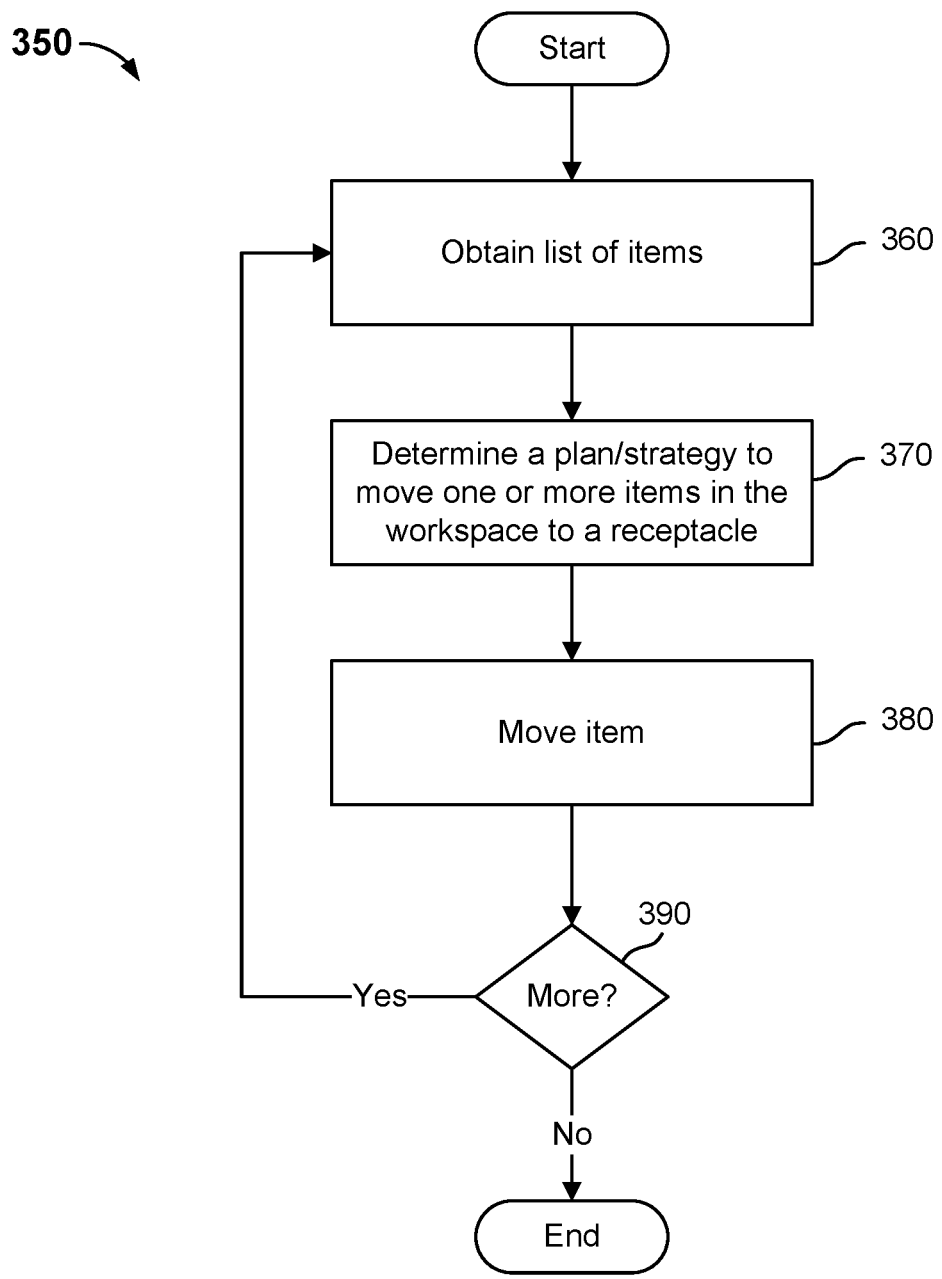
FIG. 3E is a flow chart illustrating an embodiment of a process to pick from a kitting shelf system and place items in a receptacle.

FIG. 3E is a flow chart illustrating an embodiment of a process to pick from a kitting shelf system and place items in a receptacle. In some embodiments, process 350 is implemented by a robot system operating to kit one or more items within a workspace. The robot system includes one or more processors which operate, including by performing the process 350, to cause a robotic structure (e.g., a robotic arm) to pick and place items for assembling a set of items into a kit.

At 360, a list of items is obtained. In some embodiments, a robotic system obtains a list of items to assembly into one or more kits. The list of items may be obtained from an invoice or manifest such as an invoice or manifest corresponding to an order, or otherwise obtained from an order or information indicating that a set of items is to be provided to another location. The list of items may be obtained from a data structure such as a data structure shared with a warehouse system or with another robotic system.

At 370, a plan or strategy to move one or more items in the workspace is determined. In some embodiments, a robotic system determines the plan or strategy to pick at least one item from a shelf (e.g., a shelf of a shelf machine) in the workspace and to place the at least one item in a receptacle such as a box, tray, tote, bag, or other receptacle. The receptacle may be on a conveyor. The plan or strategy to singulate the one or more items may be determined in various embodiments on a robot-by-robot basis such that if the robotic system includes a plurality of robots, each robot operates independent of the other robot(s).

The plan or strategy to move the one or more items may be determined based at least in part on sensor data pertaining to the workspace. In some embodiments, a robotic system obtains the sensor data pertaining to the workspace from one or more sensors operating within the system. As an example, the sensor data is obtained based at least in part on outputs from image sensors (e.g., 2D or 3D cameras), an infrared sensor array, a laser array, a scale, a gyroscope, a current sensor, a voltage sensor, a power sensor, a force sensor, a pressure sensor, and the like.

According to various embodiments, the obtained sensor data pertaining to the workspace comprises information from which a model of the workspace may be generated. For example, one or more characteristics associated with the workspace is determined based at least in part on the sensor data. The sensor data can be used in connection with determining at least one characteristic of one or more items within the workspace such as items on a shelf or on a shelf system, or an item grasped by the robotic arm. In some embodiments, the sensor data is used in connection with determining one or more characteristics of the conveyor such as determining the slots or receptacles on the conveyor that are empty or unreserved, determining a speed of the conveyor, and/or determining the characteristics of at least one slot or of at least one item already on the conveyor.

According to various embodiments, the plan or strategy to move the one or more items in the workspace is determined based at least in part on the sensor data. For example, the plan or strategy to move the one or more items includes selecting an item within that is to be moved. The selected item can be identified from among other items or objects within the workspace (e.g., other items on shelves) based at least in part on the list of items and/or sensor data (e.g., the boundaries of the item and other items or objects within the workspace can be determined). As an example, one or more characteristics pertaining to the selected item is determined based at least in part on the sensor data. The one or more characteristics pertaining to the selected item can include a dimension of the item, a packaging of the item, one or more identifiers or labels on the item (e.g., an indicator that the item is fragile, a shipping label on the item, etc.), an estimated weight of the item, and the like, or any combination thereof. As another example, the plan to move the one or more items includes determining a location on the conveyor (e.g., a slot or receptacle on the conveyor) at which the robotic structure (e.g., the robotic arm) is to place the item. The location on the conveyor at which the item is to be placed can be determined based at least in part on a timestamp, a speed of the conveyor, and one or more characteristics of a slot or receptacle in the conveyor (e.g., an indication of whether the slot is occupied or reserved, an identifier associated with the slot or receptacle such as in the case that an identifier on a receptacle is mapped to a manifest, etc.), and the like, or any combination thereof. As another example, the plan or strategy to move the one or more items includes determining a path or trajectory of the item along which the robotic arm is to move the item. The path or trajectory of the item along which the item is to be moved can be determined based at least in part on a location of one or more other objects within the workspace such as a frame of the chute, other items in on a shelf or shelf system, items on the conveyor, other robots operating within the workspace, a reserved airspace for operation of other robots, sensors within the workspace, etc. For example, the path or trajectory of the item is determined to move a part of the item comprising an identifier (e.g., a shipping label) to an area at which a scanner is able to scan the identifier, or the path or trajectory of the item is determined to maximize a likelihood that the identifier on the item is read by one or more scanners along the path or trajectory.

According to various embodiments, the plan or strategy to move the one or more items is determined based at least in part on a cost associated with moving the one or more items. The system may determine the plan or strategy for moving an item based at least in part a cost of moving the item such as by determining a plan or strategy that minimizes a cost of moving the item. To minimize the cost of moving the item may include optimizing the cost subject to one or more predetermined conditions or constraints. In some embodiments, the system determines the plan or strategy for moving the item in a manner that moving the item according to the plan or strategy is expected to cost less than a cost value threshold. The costs associated with moving the item may be based at least in part on an attribute associated with the item (e.g., a size of the item), a location in the workspace from which the item is to be picked (e.g., a location on the shelf or shelf system), a destination location on the conveyor at which the item is to be placed, a particular receptacle in which to place the item (e.g., different receptacles may be located on different conveyors), etc. In some embodiments, the presence of one or more other items or objects in the workspace (e.g., an item or receptacle already on the conveyor, an item already in the receptacle to which the current item is to be moved, etc.) may impact a cost of moving an item according to a path/trajectory, etc.

In some embodiments, the plan or strategy to move the one or more items in the workspace comprises determining whether to control/regulate the flow of items at the chute or otherwise in being provided to the workspace. The plan or strategy may further comprise a determination of a manner by which the flow of items is to be controlled. For example, the system may determine to control to improve the flow of items (e.g., to increase the rate of items being provided to the workspace, to increase the number of items provided to the workspace, etc.). As another example, the system may determine to control to decrease or impede the flow of items (e.g., to decrease the rate of items being provided to the workspace, to decrease the number of items provided to the workspace, etc.). The system may determine whether to control/regulate the flow of items based at least in part on the sensors data such as information pertaining to items in the workspace (e.g., a quantity of items, a density of items, an indication of whether a threshold number of items are occulated, a likelihood that a threshold number of items can/cannot be grasped, etc.).

At 380, the item is moved. In some embodiments, the item is picked and placed in response to the plan or strategy for singulating the item being determined. For example, a robotic arm is operated to pick one or more items from the workspace and place each item in a corresponding location in a receptacle. The singulation of the item comprises picking the item from the workspace (e.g., from the corresponding shelf) and placing the item on the conveyor or otherwise in the applicable receptacle. The robot system picks and places the item based at least in part on the plan or strategy for moving the item.

At 390, a determination is made as to whether further items are to be singulated. If there are more items, a further iteration of steps 360, 370, and 380 is performed, and successive iterations are performed until it is determined at 390 that there are no more items in the chute (or other receptacle or source) to be picked and placed.

Figure 4A:
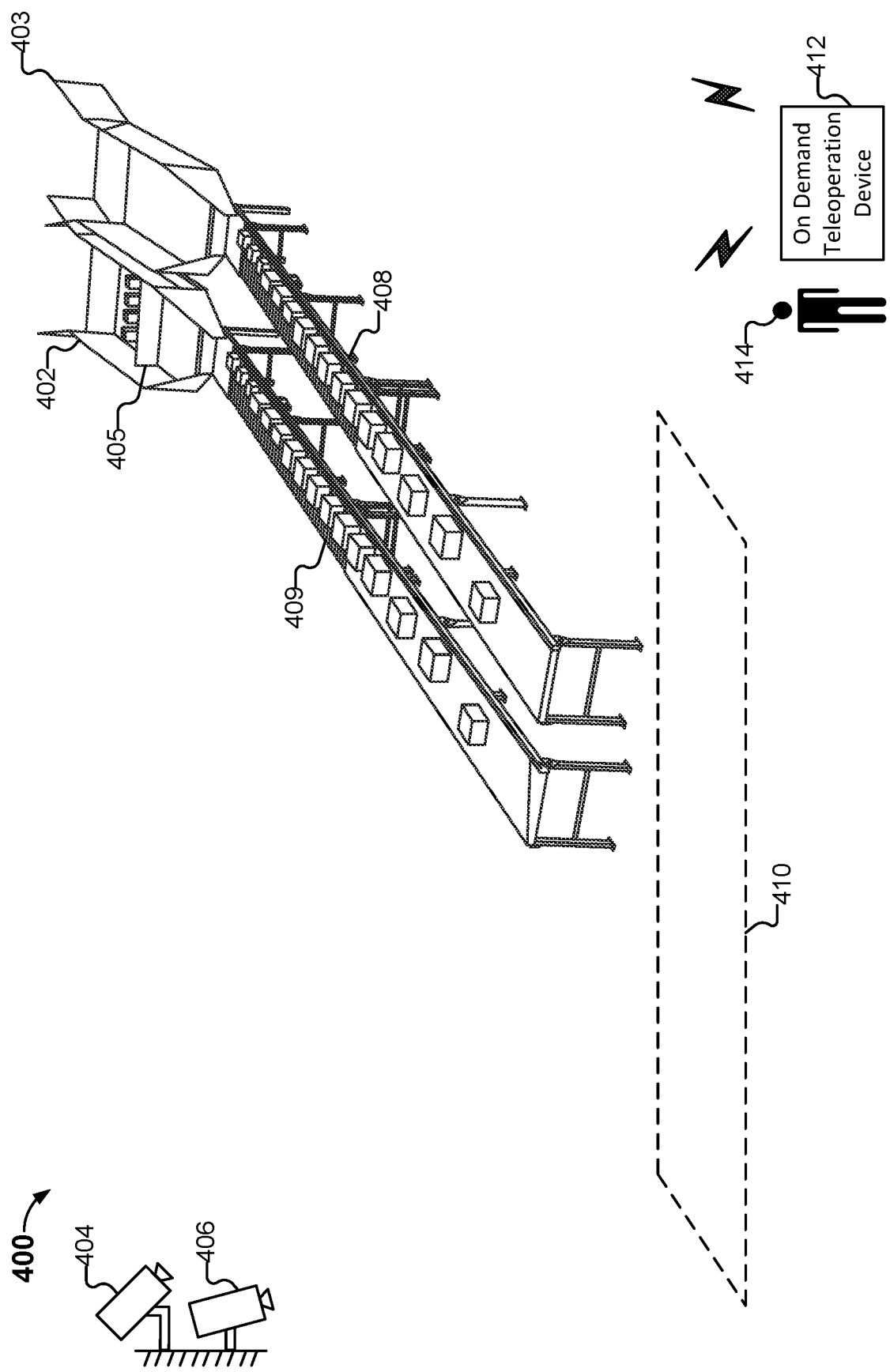
FIG. 4A is a diagram illustrating an embodiment of a workspace in which a robotic system is to be deployed in connection with palletizing/depalletizing an item.

FIG. 4A is a diagram illustrating an embodiment of a workspace in which a robotic system is to be deployed in connection with palletizing/depalletizing an item.

According to various embodiments, a containerized robotic system may be used in connection with a system for palletizing and/or de-palletizing one or more items. The containerized robotic system may be deployed at a destination location that is configured (or partly configured) to perform palletizing and/or de-palletizing of one or more items. For example, the destination location may comprise one or more components used in robotic palletizing system 400 for palletizing and/or de-palletizing one or more items. As illustrated in FIG. 4A, the destination location may one or more chutes (e.g., chute 402 and/or chute 403), one or more sensors (e.g., camera 404 and/or camera 406), one or more conveyors (e.g., conveyor 408 and/or conveyor 409), and an teleoperation device 412 (e.g., on-demand teleoperation device) usable by a human operator 414 to operate one or more of components of robotic palletizing system 400 (e.g., a robotic arm in the containerized robotic system, an end effector, and conveyor 408 or conveyor 409) by teleoperation. In some embodiments, robotic palletizing system 400 further comprises a disrupter device 405 that may be controlled (e.g., by a computer system) to control/regulate a flow of items through a chute (e.g., chute 402).

In some embodiments, a location 410 at which a containerized robotic system is to be deployed is determined. The location 410 may be determined based on a location of one or more other components in the environment (e.g., workspace) in which the containerized robotic system is to be deployed, and/or one or more capabilities of the containerized robotic system. As an example, the location 410 may be determined based on a size and/or range of a robot of the containerized robotic system. As another example, the location 410 may be determined based on a location of chute 402, chute 403, conveyor 408, and/or conveyor 409. Location 410 may be identified manually such as by a physical marking on a ground at the destination location, such as via the use of paint. In some embodiments, the location 410 is identified using a laser or other projected information at location. For example, a laser or other projector may be mounted at the destination location, such as on kitting chute 402, chute 403, conveyor 408, and/or conveyor 409, a wall of destination location, etc. The location 410 may be marked via a projection of a reference point such as a line denoting a side of the containerized robotic system, a point denoting a corner of the containerized robotic system, an outline of a circumference of the containerized robotic system, etc.

Figure 4B:
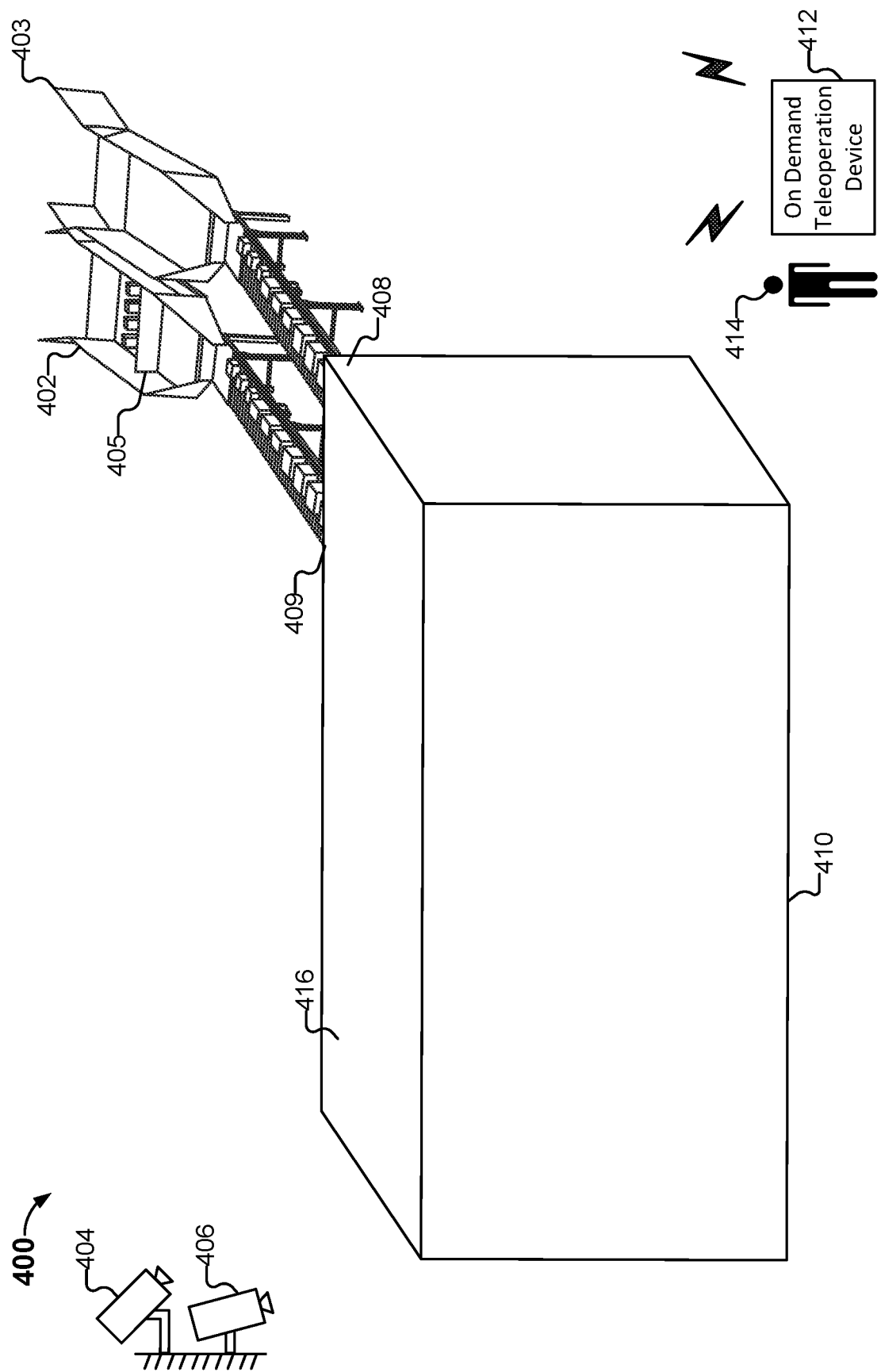
FIG. 4B is a diagram illustrating an embodiment of a workspace in which a robotic system is to be deployed in connection with palletizing/depalletizing an item.

FIG. 4B is a diagram illustrating an embodiment of a workspace in which a robotic system is to be deployed in connection with palletizing/depalletizing an item.

According to various embodiments, the relative ease with which containerized robotic system 416 may be moved to/from location 410 limits the resources (e.g., labor, time, etc.) required to deploy containerized robotic system 416 and/or to replace a containerized robotic system. In conventional systems, if a robot required replacement, the removal of the existing robot and installation of a new robot was cumbersome and required significant resources. For example, robots of conventional systems are mounted directly to the floor of the destination location, and the de-mounting of such a robot is time and labor intensive. As another example, a robot of conventional system generally has a relatively irregular shape and center of gravity thereby complicating the removal of such a robot. In contrast, a containerized robotic system according to various embodiments may be relatively easily and quickly removed such as via forklift, crane, etc. The de-installation/removal of the containerized robotic system may include attaching the detachable superstructure to the base of the containerized robotic system, and moving the containerized robotic system from location 410. A replacement containerized robotic system may be relatively easily moved into position (e.g., to location 410) and deployed by removing the corresponding detachable superstructure, etc.

Containerized robotic system 416 is sufficiently rigid and heavy that installation of containerized robotic system 416 includes placing the containerized robotic system 416 at location 410. According to various embodiments, installation and/or deployment containerized robotic system 416 does not otherwise require containerized robotic system 416 to be mounted or fixed to destination location.

Figure 4C:
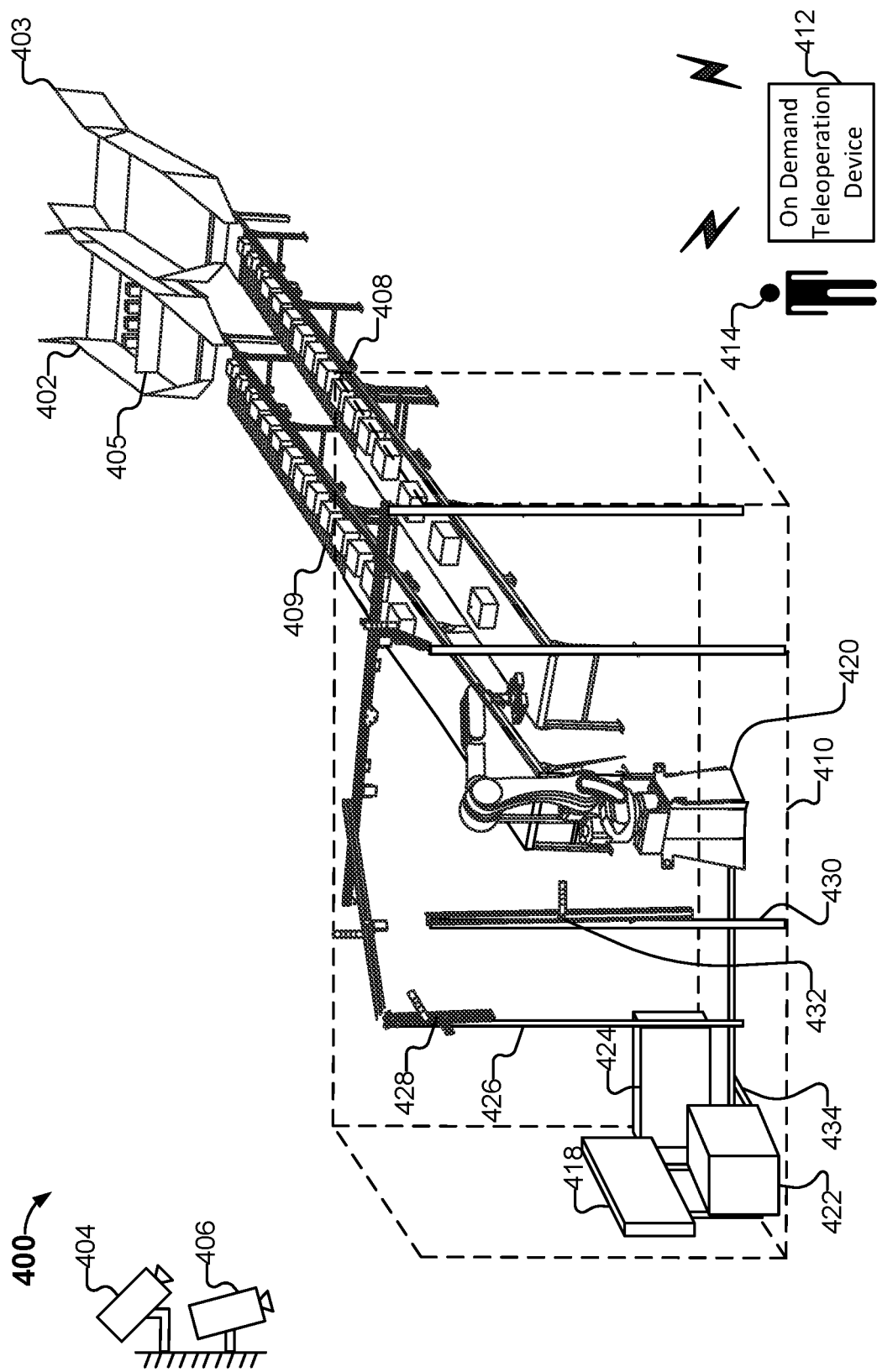
FIG. 4C is a diagram illustrating an embodiment of a workspace in which a robotic system is to be deployed in connection with palletizing/depalletizing an item.

FIG. 4C is a diagram illustrating an embodiment of a workspace in which a robotic system is to be deployed in connection with palletizing/depalletizing an item.

According to various embodiments, containerized robotic system 316 may comprise one or more of power distribution unit 418, robot 420, compressor 422, and control computer 424. Containerized robotic system 416 may include one or more channels mounted to a frame of containerized robotic system 416 or formed within a wall of a side of containerized robotic system 416. Components within containerized robotic system 416 may be connected via a connection (e.g., a wire/cable, tubing such as an airline, etc.) that is drawn through a channel (e.g., channel 434). In some implementations, the connections between components are drawn through the one or more channels, as applicable, and final connection there between is left until deployment of the containerized robotic system 416.

Deployment of containerized robotic system 416 includes connecting a power source at the destination location to power distribution unit 418 of containerized robotic system 416. Upon being provided with power, power distribution unit 418 may provide power to one or more other components of containerized robotic system 416, such as robot 420, control computer 424, compressor, sensor 428, and/or sensor 432. Control computer 424 may perform an initialization in response to being provided with power. The initialization may include executing software code that verifies connections with one or more other components of containerized robotic system 416 and/or of the destination location (e.g., conveyor 408, conveyor 409, a sensor such as camera 404, and/or camera 406).

As illustrated in FIG. 4C, sensor 428 is mounted to a sensor superstructure 426. Sensor superstructure 426 is oriented in a collapsed orientation while the containerized robotic system 416 is enclosed (e.g., while at least part of the detachable superstructure is connected to the base or frame of the containerized robotic system 416). Similarly, sensor 432 is mounted to sensor superstructure 430, and sensor superstructure 430 is oriented in a collapsed orientation while the containerized robotic system 416 is enclosed. Sensor 428 and sensor 432 may include an image system such as a 2D/3D camera, 3D cameras, force sensors, a radar sensor, a Light Detection and Ranging (LIDAR) sensor, a laser sensor, an infrared sensor, a sensor array, a weight sensor, and other sensors, etc. Various other sensors may be included in containerized robotic system 416 and/or of the destination location. The sensors may provide obtain information pertaining to the workspace, an item in the workspace, a component in the workspace, etc., and provide sensor data to the control computer 424. The sensor data may be generated based at least on the information pertaining to the workspace, an item in the workspace, a component in the workspace, etc., and provide sensor data to the control computer 424. In some embodiments, the control computer 424 generates the sensor data based at least in part on information received from the various sensors in the robotic palletizing system 400 (e.g., sensor 428, sensor 432, etc.). The control computer 424 may control the disrupter device 405 (e.g., a flow disrupter) to control/regulate the flow of items in the chute (e.g., chute 402).

Figure 4D:
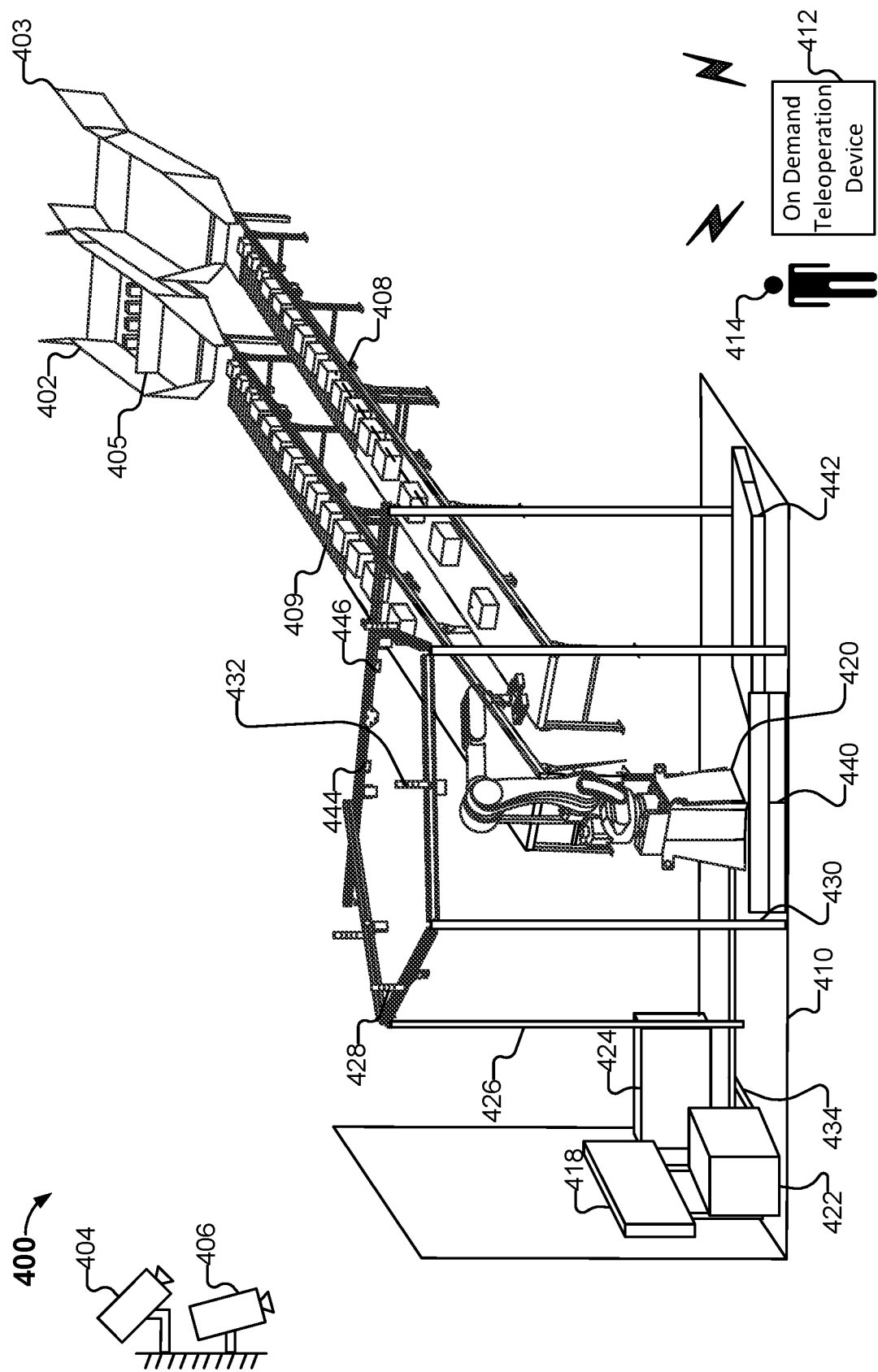
FIG. 4D is a diagram illustrating an embodiment of a workspace in which a robotic system is deployed in connection with palletizing/depalletizing an item.

FIG. 4D is a diagram illustrating an embodiment of a workspace in which a robotic system is deployed in connection with palletizing/depalletizing an item. In the example illustrated in FIG. 4D, containerized robotic system 416 is deployed in the robotic palletizing system 400 at the destination location. The detachable superstructure has been removed from containerized robotic system 416, sensor superstructure 426 is oriented in the corresponding deployed orientation, sensor superstructure 430 is oriented in the corresponding deployed orientation, and power is connected to power distribution unit 418. After deployment, including initialization of various components within robotic palletizing system 400, robot 420 may be controlled to palletize one or more items from conveyor 408 and/or conveyor 409 to pallet 440 and/or pallet 440. In some embodiments, robot 420 may be controlled to de-palletize one or more items from pallet 440 and/or pallet 440 to conveyor 408 and/or conveyor 409. In the example illustrated in FIG. 4D, containerized robotic system 416 includes a base and a side wall after the detachable superstructure is removed/detached. The side wall may be configured to remain connected to the base of containerized robotic system 416 at deployment to add weight, support, rigidity, etc. One or more components such as power distribution unit 418 and/or control computer 424 may be mounted to the side wall. In some embodiments, when containerized robotic system 416 is deployed, no side walls remain and the base of the container remains, and various components in the containerized robotic system 416 are at least partially mounted to the base (e.g., such components may also be partially mounted to the destination location).

In various embodiments, 3D cameras, force sensors, and other sensors and/or sensor arrays are used to detect and determine attributes of items to be picked and/or placed. Items the type of which is determined (e.g., with sufficient confidence, as indicated by a programmatically determined confidence score, for example) may be grasped and placed using strategies derived from an item type-specific model. Items that cannot be identified are picked and placed using strategies not specific to a given item type. For example, a model that uses size, shape, and weight information may be used. The sensors and/or sensor arrays may be disposed in or around a workspace of a robotic arm.

In various embodiments, a library of item types, respective attributes, and grasp strategies is used to determine and implement a strategy to pick and place each item. The library is dynamic in some embodiments. For example, the library may be augmented to add newly-encountered items and/or additional attributes learned about an item, such as grasp strategies that worked or did not work in a given context. In some embodiments, human intervention may be invoked if the robotic system gets stuck. The robotic system may be configured to watch (e.g., using sensors) and learn (e.g., updating a library and/or model) based on how a human teleoperator intervenes to use the robotic arm, for example, to pick and place an item via teleoperation. In some embodiments, teleoperation may include higher-level forms of feedback, such as a human indicating a particular point in a 2D RGB image at which the robot should grasp an object.

In some embodiments, a robotic system as disclosed herein may engage in a process to gather and store (e.g., add to library) attributes and/or strategies to identify and pick/place an item of unknown or newly discovered type. For example, the system may hold the item at various angles and/or locations to enable 3D cameras and/or other sensors to generate sensor data to augment and/or create a library entry that characterizes the item type and stores a model of how to identify and pick/place items of that type.

In various embodiments, a high-level plan to pick and place items on or in a pallet (e.g., pallet 440 and/or pallet 442) is made. Strategies are applied, e.g., based on sensor information, to implement the plan by picking and placing individual items according to the plan. Deviations from the plan and/or re-planning may be triggered, e.g., the robotic system gets stuck, the stack of items on the pallet is detected (e.g., by computer vision, force sensors, etc.) to have become unstable), etc. A partial plan may be formed based on known information (e.g., next N items visible on a conveyor, next N items on an invoice or manifest, etc.) and adjustments made as additional information is received (e.g., next items visible, etc.). In some implementations, the robotic palletizing system 400 is configured to stage (e.g., set aside, within reach) items determined less likely to be suitable to be stacked in a layer or container the system is currently building, such as a lower (or higher) layer in a pallet or container, etc. Once more information is known about next items to be picked/placed, a strategy that takes into account the staged (buffered) items and next items is generated and implemented.

Various embodiments include the simultaneous (e.g., concurrent or contemporaneous) palletization or depalletization of a set of one or more items. One or more robotic arms (e.g., a robotic arm on robot 420) may be controlled to concurrently stack (or de-stack) a set of items on a plurality of pallets (e.g., pallets 440 and 442). For example, a plurality of pallets may be disposed within range of a robotic arm, and the robotic arm may contemporaneously stack one or more items on at least a subset of the plurality of pallets (e.g., a set of two or more pallets). A pallet on which an item is to be placed (e.g., stacked) may be selected based at least in part on one or more of the item (e.g., an attribute of the item, a type of item, etc.), a characteristic of the pallet, an identifier of the pallet, a state of a stack of one or more items on the pallet, a manifest or order (e.g., an order in association with which the item is being packed and shipped), etc. A mix of items may be stacked on one or more pallets of the plurality of pallets.

In various embodiments, robotic palletizing system 400 determines a high-level plan to pick an item from a conveyance structure (hereinafter "conveyor") of one or more conveyors (e.g., conveyor 408 and/or conveyor 409), and to place the item on a pallet of one or more pallets disposed within range of a robot 420. Robotic palletizing system 400 determines the pallet on which to place the item. For example, the robotic system determines the pallet on which to place the item based at least in part on an order and/or manifest associated with the pallet. As another example, in the case of a plurality of pallets being delivered to a same address (e.g., a same customer), or being associated with a same manifest or order, the robotic system may determine the pallet on which to place the item based at least in part on a state of the pallet and/or a state of the plurality of pallets. Robotic palletizing system 400 may determine a state of a stack on one or more of the plurality of pallets, and determine the pallet on which to place the item based at least in part on a determination of a stack for which the item has a best fit. The determination that the stack for which the item has a best fit may be based at least in part on a stability of the stack, a model of the stack and/or a model of the stack comprising the item (e.g., after the item is placed on the stack), an expected one or more items that remain to be stacked (e.g., based at least in part on an order and/or manifest), etc. One or more attributes or characteristics pertaining to the item may be used in connection with determining the pallet on which to place the item (e.g., a size, shape, type of packaging, type of item, etc. may be used in connection with modelling the stack and/or determining where to place the item on a stack).

In some embodiments, robotic palletizing system 400 determines that place an item in a buffer or predefined staging area. Robotic palletizing system 400 may determine that a fit of the item on a stack on one or more pallets associated with the manifest and/or order to which the item corresponds is not currently ideal (e.g., that a threshold fit, or threshold stability would not be achieved if the item were to be placed on the stack). Alternatively, or in addition, robotic palletizing system 400 may determine that the item would fit better on the stack after one or more expected items are placed on the corresponding pallet. For example, robotic palletizing system 400 may determine that an expected fit of a current item or expected stability of the stack would be better (e.g., higher than the threshold fit or the threshold stability) if one or more expected items were first placed on the corresponding pallet. As an example, the one or more expected items may be determined based at least in part on one or more items on the conveyor 408 and/or conveyor 409. As another example, the one or more expected items may be determined based at least in part on a manifest and/or order with which the current item is associated. The one or more expected items may be determined based at least in part on a threshold number of subsequent items on the conveyor or to be stacked on the one or more pallets (e.g., to be delivered to the robotic arm for stacking), and/or manifest and/or order with which the current item is associated. The buffer or predefined staging area may correspond to one of the predefined zones disposed within range of the robotic arm. In some embodiments, in response to a determination that the buffer or predefined staging area is full (e.g., a number of items in the buffer/staging area exceeds a threshold number, or that the current item does not fit in the buffer/staging area), robotic palletizing system 400 may determine whether to place the current item or an item currently in the buffer/staging area. Robotic palletizing system 400 may determine whether placing an item from the buffer/staging area to a corresponding pallet (e.g., and thereby freeing up space in the buffer/staging area for the current item) would result in a better fit (e.g., a more stable stack) than placing the current item on a pallet. In response to determining that placing an item from the buffer/staging area to a corresponding pallet is expected to result in a better fit, the robotic system controls robot 420 to pick the item from the buffer/staging area and place the item on a pallet corresponding to a manifest and/or order to which the item belongs. Robot 420 then places the current item in the buffer and/or staging area until robotic palletizing system 400 determines that placing the item on a corresponding stack is ideal (e.g., that a threshold fit, or threshold stability would not be achieved if the item were to be placed on the stack).

According to various embodiments, robotic palletizing system 400 implements a machine learning process to model a state of a pallet such as to generate a model of a stack on the pallet. The machine learning process may include an adaptive and/or dynamic process for modeling the state of the pallet. The machine learning process may define and/or update/refine a process by which robotic palletizing system 400 generates a model of the state of the pallet. The model may be generated based at least in part on input from (e.g., information obtained from) one or more sensors (e.g., sensor 428 and/or sensor 432) in robotic palletizing system 400 such as one or more sensors or sensor arrays within workspace of robot 420. The model may be generated based at least in part on a geometry of the stack, a vision response (e.g., information obtained by one or more sensors in the workspace), and the machine learning processes, etc. Robotic palletizing system 400 may use the model in connection with determining an efficient (e.g., maximizing/optimizing an efficiency) manner for palletizing/depalletizing one or more items, and the manner for palletizing/depalletizing may be bounded by a minimum threshold stability value. The process for palletizing/depalletizing the one or more items may be configurable by a user administrator. For example, one or more metrics by which the process for palletizing/depalletizing is maximized may be configurable (e.g., set by the user/administrator).

In the context of palletizing one or more items, robotic palletizing system 400 may generate the model of the state of the pallet in connection with determining whether to place an item on the pallet (e.g., on the stack), and selecting a plan for placing the item on the pallet, including a destination location at which the item is to be placed, a trajectory along which the item is to be moved from a source location (e.g., a current destination such as a conveyor) to the item destination location. Robotic palletizing system 400 may also use the model in connection with determining a strategy for releasing the item, or otherwise placing the item on the pallet (e.g., applying a force to the item to snug the item on the stack). The modelling of the state of the pallet may include simulating placement of the item at different destination locations on the pallet (e.g., on the stack) and determining corresponding different expected fits and/or expected stability (e.g., a stability metric) that is expected to result from placement of the item at the different locations. Robotic palletizing system 400 may select a destination location for which the expected fit and/or expected stability satisfies (e.g., exceeds) a corresponding threshold value. Additionally, or alternatively, robotic palletizing system 400 may select a destination location that optimizes the expected fit (e.g., of the item on the stack) and/or expected stability (e.g., of the stack).

In the example shown, robotic palletizing system 400 includes containerized robotic system 416 comprising robot 420. In this example robot 420 is stationary, but in various alternative embodiments robot 420 may be a fully or partly mobile, e.g., mounted on a rail, fully mobile on a motorized chassis, etc. In other implementations, robotic palletizing system 400 may include a plurality of robotic arms with a workspace. As shown, robot 420 is used to pick arbitrary and/or dissimilar items from one or more conveyors (or other source) such as conveyors 408 and 409, and the items on a pallet (e.g., platform or other receptacle) such as pallet 440, and/or pallet 442. In some embodiments, other robots not shown in FIG. 4D may be used to push pallet 440, and/or pallet 442 into position to be loaded/unloaded and/or into a truck or other destination to be transported, etc.

As illustrated in FIG. 4D, robotic palletizing system 400 may comprise one or more predefined zones. For example, pallet 440 and pallet 442 are shown as located within the predefined zones. The predefined zones may be denoted by marking or labelling on the ground or otherwise structurally such as via the frame shown in robotic palletizing system 400. In some embodiments, the predefined zones may be located radially around robot 420. In some cases, a single pallet is inserted into a predefined zone. In other case, one or pallets are inserted into a predefined zone. Each of the predefined zones may be located within range of robot 420 (e.g., such that robot 420 can place items on a corresponding pallet, or depalletize items from the corresponding pallet, etc.). In some embodiments, one of the predefined zones or pallets located within a predefined zone is used as a buffer or staging area in which items are temporarily stored (e.g., such as temporary storage until the item is to be placed on a pallet in a predefined zone).

One or more items may be provided (e.g., carried) to the workspace of robot 420 such as via conveyor 408 and/or conveyor 409. Robotic palletizing system 400 may control a speed of conveyor 408 and/or conveyor 409. For example, robotic palletizing system 400 may control the speed of conveyor 408 independently of the speed of conveyor 409, or robotic palletizing system 400 may control the speeds of conveyor 408 and/or conveyor 409. In some embodiments, robotic palletizing system 400 may pause conveyor 408 and/or conveyor 409 (e.g., to allow sufficient time for robot 420 to pick and place the items. In some embodiments, conveyor 408 and/or conveyor 409 carry items for one or more manifests (e.g., orders). For example, conveyor 408 and conveyor 409 may carry items for a same manifest and/or different manifests. Similarly, one or more of the pallets/predefined zones may be associated with a particular manifest. For example, pallet 440 and pallet 442 may be associated with a same manifest. As another example, pallet 440 and pallet 442 may be associated with different manifests.

Robotic palletizing system 400 may control robot 420 to pick an item from a conveyor such as conveyor 408 or conveyor 409, and place the item on a pallet such as pallet 440 or pallet 442. Robot 420 may pick the item and move the item to a corresponding destination location (e.g., a location on a pallet or stack on a pallet) based at least in part on a plan associated with the item. In some embodiments, robotic palletizing system 400 determines the plan associated with the item such as while the item is on the conveyor, and robotic palletizing system 400 may update the plan upon picking up the item (e.g., based on an obtained attribute of the item such as weight, or in response to information obtained by a sensor in the workspace such as an indication of an expected collision with another item or human, etc.). Robotic palletizing system 400 may obtain an identifier associated with the item such as a barcode, QR code, or other identifier or information on the item. For example, robotic palletizing system 400 may scan/obtain the identifier as the item is carried on the conveyor. In response to obtaining the identifier, robotic palletizing system 400 may use the identifier in connection with determining the pallet on which the item is to be placed such as by performing a look up against a mapping of item identifier to manifests, and/or a mapping of manifests to pallets. In response to determining one or more pallets corresponding to the manifest/order to which the item belongs, robotic palletizing system 400 may select a pallet on which to place the item based at least in part on a model or simulation of the stack of items on the pallet and/or on a placing of the item on the pallet. Robotic palletizing system 400 may also determine a specific location at which the item is to be placed on the selected pallet (e.g., the destination location). In addition, a plan for moving the item to the destination location may be determined, including a planned path or trajectory along which the item may be moved. In some embodiments, the plan is updated as robot 420 is moving the item such as in connection with performing an active measure to change or adapt to a detected state or condition associated with the one or more items/objects in the workspace (e.g., to avoid an expected collision event, to account for a measured weight of the item being greater than an expected weight, to reduce shear forces on the item as the item moved, etc.).

According to various embodiments, robotic palletizing system 400 comprises one or more sensors and/or sensor arrays. For example, robotic palletizing system 400 may include one or more sensors within proximity of conveyor 408 and/or conveyor 409 such as sensor 444 and/or sensor 446. The one or more sensors may obtain information associated with an item on the conveyor such as an identifier or information on label on the item, or an attribute of the item such as a dimensions of the item. In some embodiments, robotic palletizing system 400 includes one or more sensors and/or sensor arrays that obtain information pertaining to a predefined zone and/or a pallet in the zone. For example, robotic palletizing system 400 may include a sensor 432 that obtains information associated with pallet 440 or the predefined zone within which pallet 440 is located. Sensors may include one or more 2D cameras, 3D (e.g., RGBD) cameras, infrared, and other sensors to generate a three-dimensional view of a workspace (or part of a workspace such as a pallet and stack of items on the pallet). The information pertaining to a pallet may be used in connection with determining a state of the pallet and/or a stack of items on the pallet. As an example, robotic palletizing system 400 may generate a model of a stack of items on a pallet based at least in part on the information pertaining to the pallet. Robotic palletizing system 400 may in turn use the model in connection with determining a plan for placing an item a pallet. As another example, robotic palletizing system 400 may determine that a stack of items is complete based at least in part on the information pertaining to the pallet.

According to various embodiments, robotic palletizing system 400 determines a plan for picking and placing an item (or updates the plan) based at least in part on a determination of a stability of a stack on a pallet. Robotic palletizing system 400 may determine a model of the stack for one or more of pallets 440 and/or pallet 442, and robotic palletizing system 400 may use the model in connection with determining the stack on which to place an item. As an example, if a next item to be moved is relatively large (e.g., such that a surface area of the item is large relative to a footprint of the pallet), then robotic palletizing system 400 may determine that placing the item on pallet 440 may cause the stack thereon to become unstable (e.g., because the surface of the stack is non-planar). In contrast, robotic palletizing system 400 may determine that placing the relatively large (e.g., planar) item on the stack for pallet 442 may result in a relatively stable stack. Robotic palletizing system 400 may determine that an expected stability of placing the item on pallet 442 may be greater than a predetermined stability threshold, or that placement of the item on pallet 442 may result in an optimized placement of the item (e.g., at least with respect to stability).

Robotic palletizing system 400 may communicate a state of a pallet and/or operation of robot 420 within a predefined zone. The state of the pallet and/or operation of the robotic arm may be communicated to a user or other human operator. For example, robotic palletizing system 400 may include a communication interface (not shown) via which information pertaining to the state of robotic palletizing system 400 (e.g., a state of a pallet, a predetermined zone, a robotic arm, etc.) to a terminal such as on demand teleoperation device and/or a terminal used by a human operator. As another example, robotic palletizing system 400 may include a status indicator within proximity of a predefined zone.

The status indicator may be used in connection with communicating a state of a pallet and/or operation of robot 420 within the corresponding predefined zone. For example, if robotic palletizing system 400 is active with respect to the predefined zone in which pallet 620 is located, the status indicator can so indicate such as via turning on a green-colored light or otherwise communicating information or an indication of the active status via the status indicator. Robotic palletizing system 400 may be determined to be in an active with respect to a predefined zone in response to determining that robot 420 is actively palletizing one or more items on the pallet within the predefined zone. As another example, if robotic palletizing system 400 is inactive with respect to the predefined zone in which pallet 440 is located, the status indicator can so indicate such as via turning on a red-colored light or otherwise communicating information or an indication of the active status via the status indicator. Robotic palletizing system 400 may be determined to be inactive in response to a determination that robot 420 is not actively palletizing one or more items on the pallet within the predefined zone, for example in response to a user pausing that predefined zone (or cell), or in response to a determination that a palletization of items on pallet 440 is complete. A human operator or user may use the status indicator as an indication as to whether entering the corresponding predefined zone is safe. For example, a user working to remove completed pallets, or inserting empty pallets, to/from the corresponding predefined zone may refer to the corresponding status indicator and ensure to enter the predefined zone when the status indicator indicates that operation within the predefined zone is inactive.

According to various embodiments, robotic palletizing system 400 may use information obtained by one or more sensors within the workspace to determine an abnormal state pertaining to the pallet and/or items stacked on the pallet. For example, robotic palletizing system 400 may determine that a pallet is misaligned relative to robot 420 and/or the corresponding predefined zone based at least in part on the information obtained by the sensor(s). As another example, robotic palletizing system 400 may determine that a stack is unstable, that items on a pallet are experiencing a turbulent flow, etc. based at least in part on the information obtained by the sensor(s). In response to detecting the abnormal state, robotic palletizing system 400 may communicate an indication of the abnormal state such as an on-demand teleoperation device or other terminal used by an operator. In some embodiments, in response to detecting the abnormal state, robotic palletizing system 400 may automatically set the pallet and/or corresponding zone to an inactive state. In addition to, or as an alternative to, notifying an operator of the abnormal state, robotic palletizing system 400 may perform an active measure. The active measure may include controlling robot 420 to at least partially correct the abnormal state (e.g., restack fallen items, realign the pallet, etc.). In some implementations, in response to detecting that an inserted pallet is misaligned (e.g., incorrectly inserted to the predefined zone), robotic palletizing system 400 may calibrate the process for modelling a stack and/or for placing items on the pallet to correct for the misalignment. For example, robotic palletizing system 400 may generate and use an offset corresponding to the misalignment when determining and implementing a plan for placing an item on the pallet. In some embodiments, robotic palletizing system 400 performs the active measure to partially correct the abnormal state in response to determining that an extent of the abnormality is less than a threshold value. Examples of determining that an extent of the abnormality is less than a threshold value include (i) a determination that the misalignment of the pallet is less than a threshold misalignment value, (ii) a determination that a number of dislodged, misplaced, or fallen items is less than a threshold number, (iii) a determination that a size of a dislodged, misplaced, or fallen item satisfies a size threshold, etc.

A human operator 414 may communicate with robotic palletizing system 400 via a network such as a wired network and/or a wireless network. For example, robotic palletizing system 400 may comprise a communication interface via which robotic palletizing system 400 is connected to one or more networks. In some embodiments, a terminal connected via network to robotic palletizing system 400 provides a user interface via which human operator can provide instructions to robotic palletizing system 400, and/or via which the human operator may obtain information pertaining to a state of robotic palletizing system 400 (e.g., a state of robotic arm, a state of a particular pallet, a state of a palletization process for a particular manifest, etc.). The human operator may provide an instruction to robotic palletizing system 400 via an input to the user interface. For example, a human operator 414 may use the user interface (e.g., an interface provided on teleoperation device 412 or another terminal) to pause robot 420, pause a palletization process with respect to a particular manifest, pause a palletization process for a particular pallet, toggle a status of a pallet/predefined zone between active/inactive, etc.

In various embodiments, elements of robotic palletizing system 400 may be added, removed, swapped out, etc. In such an instance, control computer 424 initializes and registers the new element, performs operational tests, and begins/resumes kitting operations, incorporating the newly added element, for example.

The overall cost (e.g., the aggregated resulting value for moving the various items in the set of items) may be different according to an order in which the items are moved from the source location to the item destination location because a height of the stack of items changes as the set of items are palletized/de-palletized. As an example, if robotic palletizing system 400 comprises a plurality of conveyors corresponding to possible destination locations (e.g., to carry items away from a pallet in connection with a depalletization process) and at least a subset of the conveyors have different heights, then the cost function with respect to moving an item to a conveyor having a relatively greater height will have a different result than the cost function with respect to moving the item to a conveyor having a relatively lesser height. In such an example, if the stack of items on the pallet has a height that is closer to the conveyor having the relatively greater height, then the cost function will have a result such that moving the item to the conveyor having the relatively greater height may be associated with a lesser cost (e.g., a result of the cost function) than moving the same item to the conveyor having a relatively smaller height. In some embodiments, moving an item down a predetermined distance may be associated with a lesser cost than moving an item up the same predetermined distance (e.g., the robotic arm may have to exert more work to move an item up than to move the item down, the robotic arm may be able to more quickly move the item down than up).

In some embodiments, items are picked and placed to/from a pallet such as in connection with a palletization/depalletization process. In connection with palletizing a set of items, robotic palletizing system 400 may determine to pick items from a source location having a height relatively closer to the height of the pallet (e.g., as compared to other possible source locations), or height of the stack of items on the pallet, and moving the item and placing the item on the pallet. A determination of a source location may be made on an item-by-item basis (e.g., so that as the stack of items on the pallet grows higher, a source location having a closer relative height is selected as the source location). In connection with depalletizing a set of items, robotic palletizing system 400 may determine to move items from a source location (e.g., the pallet or stack of items on the pallet) to an item destination location having a height relatively close to the height of the pallet (e.g., as compared to other possible item destination locations such as other conveyors) and moving the item and placing the item at the selected item destination location. A determination of a source location may be made on an item-by-item basis (e.g., so that as the stack of items on the pallet grows higher, a source location having a closer relative height is selected as the source location).

In some embodiments, the height of the conveyor or other area corresponding to a source location/item destination location is adjustable. As an example, in connection with palletizing an item, the source location (e.g., the conveyor) can be adjusted based at least in part on the item destination location (e.g., a current height of the stack of items on the pallet), the item, and/or the plan for palletizing the item(s). As an example, in connection with depalletizing an item, an item destination location (e.g., the conveyor) may be adjusted based at least in part on the source location (e.g., a height of the stack from which the item is picked), the item, and/or the plan for depalletizing the item(s). As an example, a motor may be controlled to raise the conveyor such by as causing one or more pinions to traverse a gear rack.

In some embodiments, a plurality of conveyors may have different corresponding heights. Robotic palletizing system 400 may determine the conveyor with which to use for palletizing/depalletizing an item base at least in part on a height of the conveyor. For example, robotic palletizing system 400 may use a cost associated with palletizing/depalletizing an item with respect to the various conveyors to determine the conveyor to be used.

According to various embodiments, robotic palletizing system 400 may comprise a chute that provides items to a conveyor. In the example illustrated in FIG. 4D, items are provided to conveyor 409 via chute 402. Robotic palletizing system 400 may comprise a disrupter device with which the flow of items (e.g., from the chute to the conveyor) is controlled and/or regulated. For example, cute 60 includes disrupter device 652. As illustrated, disrupter device 405 may be controlled to block/impede the flow of items from chute 402 to conveyor 409.

In some embodiments, robotic palletizing system 400 may control disrupter device 405 to (i) permit items to flow from chute 402 to conveyor 409 without impediment (e.g., the disrupter device may be fully retracted or moved out of the way of items flowing from the chute), (ii) to slow the flow of items such as by partially blocking or impeding items flowing from chute 402 to conveyor 409 (e.g., the disrupter device 405 may be oriented to be partially raised to create a cliff/ramp along which items travel and creating resistance to the flow of item), (iii) fully cease the flow of items from chute 402 to conveyor 409 (e.g., the disrupter device may be fully extended to prevent items from flowing from chute 402 to conveyor 409), and/or (iv) dislodge or otherwise disrupt a blockage or jam among items or objects in chute 402 (e.g., the disrupter device may be manipulated to apply force against one or more items/objects in chute 402 to clear a jam of items/objects). Robotic palletizing system 400 may control disrupter device 405 by providing a control signal or instruction to disrupter device 405 (e.g., to an actuation device of the disrupter device). In response to disrupter device 405 receiving the control signal or instruction, the disrupter device 405 may control an actuation device that actuates a flow disrupter (e.g., moves or otherwise changes an orientation or configuration of a flow disrupter).

According to various embodiments, robotic palletizing system 400 may control the disrupter device 405 based at least in part on sensor data. The sensor data may be obtained based at least in part on information obtained by one or more sensors in the workspace and/or robotic palletizing system 400. In response to determining that a flow of items is to be controlled or regulated, robotic palletizing system 400 may control the disrupter device 405. For example, robotic palletizing system 400 may determine that the flow of items is to be sped up, slowed, or stopped (e.g., temporarily stopped). Robotic palletizing system 400 may determine to increase the speed of the flow of items in response to a determination that robot 420 is palletizing items arriving on conveyor(s) more quickly than items are arriving within range of robot 420 or a pickup location of the conveyor(s). Conversely, robotic palletizing system 400 may determine to decrease the speed of the flow of items in response to a determination robot 420 is palletizing items arriving on conveyor(s) slower than items are arriving within range of the robotic arm 605 or a pickup location of the conveyor(s). Various other factors may be used in connection with determining to control/regulate the flow of items, including density of items on the conveyor or pickup area, number of items on the conveyor or pickup area, a palletization process being paused or stopped (e.g., during removal of a pallet, determination that a human is within a predefined zone, etc.), etc.

Figure 4E:
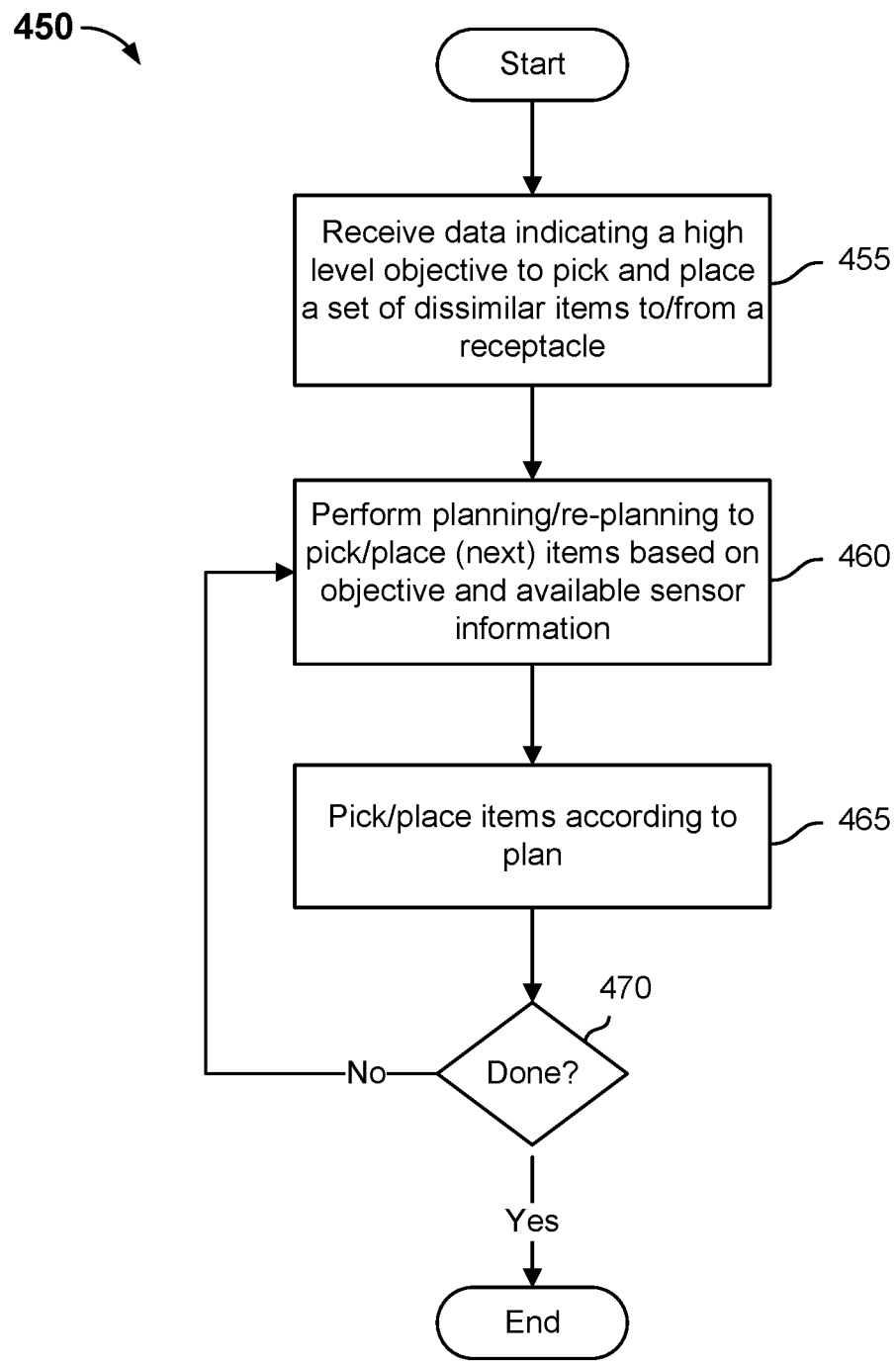
FIG. 4E is a flow chart illustrating an embodiment of a process to palletize/depalletize an item.

FIG. 4E is a flow chart illustrating an embodiment of a process to palletize/depalletize an item.

At 450, planning (or re-planning) is performed to generate a plan to pick/place items based on the high-level objective received at 205 and available sensor information. For example, in the example shown in FIG. 4D, 3D or other image data generated by one or more of camera 404, camera 406, sensor 444, sensor 446, sensor 428, and/or sensor 432 may be used, along with sensor data from sensors not shown in FIG. 4D (e.g., weight sensors) to identify and determine a plan to pick, place, and stack on a pallet (e.g., pallet 440 or pallet 442) items arriving via conveyor 408 or conveyor 409.

In some embodiments, the system may make a plan based at least in part on a manifest (e.g., invoice or other list corresponding to an order, etc.). A plan to stack items may be generated based on item size, weight, density, weight distribution, rigidity, capacity of the item and/or its box or other packaging to support weight stacked on top of the item, etc. The control computer in some embodiments controls the order in which items arrive at the loading location, such as via conveyor 409 (or via one or more conveyors). In some embodiments, items may arrive in an order not known a priori and/or the list of items may not be known. In some such embodiments, cameras (e.g., 404 and/or 406) and/or other sensors are used to identify items and/or their attributes, generate/update a plan to stack items on a pallet (e.g., pallet 440), and/or to determine strategies to grasp, pick up, move, and place each item in its corresponding place according to the stacking plan determined at 455.

According to various embodiments, robotic palletizing system 400 determines the plan to pick/place the item in order to pack or stack the items in a manner that the pallets are stable and packed densely. As an example, one or more thresholds pertaining to the manner by which items are packed or stacked on a pallet may be used in connection with determining the plan to pick/place the item. The one or more thresholds may be set by a user (e.g., an administrator). In some embodiments, a threshold may be set based on a machine learning process such as a machine learning process that improves planning process such as based at least in part on historical information (e.g., historical information pertaining to the stacking of items on a pallet, or of the individual placement/attributes of an item). The one or more thresholds may include (i) a packing efficiency threshold pertaining to a measure of packing density of a pallet, (ii) a stability threshold pertaining to a measure of a stability of the stack of items on the pallet, (iii) a fit threshold pertaining to a measure of the manner by which an item fits on the pallet (e.g., on an existing stack, etc.). Robotic palletizing system 400 may use the thresholds as respective minimum values that must be obtained (or expected to be obtained) by the expected placement of the item at a particular destination location.

In some embodiments, a model of items on a pallet may be generated. For example, the model may be generated (e.g., by control computer 424) for the stack of items on a pallet. The model may be updated as a new item is added to the pallet (e.g., placed on the pallet). Alternatively, or additionally, the model may be updated at predefined time intervals that may be configurable by a user/administrator. The model of items with respect to a particular pallet may be modeled each time an item is determined to be picked/placed by a robotic arm, and/or each time robotic palletizing system 400 determines that the item is associated with a manifest corresponding to one or more pallets. However, in some embodiments, the model of items with respect to a pallet may be cached and obtained in response to a determination that an item associated with a manifest corresponding to the item. Robotic palletizing system 400 may obtain the cached model and update the model in response to a determination that one or more other items have been placed on the pallet since the model was generated. In some embodiments, robotic palletizing system 400 updates and caches the model after the robotic arm places an item on the pallet to avoid the model having to be computed/updated at a time that a next item is to be placed on the pallet.

In response to determining that an item is to be picked and placed on a pallet, robotic palletizing system 400 may determine a set of pallets on which the item may be placed based at least in part on a determination of a manifest with which the item is associated. In response to determining the manifest corresponding to the item, robotic palletizing system 400 may perform a lookup in a mapping of manifests to pallets to determine one or more pallets on which the item may be placed to allow the item to be included in the fulfillment of the manifest. In some cases, all of the one or more pallets are within range of a particular robotic arm (e.g., are within the predefined zones corresponding to the robotic arm). In other cases, a subset of the one or more pallets are within range of a particular robotic arm (e.g., a subset of the one or more pallets may not yet be placed in a zone for any robotic arm, and/or a subset of the one or more pallets may be placed in a predefined zone corresponding to a different robotic arm). Accordingly, robotic palletizing system 400 may further determine the one or more pallets on which the item may be placed by the robotic arm based on the mapping of manifests to pallets, and/or a mapping of pallets to robotic arms and/or predefined zones.

In response to determining that the item may be placed on one or more pallets corresponding to a robotic arm, robotic palletizing system 400 may determine the manner by which the item is to be placed on the one or more pallets. A pallet may correspond to a robotic arm if the pallet is currently in a predefined zone for robot 420. As an example, if the item may be placed on one of a plurality of pallets corresponding to robot 420, robotic palletizing system 400 may select one of the plurality of pallets on which to place the item. Selection of the pallet on which to place the item may include determining a pallet or stack on which the item is best fit (e.g., relative to the placing of the item on other pallets/stacks). In some embodiments, robotic palletizing system 400 uses the corresponding models of items with respect to the pallets in connection with determining the pallet or stack on which to place the item. For example, robotic palletizing system 400 may simulate/model the placing of the item on one or more of the pallets on which the item may be placed, and determine one or more expected characteristics associated with the pallet or items on the pallet if the item were placed on the pallet. The one or more characteristics associated may comprise one or more of a metric pertaining to a stability of the items on the pallet (e.g., a stability of the stack of item), a metric pertaining to a density of the items on the pallet, a fit of the item relative to other items on the pallet, etc.

In some embodiments, robotic palletizing system 400 simulates placing the item at different locations on a particular pallet to determine a location at which the item best fits based at least in part on at least a subset of the aforementioned one or more characteristics. Robotic palletizing system 400 may simulate placing the item at a plurality of locations with respect to a particular pallet, and may perform such a simulation with respect to a plurality of the pallets on which the item may be placed (e.g., a plurality of pallets associated with the manifest to which the item belongs). Robotic palletizing system 400 may determine the destination location of the item based at least in part on the one or more simulations of placing the item. For example, robotic palletizing system 400 may determine the destination location based at least in part on the expected one or more characteristics associated with placing an item at the various locations according to the one or more simulations. A composite score associated with placing an item at a particular location may be determined based at least in part on the one or more characteristics (e.g., density of the stack, stability of the stack, fit of the item relative to other items, etc.). In some embodiments, the one or more characteristics have corresponding weightings used in determining a composite score associated with placing the item at a particular location.

Robotic palletizing system 400 may determine the destination location as corresponding to location having the highest corresponding composite score among the different simulations/models for placing the item on the pallet. In some embodiments, the destination location is determined based at least in part on the simulations and a cost function. For example, a set of destination locations for which the composite score satisfies (e.g., exceeds) a threshold value may be determined, and the robotic system may select, from among the set of destination locations, the destination location having the most efficient result (e.g., lowest cost) with respect the cost function as the destination location at which the item is to be placed. In some embodiments, the set of destination locations from which the destination location is selected is determined based at least in part on (i) each of the destination locations having characteristics that satisfy minimum characteristic values (e.g., characteristic values for fit, stability, efficiency, etc.), and (ii) each of the destination locations having a composite score that satisfies the threshold composite score value.

The stability of the items on a pallet may be impacted by one or more attributes associated with an item. The attributes may include a shape of an item, a center of gravity of an item (or an expected center of gravity of the item), a type of packing (e.g., a cardboard box, a polybag, etc.), a weight of the item, an indication that the item is fragile, etc. As an example, an item that is relatively light or an irregular shaped item may cause a stack of items to be relatively unstable if the item is placed at a lower part of the stack. In the case of an item that is a pillow, the stability of a stack of items may be improved by placing the pillow at the top or near the top of the stack compared to placement of the pillow at the bottom or near the bottom/middle of the stack. Robotic palletizing system 400 may obtain one or more attributes associated with an item. For example, robotic palletizing system 400 may obtain the one or more attributes when the item is provided on the conveyor (e.g., as the item is brought within proximity of the robotic arm), or when the item is determined to be the next item to be picked up from the conveyor. In some embodiments, the obtaining the one or more attributes comprises obtaining (e.g., scanning) one or more identifiers on the item, such as a bar code, a QR code, a near field communication label/tag, etc. Attributes may be pre-stored in association with the item, the type of item, etc. For example, in response to obtaining an identifier associated with the item, robotic palletizing system 400 may perform a look up against a mapping of items (or identifiers of items) to attributes. In some embodiments, an attribute is obtained by one or more upstream sensors or computers and stored in association with the item. Robotic palletizing system 400 may retrieve from a data structure the attributes associated with an item that were obtained by the one or more upstream sensors. A sensor or sensor array may be used in connection with determining a size of the item. The sensor or sensor array may be disposed on or around the conveyor, or within the workspace of the robotic arm. Additionally, or alternatively, robotic palletizing system 400 may determine one or more attributes associated with the item in response to picking up the item. For example, a weight of the item may be determined in response to picking up the item via one or more sensors such as a force sensor, or a current sensor, or other sensor that measures an amount of work expended to lift the item, etc. As another example, robot 420 may move the item within a threshold range/area of one or more sensors that may obtain an identifier associated with the item (e.g., a barcode on the item), and the identifier may be used to obtain a pre-stored attribute.

The one or more attributes associated with an item may be used to determine the plan for picking/placing the item. For example, robotic palletizing system 400 may determine a trajectory along which the item is to be moved from a source location (e.g., a location on the conveyor) to the item destination location (e.g., the location on the pallet on which the item is to be placed). As another example, the one or more attributes associated with the item may be used in connection with determining the item destination location as simulating the placing of the item at different locations on the pallet, or at different locations on different pallets for the corresponding manifest.

In some embodiments, robotic palletizing system 400 determines the plan for picking/placing the item based on an efficiency or cost function associated moving the item from the source location to the item destination location. As an example, robotic palletizing system 400 may determine the plan based on an optimization of the efficiency or cost function. As another example, robotic palletizing system 400 may determine the plan such that a minimum efficiency threshold and/or a minimum value threshold of a cost function is satisfied by the corresponding moving of the item from the source location to the item destination location. One or more values pertaining to an efficiency of a plan may include an expected time for the robotic arm to move the item, a difference in height between the source location and the item destination location, a distance (e.g., a Euclidian distance, etc.) between the source location and the item destination location, etc. In some embodiments, a cost function comprises one or more variables pertaining to the picking/placing of the item at the item destination location, an expected stability of the stack of items on the pallet (e.g., after the item is placed at the destination location), a measure of fit of the item at the item destination location, a number of pallets to be used to palletize all items corresponding to a particular manifest, etc. The cost function may include one or more weightings for the one or more variables included in the cost function. The variables included in determining the cost of moving an item may include one or more of (i) an amount of time the robotic arm is expected to take to move the item from the source location to the item destination location, (ii) an amount of work that the robotic arm is expected to exert to move the item, (iii) a distance that the item is to be moved, (iv) a path or trajectory along which the item is to be moved, etc. Various other variables may be included in determining the cost associated with moving the item. The order of moving a set of items may be determined based on an aggregated cost of moving the set of items (e.g., the individual cost of moving an item in the set of items may be determined, and an aggregated cost of moving the set of items may be determined based on the individual costs). In some embodiments, the variables included in determining a cost of moving an item (e.g., a variable in the cost function) may have different weightings. For example, the time and/or work associated with lifting an item may be greater than the time and/or work associated with lowering an item. Accordingly, even if the distance between lifting an item to a certain location is the same as lowering the item to a different location, the cost associated with moving the item to the different locations may be different.

According to various embodiments, robotic palletizing system 400 determines a plan for moving an item or a set of items based at least in part on an optimization of a cost of moving the item or the set of items subject to one or more conditions. The one or more conditions may include conditions or rules that the system with which the system complies in moving items. Examples of conditions may include one or more (i) a collision between the item and another item/object is avoided during moving, (ii) the item is moved within a predefined area (e.g., to avoid the robotic arm operating in an area reserved for humans or for another robot), (iii) a stability threshold of a stack of items at source location and/or item destination location such as based on the moving of the item, (iv) a speed at which the robotic arm moves, (v) a time that the robotic arm is expected to take to move the item, (vi) a likelihood that the item is moved successfully, (vii) a stability of force between the end effector of the robotic arm and the item (e.g., a stability of the grip on the item), etc. Various other conditions may be used in connection with bounding the system for moving.

In some embodiments, a pallet may be deemed to correspond to a robotic arm if the pallet is currently in a predefined zone for the robotic arm and/or planned to be inserted into a predefined zone at a future time when a predefined zone is available. In such as case, the robotic system may determine that the item is to be placed on such a to-be inserted pallet, and the robotic system may determine the plan for picking and placing the item to comprise picking the item from the conveyor and placing the item in a buffer or staging area until such time that the corresponding pallet is inserted into the predefined zone and the item is determined to be placed on such pallet.

In some embodiments, in response to determining that no suitable locations on one or more pallets corresponding manifest to which the item belongs currently exist, robotic palletizing system 400 may determine to pick and place the item in a buffer or a staging area. The buffer or staging area may be a preset area within the workspace in which items are at least temporarily stored until robotic palletizing system 400 determines that an ideal location on one of the one or more pallets exists (e.g., a location for which criteria pertaining to stability, fit, and/or efficiency, etc. are satisfied). Robotic palletizing system 400 may determine that placing one or more upstream items (e.g., items to be delivered via the conveyor within a threshold time and/or threshold number of items) on the pallet before the current item would result in a better stack (e.g., better fit, stability, efficiency, etc.). In response to such a determination, robotic palletizing system 400 may control the robotic arm to pick and place the one or more upstream items before picking and placing the current item. As an example, the current item may be moved temporarily to the buffer/staging area while, or until such time that, the robotic arm stacks the one or more upstream items.

According to various embodiments, a set of paths or trajectories for picking and placing an item is determined, and the path or trajectory along which the item is to be moved is selected from the set of paths or trajectories. The path or trajectory may be selected based on various properties associated with the corresponding paths or trajectories within the set. Examples of the properties associated with the corresponding paths or trajectories that may be used in connection with selecting the path or trajectory include a speed with which the item is to be moved, a destination location at which the item is to be picked, a probability of success that the item is to picked and placed at the destination location according to the particular path or trajectory, an indication of whether another item or object within the workspace intersects with the particular path or trajectory, an indication that a region or area in the workspace is restricted intersects with the particular path or trajectory, etc. In some embodiments, the probability of success that the item is to be picked and placed at the destination location according to the particular path or trajectory is determined for at least a subset of the set of paths or trajectories, and the path or trajectory is selected based on the corresponding probability of success relative to the probability of success corresponding to other paths or trajectories. As an example, the path or trajectory is selected in response to determining that the probability of success corresponding to the path or trajectory exceeds a threshold probability, or exceeds a threshold number or percentage of other paths or trajectories within the subset.

According to various embodiments, an item to be palletized/de-palletized, a source location from which an item is to be obtained, and/or an item destination location may be determined based at least in part on a cost (e.g., a result of a cost function) with moving the item. The cost may be a determined based at least in part on a predefined cost function, which may include one or more variables pertaining to the picking and placing the item. Robotic palletizing system 400 may determine an item to be palletized/de-palletized, a source location from which an item is to be obtained, and/or an item destination location in a manner that optimizes a cost of moving the item and/or that moving an item satisfies one or more cost value thresholds.

In some embodiments, a system includes plurality of inputs source locations (e.g., a plurality of conveyors that bring items to the robotic arm for palletizing), and a cost associated with moving an item from a first conveyor having a first height is different from a cost associated with moving a same item from a second conveyor having a second height, the second height being different from the first height. The cost of moving the item may take into account a distance that the item moves (e.g., that the robotic arm is to move the item) from the source location to the item destination location. For example, a length of the path or trajectory over which the item is to move may be determined and the cost of moving the item may be determined based at least in part on the length of the path or trajectory. As another example, a distance from the source location of the item to an item destination location may be determined, and the cost of moving the item may be determined based at least in part on the distance. The distance may be computed as the Euclidian distance between a source location of the item to an item destination location.

An order of moving a set of items may be determined in a manner that minimize/optimize a cost of moving the set of items (or a subset of two or more of the set of items). Similarly, a manner by which the set of items are palletized (e.g., an arrangement of items in the stack) may be determined in manner that minimize/optimize a cost of moving the set of items (e.g., minimizes/optimizes the cost of stacking the items). For example, a model or simulation of moving a plurality of items may be determined, and an aggregate cost of moving the plurality of items may be determined based at least in part on variables associated with the cost of moving items. The optimization of moving the set of items may be conditioned on one or more conditions being satisfied. In some embodiments, the order of moving the set of items is determined based on a determination that the order of moving the items satisfies one or more cost value thresholds (e.g., ensuring that a minimum cost of moving the set of items, or an item within the set is satisfied). Various attributes of items within the set of items may affect the order in which items are moved and/or the cost associated with moving the set of items in the order. For example, a cost of moving a set of items in which an item has a relatively large height may be optimized if such item is moved in a manner that minimizes/reduces the distance in the height direction that a robotic arm is to move the item. In the case of palletizing a set of items in which an item has a relatively large height, the cost of moving the set of items may be improved if the item having a relatively large height is moved from the conveyor to the pallet as the stack of items on the item is relatively low (e.g., to reduce the amount by which the robot has to raise the item to place on the stack/pallet). Accordingly, in the case of the palletizing the set of items, the item having a relatively large height may be moved before the height of the stack reaches a threshold height after which the robotic arm may be required to lift the item onto the stack (e.g., rather than lower the item onto the stack).

At 460, items are picked (e.g., grasped from conveyor 409, in the example shown in FIG. 4D), moved through a (predetermined/planned) trajectory to a location near where the item is to be placed, and placed at the destination location according to the plan determined and/or updated at 455.

In various embodiments, a packing plan may include planned use of stackable trays, crates, boxes, bins, or other containers to group smaller and/or irregularly shaped items and pack as a more readily stacked unit. In some embodiments, in a depalletizing operation a robotic system as disclosed herein is configured to recognize such containers, open them if needed, and empty them by removing individual items. Once emptied, the container is moved to a staging location, from which in various embodiments other robots and/or human workers may retrieve and move them out of the way.

In the example shown, (re-)planning and plan implementation (460, 465) continue until the high-level objective (455) is completed (470), at which the process 450 ends. In various embodiments, re-planning (460) may be triggered by conditions such as arrival of an items that is not expected and/or cannot be identified, a sensor reading indicating an attribute has a value other than what was expected based on item identification and/or associated item model information, etc. Other examples of unexpected conditions include, without limitation, determining that an expected item is missing, reevaluating item identification and determining an item is other than as originally identified, detecting an item weight or other attribute inconsistent with the item as identified, dropping or needing to re-grasp the item, determining that a later-arriving item is too heavy to be stacked on one or more other items as contemplated by the original and/or current plan, and detecting instability in the set of items as stacked on the receptacle.

Figure 5A:
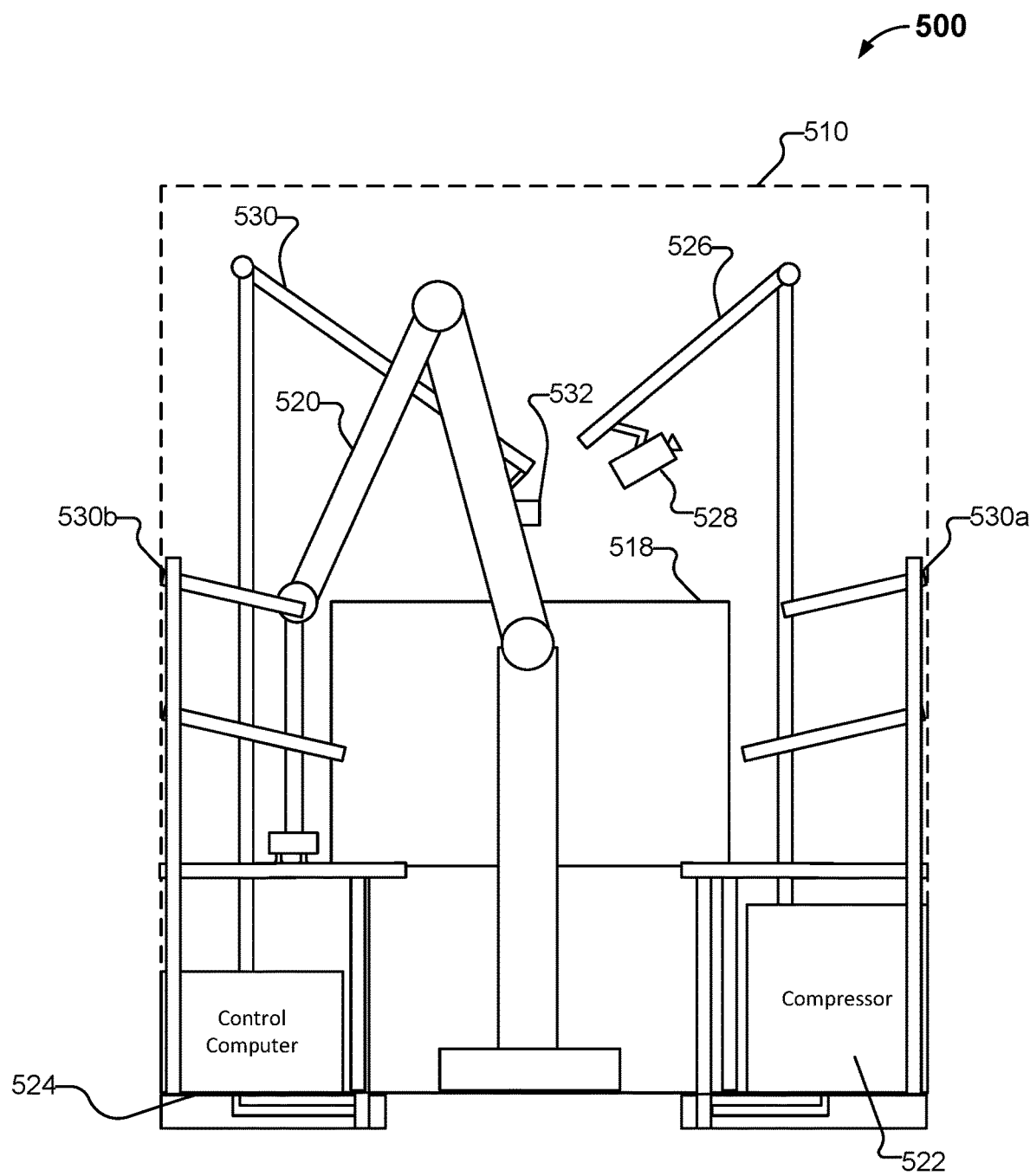
FIG. 5A is a diagram illustrating an embodiment of a containerized robotic system.

FIG. 5A is a diagram illustrating an embodiment of a containerized robotic system. In some embodiments, a containerized robotic system comprises one or more shelves, tables, chutes, etc. on which items are placed. The robot in the containerized robotic system may pick the item(s) from the one or more shelves, tables, chutes, etc. and place the item(s) in a receptacle such a box, a tray, a segmented conveyor, etc.

As illustrated in FIG. 5A, containerized robotic system 500 may comprise shelf system 530*a* and/or shelf system 530*b*. Shelf system 530*a* and/or shelf system 530*b* may be enclosed within containerized robotic system 500 (e.g., within the detachable superstructure) during transport of the containerized robotic system 500 to a destination location. Upon deployment of the containerized robotic system 500 at the destination location, the items may be placed on shelf system 530*a* and/or shelf system 530*b*. For example, one or more trays comprising items (e.g., items to be kitted) may be placed on a corresponding shelf of shelf system 530*a* and/or shelf system 530*b*, and a robot may perform a kitting operation with respect to the items. In some embodiments, robot 520 picks one or more items from the trays and places the items in a receptacle such as a tray or box to assemble the items into a kit (e.g., in accordance with an order or a predefine kit). As another example, shelf system 530*a* and/or shelf system 530*b* may be configured such that a chute or conveyor carries/delivers an item or a tray comprising items.

As illustrated in FIG. 5A, containerized robotic system 500 may comprise one or more of power distribution unit 518, robot 520, compressor 522, control computer 524, one or more sensors (e.g., sensor 528 and/or sensor 532), and a shelf system (e.g., shelf system 530*a* and/or shelf system 530), etc. The one or more sensors may be respectively mounted to a sensor superstructure that may be deployed to a deployed orientation upon removal of at least part of the detachable superstructure from the base.

Figure 5B:
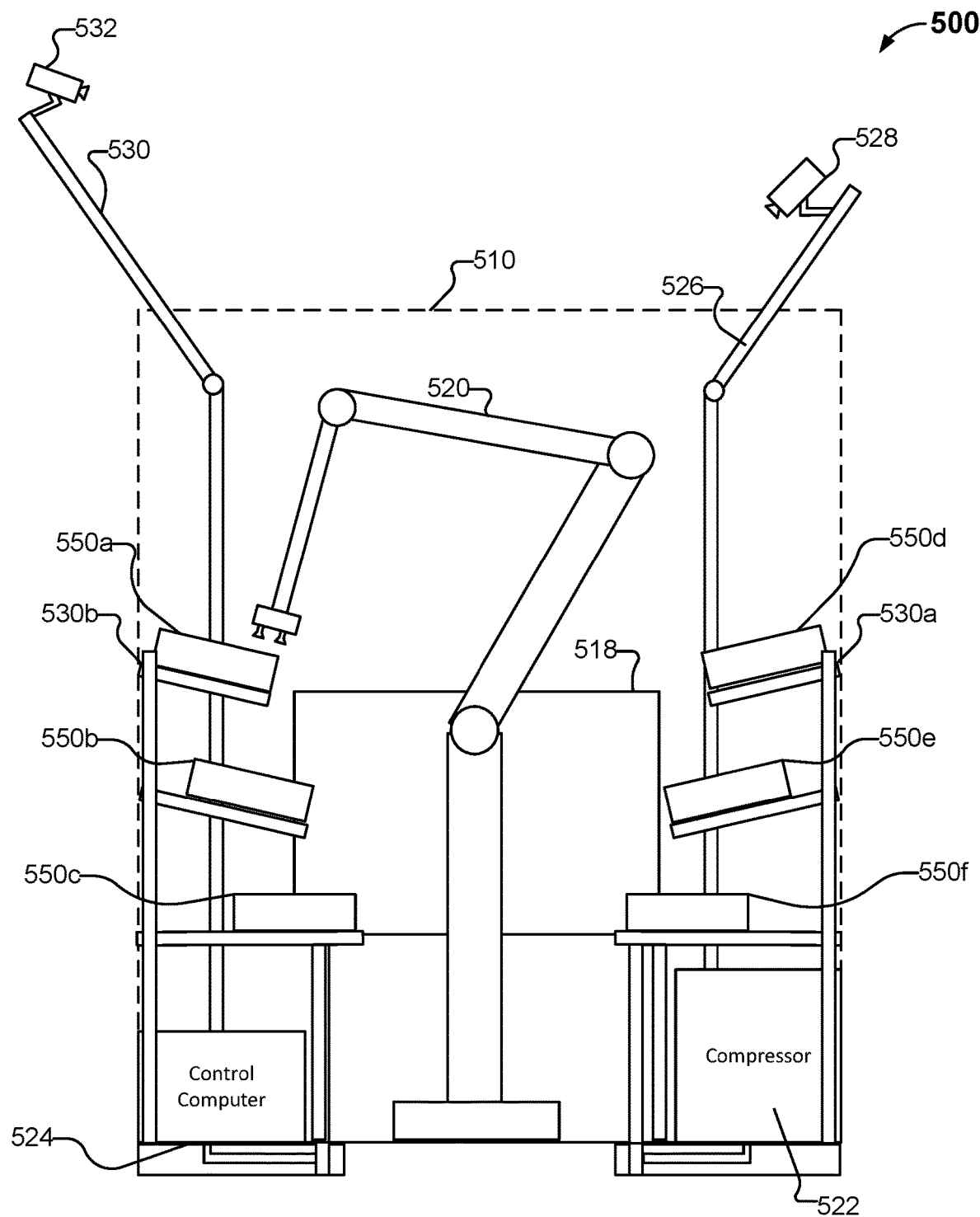
FIG. 5B is a diagram illustrating an embodiment of a containerized robotic system.

FIG. 5B is a diagram illustrating an embodiment of a containerized robotic system. As illustrated in FIG. 5B, containerized robotic system 500 is deployed in manner that one or more trays comprising items are placed on a shelf system for use in connection with a predefined robotic operation. For example, one or more of trays 550*a*, 550*b*, 550*c*, 550*d*, 550*e*, and/or 550*f* may be placed on one or more shelves of shelf system 530*a* and/or shelf system 530*b*. Sensor superstructures 526 and/or 530 may be deployed to the deployed orientation, which enables sensors 528 and/or 532 to obtain information pertaining to the workspace (e.g., to be used as a vision system with respect to items on shelf system 530*a* and/or shelf system 530*b*, and a workspace of robot 520).

Figure 6:
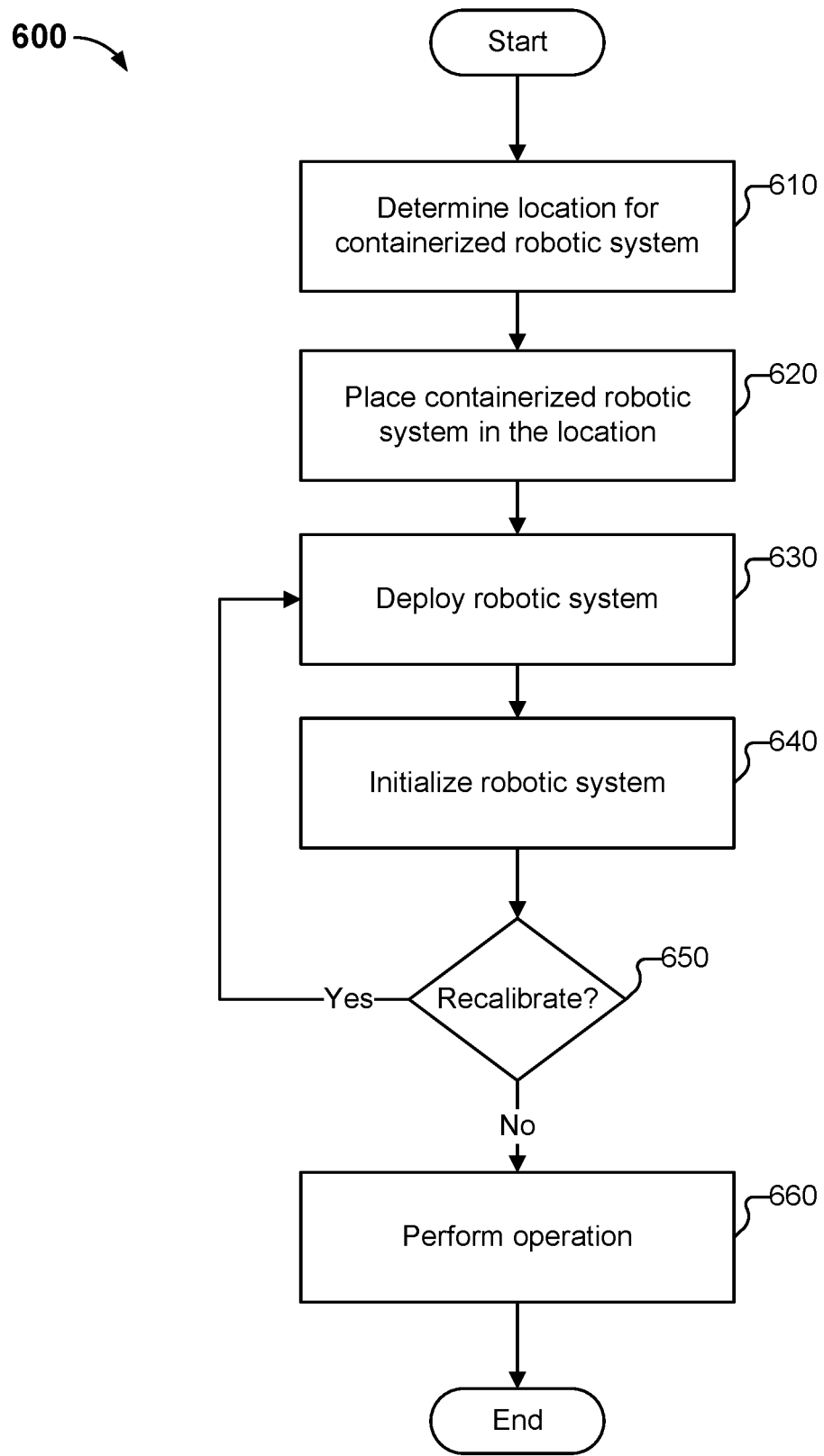
FIG. 6 is a flow chart illustrating an embodiment of a process to deploy a robotic system.

FIG. 6 is a flow chart illustrating an embodiment of a process to deploy a robotic system. In embodiments, process 600 is implemented in connection with the use of a containerized robotic system such as containerized robotic system 100 of FIG. 1A-1D, robotic singulation system 200 of FIG. 2D, robotic kitting system 300 of FIG. 3D, and/or robotic palletizing system 400 of FIG. 4D.

At 610, a location for a containerized robotic system is determined. In some embodiments, the location may be determined based at least in part on an operation that a robot comprised in the containerized robotic system is to perform (e.g., singulation, kitting, palletizing, etc.). The location may be determined based on relative locations of one or more components at a destination location at which the containerized robotic system is to be deployed. The one or more other components may include a camera, a terminal, a chute, a conveyor, a shelf, a receptacle, etc. The location may be marked at the destination location (e.g., an indication of the location may be provided).

At 620, the containerized robotic system is placed at the location. Placing the containerized robotic system at the location may include moving the containerized robotic system via a forklift, a crane, etc.

At 630, the containerized robotic system is deployed. Deploying the containerized robotic system may include removing the detachable superstructure, for example, to expose the robot enclosed within the containerized robotic system to the environment/workspace at the destination location. In some embodiments, deploying the containerized robotic system includes making one or more connections for one or more components in the containerized robotic system. For example, power at the destination location may be connected to the power distribution unit comprised in the containerized robotic system. As another example, a network connection may be established for the control computer comprised in the containerized robotic system. As another example, one or more air lines may be connected to the robot, the compressor, or other component in the containerized robotic system (e.g., air lines may be drawn through channels in the containerized robotic system before deployment of the containerized robotic system, and the connections may be completed during deployment).

At 640, the robotic system is initialized. In some embodiments, initialization of the containerized robotic system may include booting the control computer and running an initialization protocol (e.g., an application or software code). Initialization of the containerized robotic system may include verifying that one or more components in the robotic system (e.g., within the containerized robotic system or at the destination location) are functioning properly, verifying a calibration of the one or more components, etc. Initialization of the containerized robotic system may include running a diagnostic protocol to confirm that the one or more components are functioning properly and/or are calibrated.

At 650, the robotic system determines whether a re-calibration is required. The containerized robotic system may determine that re-calibration is required in response to determining that a component in the robotic system is not functioning properly, or that a component in the robotic system is not calibrated. In some embodiments, the containerized robotic system may determine that a part of the robotic system is not properly deployed (e.g., that a relative location of the containerized robotic system is incorrect, that a sensor superstructure is not oriented in the deployed orientation, etc.).

In response to determining that re-calibration is required at 650, process 600 may return to 630 and 640, and 650 may be performed until the robotic system determines at 650 that re-calibration is not required. In response to determining that re-calibration is not required at 650, a corresponding operation is performed. The operation may correspond to the operation for which the robot and/or control computer in the containerized robotic system are configured, such as singulation, kitting, palletizing, and/or de-palletizing.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A containerized robotic system, comprising:
    a base having a first attachment area configured to securely mount a robot;
    a detachable superstructure configured to be removably connected to the base to define an enclosed space of sufficient size to accommodate at least the robot;
    one or more sensors;
    a sensor superstructure to which at least part of the one or more sensors are attached; and
    wherein:
        the containerized robotic system is configurable to perform a selected one of a plurality of jobs at a site at which the containerized robotic system deployed;
        the plurality of jobs includes singulation, kitting, or palletization;
        a selected job performed by the containerized robotic system after deployment at the site is based at least in part on a type of other system with which the containerized robotic system is integrated at deployment; and
        in response to the robot of the containerized robotic system being deployed and initialized, the robot performs pick and place operations with respect to items in a workspace in connection with performing the selected one of the plurality of jobs.

2. The containerized robotic system of claim 1, wherein external dimensions of the containerized robotic system correspond to a shipping container.

3. The containerized robotic system of claim 1, wherein external dimensions of the containerized robotic system comprise:
    a length of 20 feet;
    a width of 8 feet; and
    a height of 8.5 feet.

4. The containerized robotic system of claim 1, wherein the base and the detachable superstructure have sufficient rigidity to support stacking of one or more shipping containers on the containerized robotic system.

5. The containerized robotic system of claim 4, wherein the base and detachable superstructure comprise steel, aluminum, fiber-reinforced polymer, or a combination thereof.

6. The containerized robotic system of claim 4, wherein the detachable superstructure comprises corrugated steel.

7. The containerized robotic system of claim 1, wherein the detachable superstructure comprises:
    a detachable top; and
    one or more detachable side walls.

8. The containerized robotic system of claim 1, wherein in response to a power distribution unit being connected to a power system for the robot, the robot performs an initialization to perform work at the site.

9. The containerized robotic system of claim 8, further comprising:
    one or more computers operatively connected to the robot, the one or more computers being configured to control the robot.

10. The containerized robotic system of claim 8, wherein the power distribution unit is the primary power source for one or more components within the containerized robotic system.

11. The containerized robotic system of claim 1, wherein at least one of the sensors attached to the sensor superstructure is a safety sensor that is configured to obtain information pertaining to the workspace of the robot when the robot is deployed.

12. The containerized robotic system of claim 1, wherein:
    the sensor superstructure is folded or collapsed within the enclosed space;
    the sensor superstructure has at least N points fixed to the base or a structure fixed to the base, N being a positive integer; and
    the sensor superstructure is configured to be expanded, the sensor superstructure being expanded when at least one side of the detachable superstructure is removed.

13. The containerized robotic system of claim 12, wherein when the sensor superstructure is deployed via being expanded, the sensor superstructure maintains connection to the at least N fixed points.

14. The containerized robotic system of claim 1, wherein the one or more sensors are preconfigured before the containerized robotic system is transported to a site at which the robot is to be deployed, and the one or more sensors are calibrated at the site in connection with initialization of the robot.

15. The containerized robotic system of claim 1, further comprising:
   the robot; and
   a control computer that is preloaded with software configured to control the robot to perform the selected one of the plurality of jobs.

16. The containerized robotic system of claim 1, wherein:
   the system is integrated with a kitting shelf structure, comprising:
      one or more shelves comprising one or more items; and
   in response to the robot of the containerized robotic system being deployed and initialized,
      a conveyance structure carries a receptacle to the workspace of the robot; and
      the robot picks at least one item from the one or more shelves, and places the item into the receptacle.

17. The containerized robotic system of claim 1, wherein:
   the system is integrated with a singulations system; and
   in response to the robot of the containerized robotic system being deployed and initialized,
      a chute conveys a set of items to the workspace of the robot; and
      the robot singly picks and places at least one item from the workspace to the singulation conveyance structure.

18. The containerized robotic system of claim 1, wherein:
   the system is integrated with a palletization system; and
   in response to the robot of the containerized robotic system being deployed and initialized,
      a conveyance structure conveys a plurality of items to the workspace of the robot; and
      the robot moves a set of items from the conveyance structure to at least one of the pallets.

\* \* \* \* \*